United States Patent [19]

Yuasa et al.

[11] Patent Number: 5,448,736

[45] Date of Patent: Sep. 5, 1995

[54] METHOD FOR GENERATING A PROGRAM COMPRISED OF SUCH A PORTION OF A SERIES OF OPERATOR-INPUTTED COMMANDS AS WILL PRODUCE AN OPERATOR-SELECTED ONE OF A NUMBER OF RESULTS

[75] Inventors: Hiroko Yuasa, Hachioki; Masaaki Iwasaki, Tachikawa, both of Japan

[73] Assignee: Hitachi, Ltd., Tokyo, Japan

[21] Appl. No.: 629,377

[22] Filed: Dec. 18, 1990

[30] Foreign Application Priority Data

Dec. 22, 1989 [JP] Japan .................................. 1-333600
Aug. 10, 1990 [JP] Japan .................................. 2-210347

[51] Int. Cl.$^6$ ............................................. G06F 15/60
[52] U.S. Cl. ........................................... 395/700; 395/140; 395/159; 395/155
[58] Field of Search ................... 371/19; 395/600, 650, 395/700, 159, 375, 140, 155

[56] References Cited

U.S. PATENT DOCUMENTS

| | | | |
|---|---|---|---|
| 4,730,315 | 3/1988 | Saito et al. | 371/19 |
| 4,872,167 | 10/1989 | Maezawa et al. | 371/19 |
| 5,005,119 | 4/1991 | Rumbaugh et al. | 395/650 |
| 5,051,898 | 9/1991 | Wright et al. | 395/600 |
| 5,117,496 | 5/1992 | Stearns et al. | 395/700 |
| 5,151,984 | 9/1992 | Newman et al. | 395/500 |
| 5,175,848 | 12/1992 | Dysart et al. | 395/600 |

FOREIGN PATENT DOCUMENTS 63-131229  6/1988  Japan .

OTHER PUBLICATIONS

Guy L. Steele, Jr., "Common Lisp", pp. 324–325. (Provided in English)
Keiji Kojima, et al., "LIVE—Integrating Visual and Textual Programming Paradigms", Proceedings of IEEE Workshop on Visual Languages, pp. 80–85. (Provided in English).
I. Yoshimoto, et al., "Interactive Iconic Programming Facility in Hi-Visual", Proceedings of IEEE Workshop in Visual Languages, 1986, pp. 34–41. (Provided in English).

*Primary Examiner*—Ken S. Kim
*Attorney, Agent, or Firm*—Fay, Sharpe, Beall, Fagan, Minnich & McKee

[57] ABSTRACT

In a computer system, a plurality of commands selected by an operator are sequentially inputted to specify respective processing to be executed and respective data to be used in the processing. Each of the inputted commands is executed before an input of a command subsequent thereto to output data resultant from an execution of the command. In the input operation, several commands are supplied to specify, as data to be respectively used by the plural commands, resultant data attained by the execution of commands inputted prior thereto. From the plural input commands are extracted a series of several commands employed to generate at least one resultant data associated with the plural commands and selected by the operator. Based on the extracted command series, there is generated a program executing processing to be achieved by the command series or processing equivalent thereto.

24 Claims, 55 Drawing Sheets

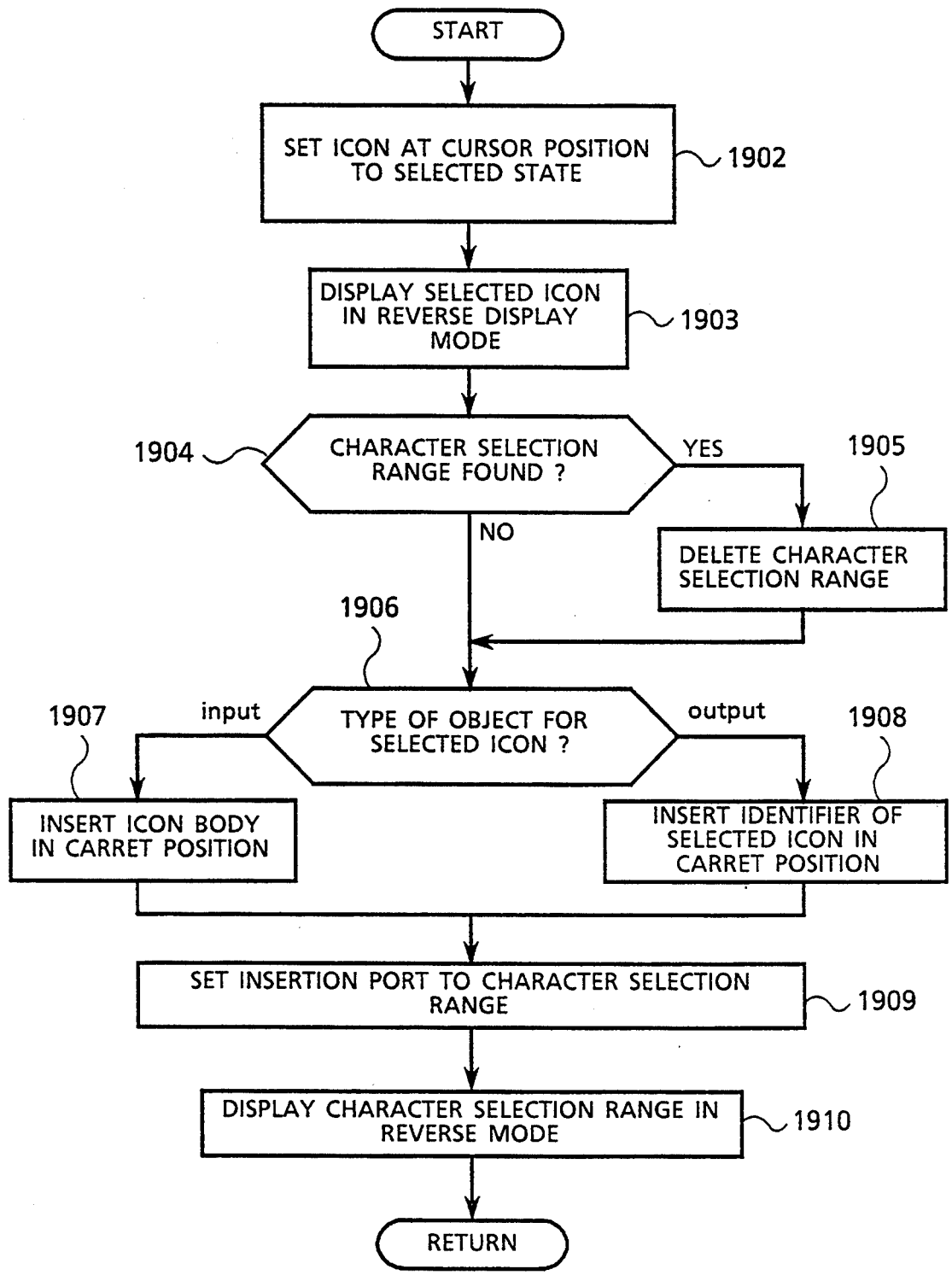

FIG. 24

DATA BASE EMPLOYEE LIST 2500

|  | NAME (2501) | SEX (2502) | AGE (2503) | DIVISION (2504) |
|---|---|---|---|---|
| 2505 | IWASAKI | MALE | 30 | SALES-DIVISION |
| 2505 | YUASA | FEMALE | 25 | GENERAL-AFFAIRS-DIVISION |
|  |  |  |  |  |
|  |  |  |  |  |
|  |  |  |  |  |
|  |  |  |  |  |

FIG. 25

| FUNCTION NAME | ARGUMENT | FUNCTION | VALUE |
|---|---|---|---|
| name | EMPLOYEE RECORD | OBTAIN VALUE FROM NAME COLUMN OF EMPLOYEE RECORD |  |
| age | EMPLOYEE RECORD | OBTAIN VALUE FROM AGE COLUMN OF EMPLOYEE RECORD |  |
| division | EMPLOYEE RECORD | OBTAIN VALUE FROM DIVISION COLUMN OF EMPLOYEE RECORD |  |
| MALE-P | EMPLOYEE RECORD | DETERMINE WHETHER OR NOT EMPLOYEE RECORD IS ASSOCIATED WITH MALE EMPLOYEE | T OR NIL |
| FEMALE-P | EMPLOYEE RECORD | DETERMINE WHETHER OR NOT EMPLOYEE RECORD IS ASSOCIATED WITH FEMALE EMPLOYEE | T OR NIL |
| connect | DATABASE | SET DATABASE TO ACCESSIBLE STATE | LIST REPRESENTATION OF DATABASE |
| filter | 1;FUNCTION 2;LIST | APPLY FUNCTION TO ELEMENTS OF LIST TO GENERATE LIST OF ELEMENTS EACH OTHER THAN NIL | LIST |

@102 (filter #' (lambda (e) (> (age e) 20)) @101)

@103 ((iwasaki male 30 sales-division)
(yuasa female 25 general-affairs-division)
.....
)

@104 (buc' @103)

@105 (filter #' (lambda (e) (> (age e) 20)) (connect employee-list))

@106 (filter #' (lambda (e) (> (age e) 30)) '@103)

@107 ((yuasa female 25 general-affairs-division)
(mori male 24 development-division)
.....
)

(filter #' male-P @107)

303

@107 ((yuasa female 25 general-affairs-division)
       (mori male 24 development-division)
       ......
       )
@108 (filter #' male-P @107)
@109 ((mori male 24 development-division)
       (takamoto male 24 sales-division)
       ......
       )
@110 (example @109)
@111 (mori male 24 development-division)
@112 (name @111)
@113 mori (buc '@113)    303

@116 (length @109)
@117 1872
@118 (filter #'(lambda (e)
        (eq (division e) 'sales-division))
        @109)
@119 ((takamoto male 24 sales-division)
      (niki male 26 sales-division))
@120 (length @119)
@121 48
@122 (example @119)
@123 (niki male 26 sales-division)
@124 (name @123)
@125 niki (buc' @125)

303

```
@126 (buc '@125)
@127 (mapcar
       #' name
       (filter
         #' (lambda (e) (cq (division e) 'division)
         (filter #' male-P
           (filter
             #' (lambda (e)
                  (< (age e) 30))
             (filter
               #' (lambda (e)
                    (> (age e) 20))
               (connect employee-list))))))
```

FIG. 48

(name (example (filter #' male-P
 (filter #' (lambda (e) (< (age e) 30))
 (filter #' (lambda (e) (> (age e) 20))
 (connect employee-list))))))

FIG. 49

(filter #' male-P
 (filter #' (lambda (e) (< (age e) 30))
 (filter #' (lambda (e) (> (age e) 20))
 (connect employee-list))))

FIG. 50

```
(mapcar #' name
        (filter #' male-P
                (filter #' (lambda (e) (< (age e) 30))
                        (filter #' (lambda (e) (> (age e) 20))
                                (connect employee-list)))))
```

FIG. 51

```
(mapcar #' name
        (filter #' (lambda (e) (eq (division e) sales-division))
                (filter #' male-P
                        (filter #' (lambda (e) (< (age e) 30))
                                (filter #' (lambda (e) (> (age e) 20))
                                        (connect employee-list))))))
```

FIG. 53
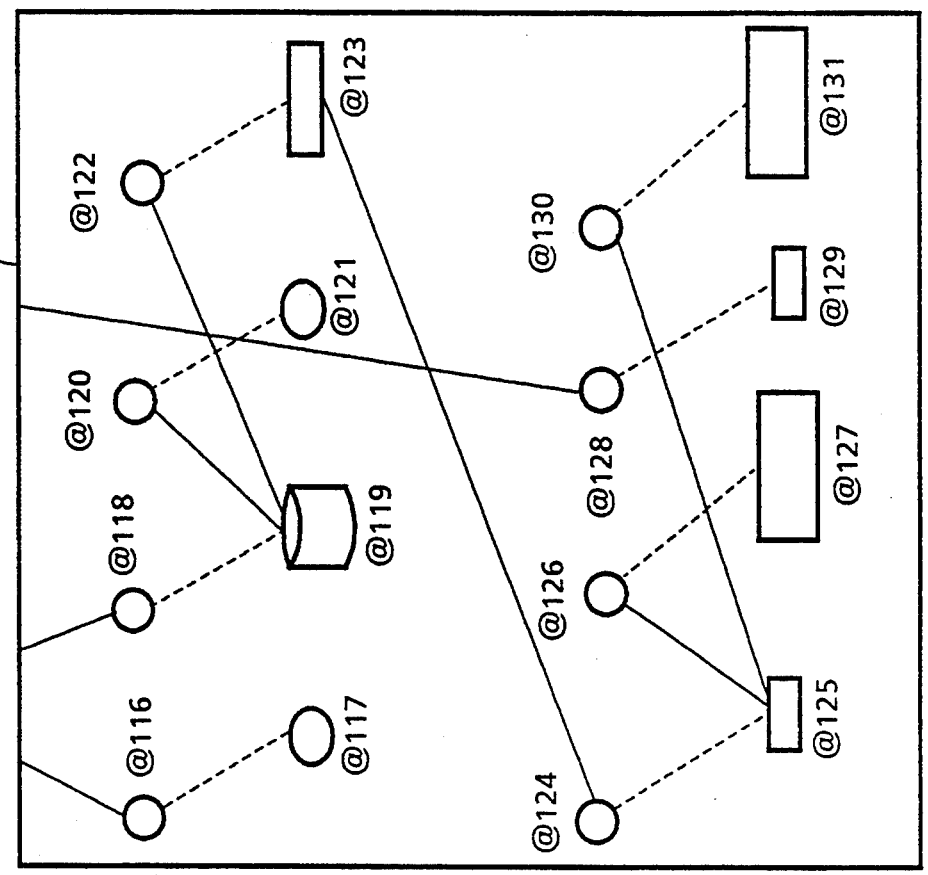
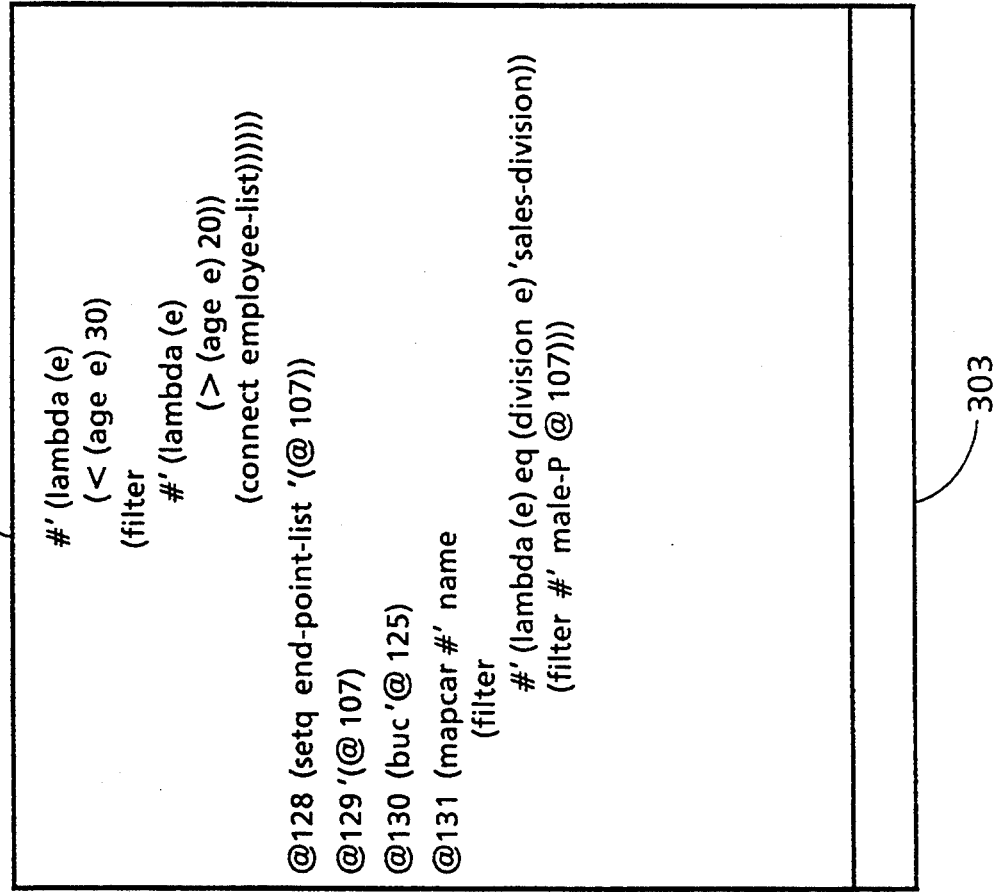

FIG. 54

(name (example (filter #' (lambda (e) (eq (division e) 'sales-division))
        (filter #' male-P @ 107)))

FIG. 55

(mapcar #' name
        (filter #' (lambda (e) (eq (division e) 'sales-division))
            (filter #' male-P @107)))

```
#'(lambda (e) (eq (division e) 'sales-division))
(filter #' female-P
    (filter
        #' (lambda (e)
            (< (age e) 30))
        (filter
            #' (lambda (e)
                (> (age e) 20))
            (connect employee-list)))))

@128 (filter #' female-P @107)
@129 ((yuasa female 25 general-affaires-division)
       (mizuta female 25 sales-division)
       ......
      )
```

```
(name
    (example
        (filter #' (lambda (e) (eq (division e) 'sales-division))
            (filter #' female-P
                (filter #' (lambda (e) (< (age e) 30))
                    (filter #' (lambda (e) (> (age e) 20))
                        (connect employee-list))))))
```

```
(mapcar #' name
    (filter #' (lambda (e) (eq (division e) 'sales-division))
        (filter #' female-P
            (filter #' (lambda (e) (< (age e) 30))
                (filter #' (lambda (e) (> (age e) 20))
                    (connect employee-list))))))
```

FIG. 64

(name (example records))

FIG. 65

(defun test (records) (name (example records)))

FIG. 66

(defun test (records) (mapcar #' name records))

FIG. 70

```
(length
    (filter #' (lambda (e) (eq (division e) 'sales-division))
        (filter #' male-P
            (filter #' (lambda (e) (< (age e) 30))
                (filter #' (lambda (e) (> (age e) 20))
                    (connect employee-list))))))
```

FIG. 71

```
(name
    (example
        (filter #' (lambda (e) (eq (division e) 'sales-division))
            (filter #' male-P
                (filter #' (lambda (e) (< (age e) 30))
                    (filter #' (lambda (e) (> (age e) 20))
                        (connect employee-list)))))))
```

FIG. 72

```
(values
    (length (filter #' (lambda (e) (eq (division e) 'sales-division))
                    (filter #' male-P
                            (filter #' (lambda (e) (< (age e) 30))
                                    (filter #' (lambda (e) (> (age e) 20))
                                            (connect empolyee-list))))))
    (name
        (example
            (filter #' (lambda (e) (eq (division e) 'sales-division))
                    (filter #' male-P
                            (filter #' (lambda (e) (< (age e) 30))
                                    (filter #' (lambda (e) (> (age e) 20))
                                            (connect employee-list))))))))
```

FIG. 73

```
(values
    (length (filter #' (lambda (e) (eq (division e) 'sales-division))
                    (filter #' male-P
                            (filter #' (lambda (e) (< (age e) 30))
                                    (filter #' (lambda (e) (> (age e) 20))
                                            (connect empolyee-list))))))
    (mapcar #' name
            (filter #' (lambda (e) (eq (division e) 'sales-division))
                    (filter #' male-P
                            (filter #' (lambda (e) (< (age e) 30))
                                    (filter #' (lambda (e) (> (age e) 20))
                                            (connect employee-list))))))))
```

(let ((data (filter #' (lambda (e) (eq (division e) 'sales-division))
                  (filter #' male-P
                        (filter #' (lambda (e) (< (age e) 30))
                              (filter #' (lambda (e) (> (age e) 20))
                                    (connect employee-list))))))
   (values (length data)
        (mapcar #' name data)))

METHOD FOR GENERATING A PROGRAM COMPRISED OF SUCH A PORTION OF A SERIES OF OPERATOR-INPUTTED COMMANDS AS WILL PRODUCE AN OPERATOR-SELECTED ONE OF A NUMBER OF RESULTS

BACKGROUND OF THE INVENTION

The present invention relates to an interaction processing method and a program generating method, and in particular, to an interaction processing method capable of improving operability or usability of a computer and to a program generating method of automatically generating a program based on an interaction history.

Heretofore, there has been known an interaction processing scheme having a command recall function.

For example, as described in pages 324 and 325 of the "Common Lisp" written by Guy L. Steel Jr, an interaction processing routine of the Lisp (called a top-level loop) memorizes a previous command inputted from a key-in device and a result of an execution of the command, so that if the operator inputs (eval +), the command executed immediately therebefore can be executed again. Moreover, when the operator inputs (eval ++), the second next command preceding the input operation can be re-executed.

Furthermore, a similar command recall function is also supported by interaction processing routines (interaction shells) in general-purpose operating systems such as the Unix and the MS-DOS.

On the other hand, software programs "MacroMaker" or "Tempo II" for the personal computer Macintosh includes command recall functions developed from the command recall functions above.

The command recall function thus developed is used in either one of a recording mode and a reproduction mode. In the recording mode, a sequence of key and/or mouse operations conducted by the operator are recorded; whereas, in the reproduction mode, the recorded key and/or mouse operations are reproduced.

The recorded key and/or mouse operations are called macros. The macros may be edited and stored in a storage e.g. on a disk so as to be arbitrarily read therefrom for the reproduction thereof.

That is, the macros function as a program and hence the developed command recall function may be regarded as a function to produce a program through an interaction processing.

According to a processing procedure generation processing method described in JP-A-63-131229 (1988), an interaction processing interpreter keeps a history of operations such as commands supplied from a user such that when the user thereafter specifies a necessary portion of the operation history, the specified portion is extracted to be processed for a generation of a processing procedure.

In accordance with a program language LIVE described in pages 9 to 17 of the "Digests of the 30th Programming Symposium", IEEE of Japan, January 1989 and in pages 80 to 85 of the "Proceedings of IEEE workshop on Visual Languages", 1989, there is provided a programming by example (PBE) function in which voice inputs are also memorized, in addition to the key inputs and mouse operations, so that the memorized items are processed to create a program for an execution thereof.

Moreover, according to a programming environment HI-VISUAL described in pages 34 to 41 of the "Proceedings of IEEE Workshop on Visual Languages, 1986 and in pages 139 to 146 of the "Digests of the Software Engineering Symposium", 58-18, February 1988, there is disposed a PBE function employing icons.

The HI-VISUAL displays icons representing programs and data items as parts or components of the program. When the operator selects and arranges icons associated with a program and data and then defines connective relationships between the icons, the HI-VISUAL creates the objective program. Furthermore, in the program generation process, a result of an execution of each part of the program is displayed by using icons. Referencing the displayed execution result, the operator can interactively produce a program.

That is, when program generation is started, the icons selected by the operator and the connective relationships therebetween are recorded along a flow of data. When the recording operation is completed, the acquired icons and the connective relationships are processed to create a program. During the program generation, the connective relationships between the icons may be edited.

However, the command recall functions in the Common Lisp, Unix, and MS-DOS, the modified command recall functions developed in the Macro Maker and Tempo II, and the PBE functions in the LIVE and HI-VISUAL are attended with the following problems.

(1) When many commands and values are supplied, it is impossible thereafter to directly specify an arbitrary one thereof.

In consequence, the operator cannot easily obtain an intermediate item from a sequence of commands generated through an interaction processing so as to use the attained item for the subsequent operation; moreover, there exists a difficulty in a re-execution of the operation from an intermediate point.

(2) Consequently, during a sequence of operations, an operation error cannot be left uncorrected, which imposes an extensive strain and carefulness on the operator.

The operations are entirely recorded, namely, any operation errors are also stored. As described in the article (1), it is difficult to use an intermediate item in the sequence of commands and to reexecute the operation beginning from an intermediate point. In consequence, the operator is required to be careful not to conduct any operation error, which increases mental stress on the operator.

Although a portion of the operation error may be deleted or modified by editing the program, the editing operation is onerous as described in an article (4) below.

(3) A trial and error procedure cannot be employed at an intermediate point of the operation, which is inconvenient for the operator.

For the same reason as for the article (2), a trial and error process cannot be inserted between steps of a sequence of operations. Consequently, even in a case where the trial and error is necessary because an output from the computer at an execution of a command is unpredictable, it is necessary to first achieve a trial and error process to confirm that a desired result is attainable such that a sequence of commands are again inputted beginning from the first command to generate a program.

(4) The system does not memorize a chaining relationship indicating a command execution sequence e.g. for a preceding command, the system cannot determine a command which uses the result of an execution of the preceding command.

A series of commands supplied by the operator are related with each other through chaining relationships therebetween. Even if the series of commands are sequentially recorded, the chaining relationships between the commands are not attained. Namely, the result of a command execution is not necessarily employed in an execution of a command immediately following the previous command.

Consequently, the operator is required to follow the chaining relationships therebetween.

(5) The operator cannot trace a sequence of commands thus chained.

For a command, it is desired in some cases to trace backward the commands executed before the command. However, for the reason of the article (4), the computer is not supplied with the command chaining relationships and hence cannot trace the command sequence in the reverse direction.

Moreover, the processing procedure generation processing method described in JP-A-63-131229 is attended with the following difficulties.

(6) The operator is required to specify a necessary portion of the interaction history thus memorized.

In order to create a procedure for achieving a complicated processing, the operator must sequentially select actually necessary items such as commands from a large amount of items of the operation history, which is troublesome for the operator.

SUMMARY OF THE INVENTION

It is therefore an object of the present invention to provide a program generating method in which a command not used in a program to be generated may be inputted and may be executed.

Another object of the present invention is to provide a method of generating a program in which an operator may input commands in a trial-and-error fashion.

Still another object of the present invention is to provide a method of generating a program in which an operator may use a portion of a group of commands, which have been inputted to the system without an intention of generating a program, to create a program producing a desired result.

Further another object of the present invention is to provide a method of supporting an operator to input commands.

In order to achieve the objects above, according to the present invention, there is provided a program generating method including the following steps of:

(a) sequentially inputting a plurality of commands selected by an operator to respectively specify processing to be executed and data to be used in the processing;

(b) executing each input command prior to an input of a command subsequent thereto and for outputting data resultant from the execution of the command, said step (a) including a step of inputting several commands specifying, as data for each command of the processing, data resultant from said step (b) executed on a command preceding said each command;

(c) extracting from the plural input commands a sequence of several commands employed to generate at least a resultant data item selected by the operator from resultant data items respectively attained from the step (b) executed on the plural input commands; and (d) generating based on the extracted command sequence a program executing processing to be achieved by the command sequence or executing processing equivalent thereto.

Furthermore, according to the present invention, there is provided a program generating method comprising the following steps of:

(a) displaying, in response to an input of a command specifying data different from data resultant from an execution of a command subsequent thereto, the subsequent command being selected from the plural commands supplied from an operator to respectively designate processing to be executed and data to be used in the processing, (1) an icon of a first kind representing the command;

(2) an icon of a second kind denoting the different data;

(3) a graphic image of a first type interrelating the icon of the first kind and the icon of the second type with each other;

(4) an icon of a third kind representing data resultant from an execution of the command; and (5) a graphic image associating the icon of the third kind with the icon of the first kind representing the command; and (b) displaying, in response to an input of a command by the operator to specify data resultant from an execution of one of the plural commands, the one command being preceding the command, (6) an icon of a first kind representing the command;

(7) a graphic image of a first type associating the icon of the first kind with an icon of a second kind already displayed to represent data resultant from an execution of the preceding command;

(8) an icon of a third kind representing data resultant from an execution of the command; and (9) a graphic image of a second type associating the icon of the third kind with the icon of the first kind representing the command.

BRIEF DESCRIPTION OF THE DRAWINGS

FIG. 4 is a flowchart of an icon click processing routine according to the present invention;

FIG. 24 is a diagram illustratively showing a data base;

FIG. 25 is a diagram showing examples of functions;

FIGS. 48, 49, 50, and 51 are diagrams each showing examples of the S-expression;

FIG. 53 is a diagram illustratively showing screen in a concrete example of an interaction job using the S-expression composing function of FIG. 52;

FIGS. 54 and 55 are schematic diagrams each showing examples of the S-expression in a case where the S-expression composing function of FIG. 52 is employed;

FIGS. 64, 65, and 66 are diagrams each showing S-expression in a case where the automatic program generating routine of FIG. 61 and the S-expression composing function of FIG. 62 are employed;

FIGS. 70, 71, 72, and 73 are diagrams each showing S-expression in a case where the automatic program generating routine of FIG. 67 and the multivalue S-expression composing function of FIG. 68 are employed;

DESCRIPTION OF THE PREFERRED EMBODIMENTS

Figure 1:
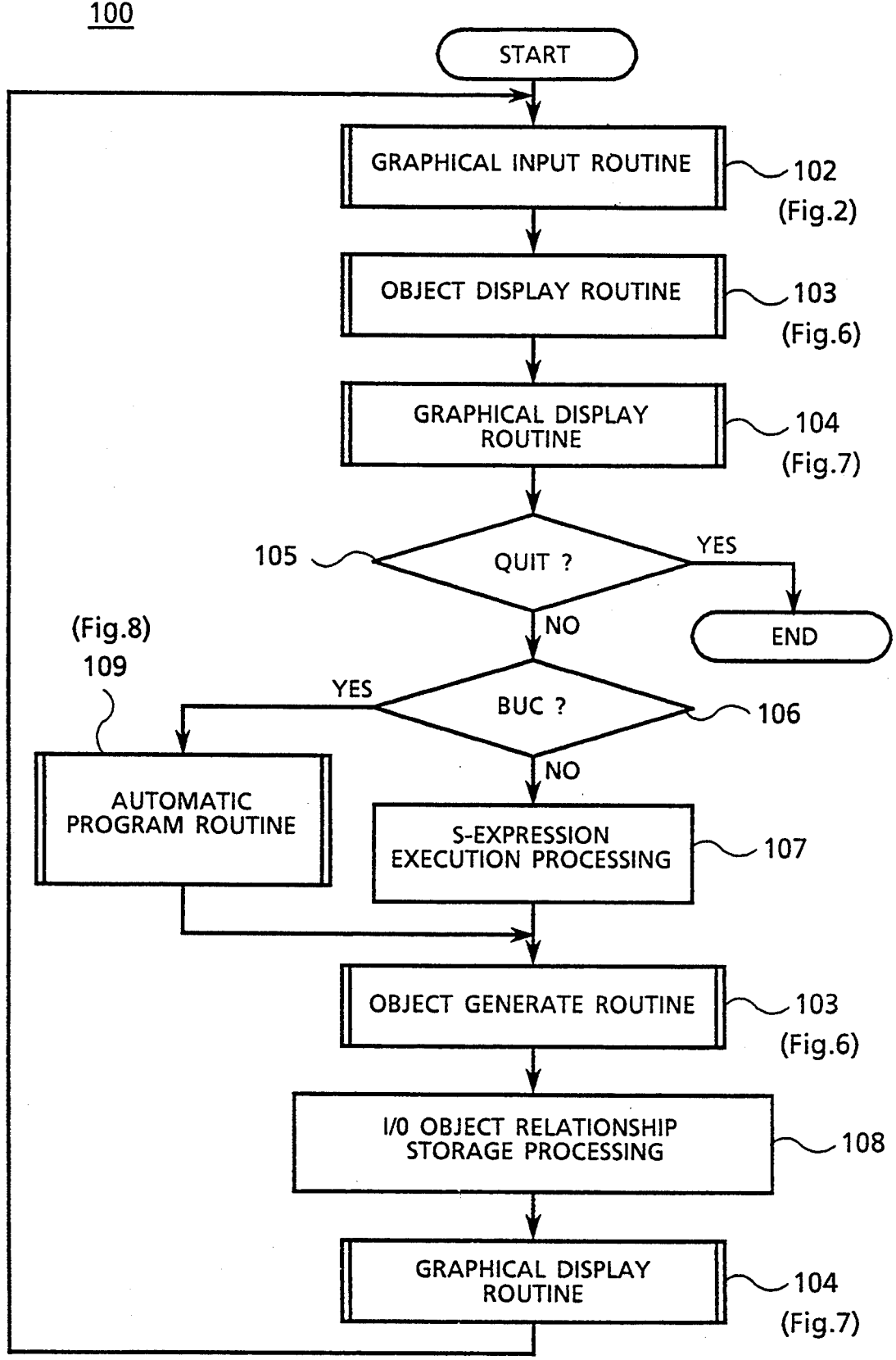
FIG. 1 is a flowchart showing the operation of a top-level loop of the Lisp in an embodiment related to an interaction processing method and a program generating method according to the present invention.

Referring now to the drawings, description will be given of an embodiment according to the present invention. It is however to be understood that the present invention is not restricted by the embodiment.

An interaction processing method and a program generating method in the embodiment according to the present invention is incorporated in a top-level loop of the Lisp.

In the Lisp, a command is called an S-expression. Moreover, an execution of a command is expressed as an evaluation of an S-expression and a result of an execution of a command is called a value. In addition, a function and a command are interpreted as synonimous words; furthermore, an argument of a function and an operand of a command are regarded as synonimous words. In the following description, for simplicity of explanation, the argument and the operand are referred to as data. This specification will be described in conformity with the representation and notation adopted in he Lisp.

(1) System configuration

Figure 12:
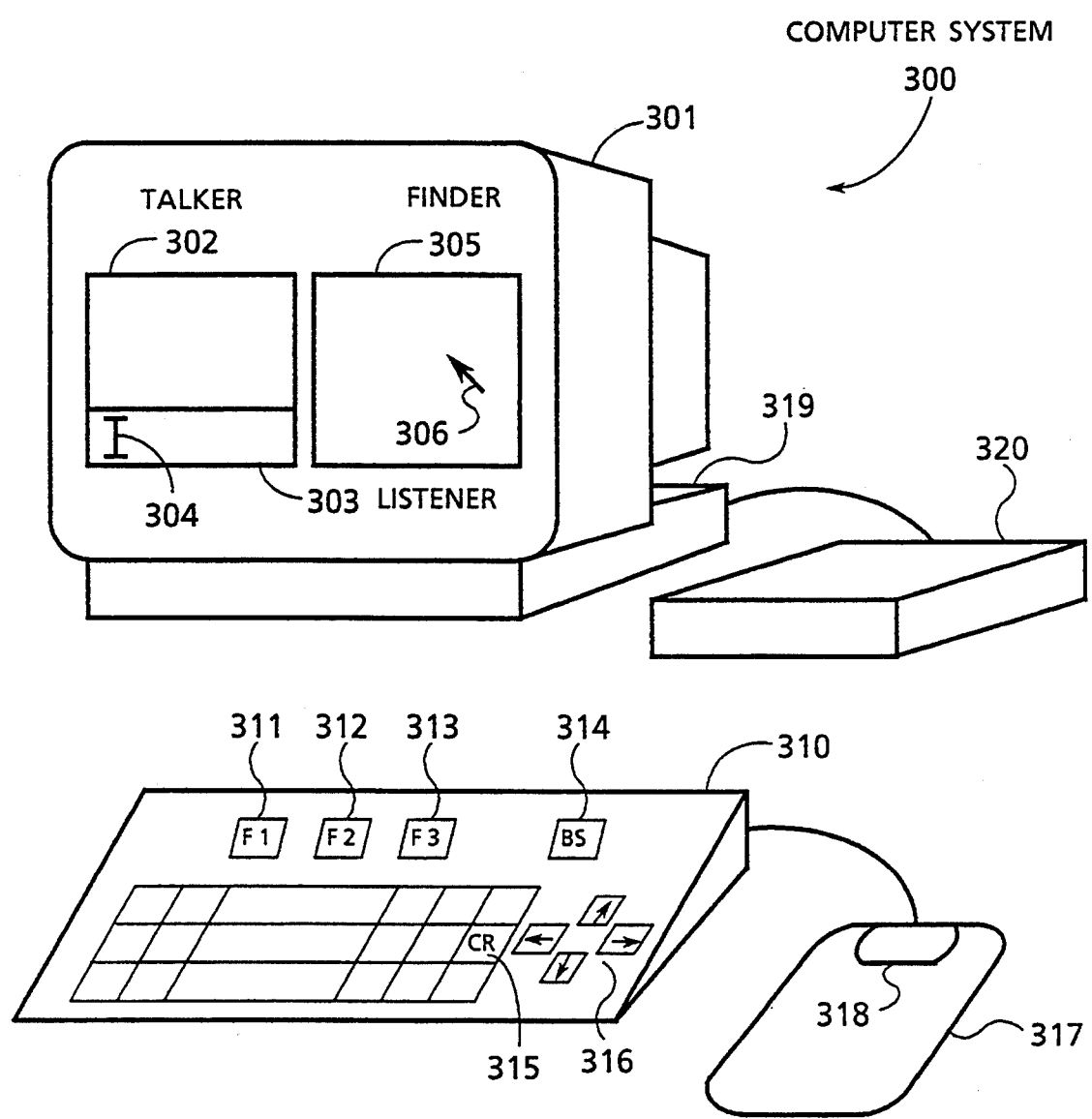
FIG. 12 is a perspective view showing the constitution of a computer system in which the present invention is implemented.

The Lisp associated with the present invention is executed by a computer system 300 of FIG. 12.

The computer system 300 includes a computer main body 319 integrally including a microprocessor and a memory (which are not shown), a nonvolatile secondary storage 320, a display 301, a keyboard 310, and a mouse 317.

The display 301 has a screen wherein there are displayed a listener 303 which is a window exclusively used to input an S-expression, a talker 302 which is a window for sequentially presenting therein S-expressions inputted in the listener 303 and values attained by evaluating the S-expressions, and a finder 305 which is a window for displaying therein the inputted S-expressions and the evaluation values of the S-expressions in the form of icons.

The listener 303 is used to display therein a carret 304, which can be moved by carret shift key 316 in the keyboard 310 or by the mouse 317.

Moreover, there is presented on the display 301 a mouse cursor 306 moving in association with a mouse operation.

The keyboard 310 includes an F1 key 311, an F2 key 312, an F3 key 313, a BS key 314, a CR key 315, the carret shift key 316, etc.

FIG. 1 shows a top-level loop 100 of the Lisp according to the present invention.

A graphical input routine 102 processes inputs supplied from the keyboard 310 and the mouse 317. This routine further supports a command recall function to be conducted with the F1 key 311, the F2 key 312, and the mouse 317. Details thereabout will be later described by referring to FIGS. 2 to 5.

An object generating routine 103 functions as follows. When information supplied from the operator is a command, namely, an S-expression or when the S-expression is evaluated in an S-expression execution processing, this routine 103 generates an object for the S-expression, a value as an evaluation result thereof, or a program created by an automatic program generating routine 109, which will be described later, thereby storing the object in a memory. Details will be later described by reference to FIG. 6.

Figure 11:
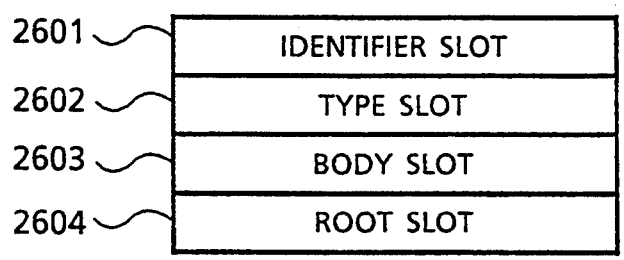
FIG. 11 is a diagram showing the structure of an object according to the present invention.

In this embodiment, an object is created for an S-expression representing a command, an S-expression resultant from an execution thereof, or a program produced by the embodiment. The object has a general structure as indicated by reference numeral 2600 of FIG. 11, which includes four constituent elements of an identifier slot 2601, a type slot 2602, a body slot 2603, and a route slot 2604.

A graphical display routine 104 clears the items presented in the listener 303 and displays in the talker 302 contents of the objects created by the object generating routine 103. Moreover, this routine 104 presents in the finder 305 icons corresponding to the objects. In addition, when an object thus displayed is related to an S-expression using other data, the graphical display routine 104 displays in the finder 305 a line segment (called a link) connecting an icon beforehand displayed for the data to the new icon presented. Furthermore, when an object displayed is associated with a value resultant from an execution of an S-expression, a link is similarly presented to connect an icon beforehand displayed for the S-expression to the new icon presented. These links visualize mutual relationships between the objects. Details thereabout will be later described by referring to FIG. 7.

A judge step 105 checks to determine whether or not the input information is a command QUIT. If this is the case, the Lisp processing is terminated. A step 106 checks to decide whether or not the input information is a command BUC. If this is the case, control is passed to the automatic program generating routine 109.

A step 107 is operative, when the input command is an S-expression other than QUIT and BUC, to execute the S-expression.

The automatic program generating routine 109 traces in a backward direction relationships between a plurality of objects loaded in the memory to acquire a sequence or series of commands resultant from an execution of the information specified by the operator, thereby producing a program from the command series. Details thereabout will be described later by reference to FIGS. 8 to 10.

In a processing step 108 of storing input/output object relationships, when the object generating routine 103 generates an object for a value of an S-expression executed by the S-expression execution processing step 107, a pointer (an address in the memory) of the S-expression to the object beforehand memorized is stored in a route slot of the object generated for the value of the S-expression. As a result, relationships between the objects are memorized.

(2) Outline of processing

Next, description will be given of the operation of the top-level loop 100 of the Lisp in a specific example of an arithmetic operation "add 128 to 256 and then multiply a result of the addition by 256".

First, from the keyboard 310, the operator sequentially inputs characters as (+128 256).

Figure 13:
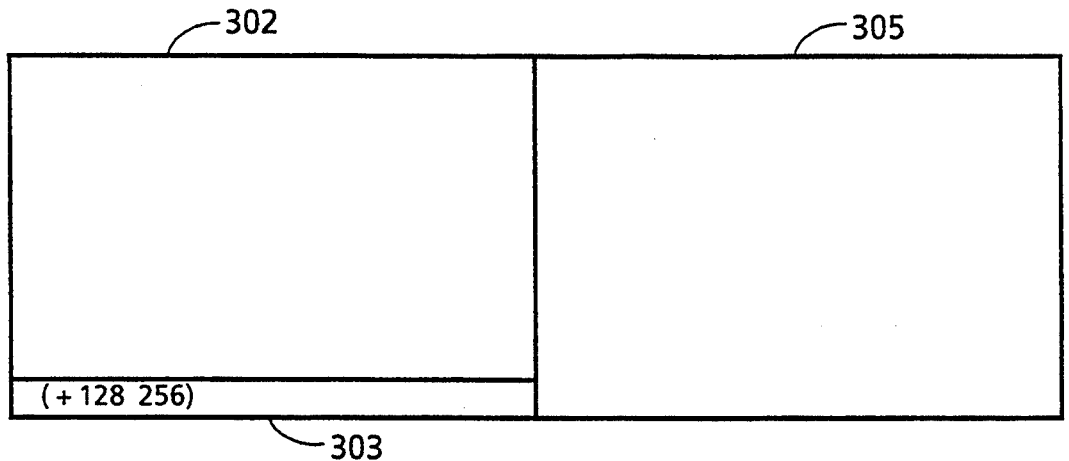
FIGS. 13, 14, 15, 16, 17, 18, 19, 20, 21, 22, and 23 are schematic diagrams each showing screens in specific examples of an interaction job.

The graphical input routine 102 then presents as an echo of the input the characters in the listener 303 as shown in FIG. 13.

Figure 78:
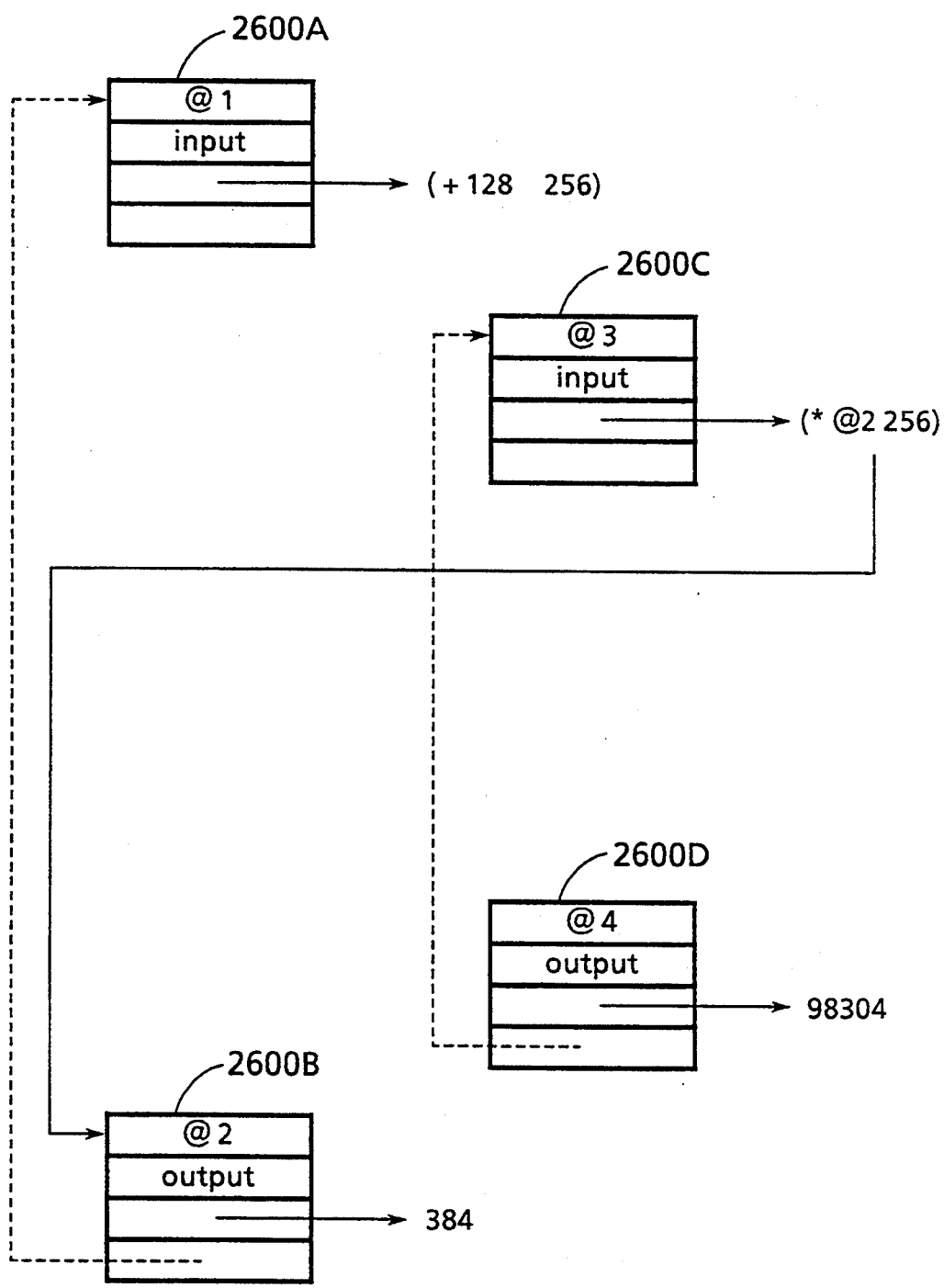
FIG. 78 is a diagram showing examples of objects created in association with a sequence of commands described in conjunction with FIGS. 13 to 23.

When the CR key 315 is depressed, the character string displayed in the listener 303 is transferred as an S-expression to the object generating routine 103, which creates an object 2600A (FIG. 78) with an identifier @1 to be stored in the memory.

Figure 14:
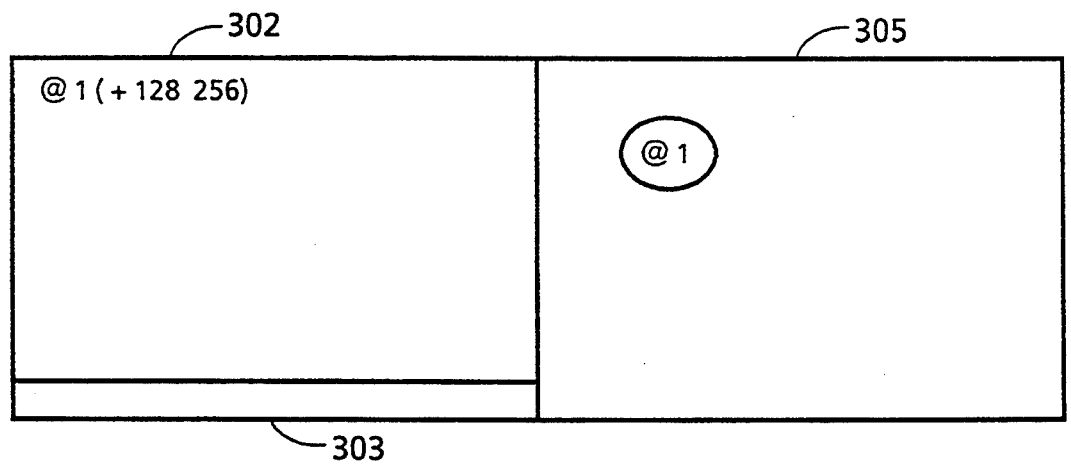

The graphical display routine 104 clears, as shown in FIG. 14, the items in the listener 303 to present in the talker 302 contents of the generated object 2600A, namely, the identifier @1 and the main part of the S-expression (+128 256). Moreover, this routine 104 creates an icon including an ellipse associated with the object and the identifier @1 therein (the icon is referred to as an icon @1 herebelow), thereby displaying the icon @1 in the finder 305. Since only one icon exists in the finder, the operation to display a link is not required.

Since the input S-expression is neither QUIT nor BUC, the step 107 executes the S-expression to obtain a value "384".

The value "384" is passed to the object generating routine 103, which produces an object 2600B with an identifier @2 representing the value "384".

Subsequently, the I/O object relationship processing 108 loads a route slot of the object 2600B related to the value "384" with an address in the memory assigned to the object 2600A of the S-expression (+128 256).

Figure 15:
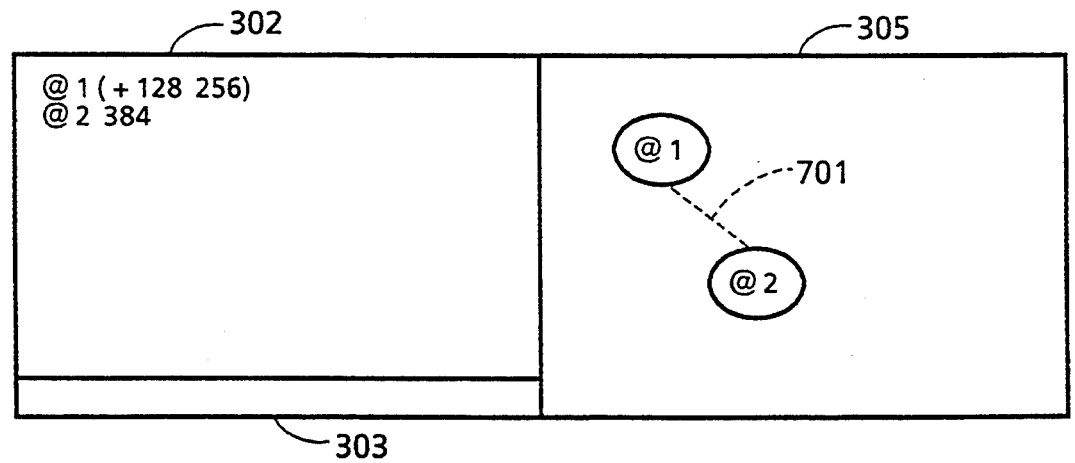

The graphical display routine 104 displays, as shown in FIG. 15, the contents of the generated object 2600B including the identifier @2 and the value "384" in the talker 302. For the object 2600B, an icon @2 is then created to be presented in the finder 305. Thereafter, a link 701 is displayed to connect the icon @1 to the icon @2 in the finder 305. In this figure, the link 701 is designated with a broken line, which indicates relationship between an S-expression and a value thereof. A link of this type is called a generation link.

Subsequently, if the operator inputs an S-expression (* 384 256)

from the keyboard 310, an objective value may be obtained. However, in the Lisp according to the present invention, in place "384" can be supplied. Namely, the operator may input (* @2 256)

from the keyboard 310. Moreover, the mouse 317 may be adopted to supply the S-expression as follows.

Figure 16:
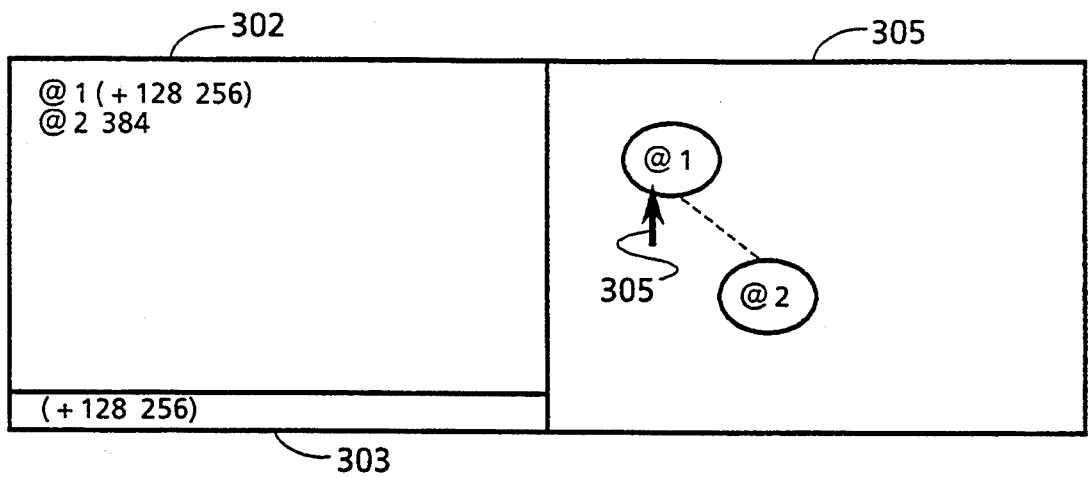

That is, as shown in FIG. 16, the operator uses the mouse 317 to move the mouse cursor 306 onto the icon @1 so as to click a button 318 twice. In response thereto, the graphical input routine 102 acquires the S-expression of the object 2600A related to the icon @1 and then presents the S-expression in the listener. Namely, (+128 256)

is displayed.

Figure 17:
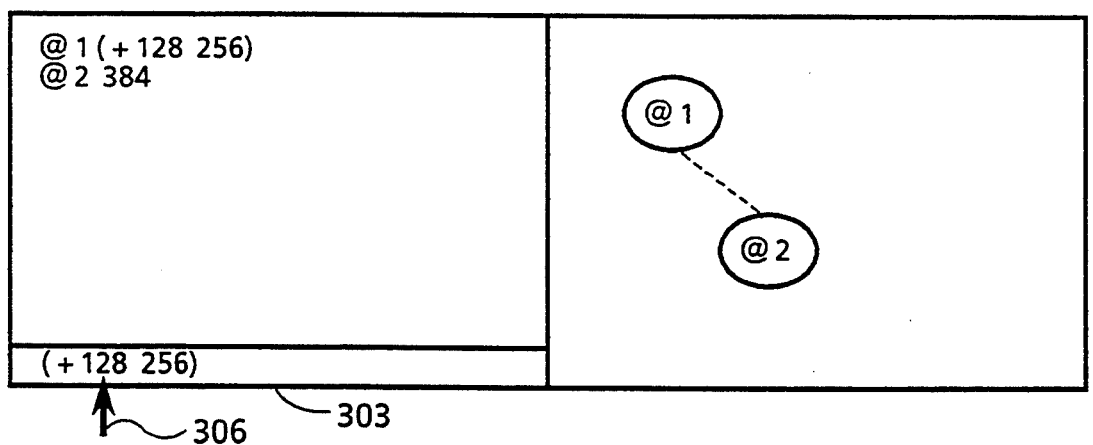
Figure 18:
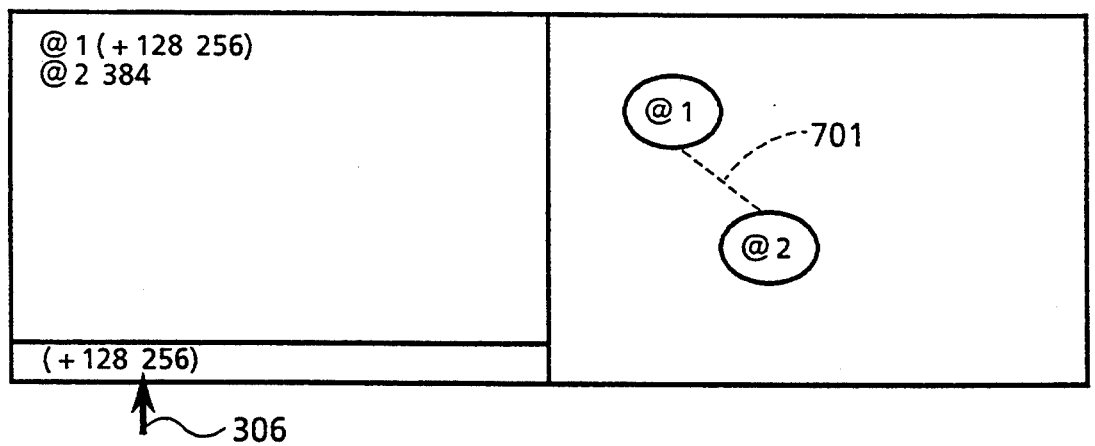

Next, as shown in FIG. 17, the operator moves the mouse cursor 306 onto the left-most end of the character string "128" in the lister 303. Keeping the button 318 depressed, the operator shifts the mouse 317 toward the right to trace the character string "128". The graphical input routine 102 responsively presents the character string "128" in a reverse display mode as shown in FIG. 18. The reverse display portion is called a character selection range.

Figure 19:
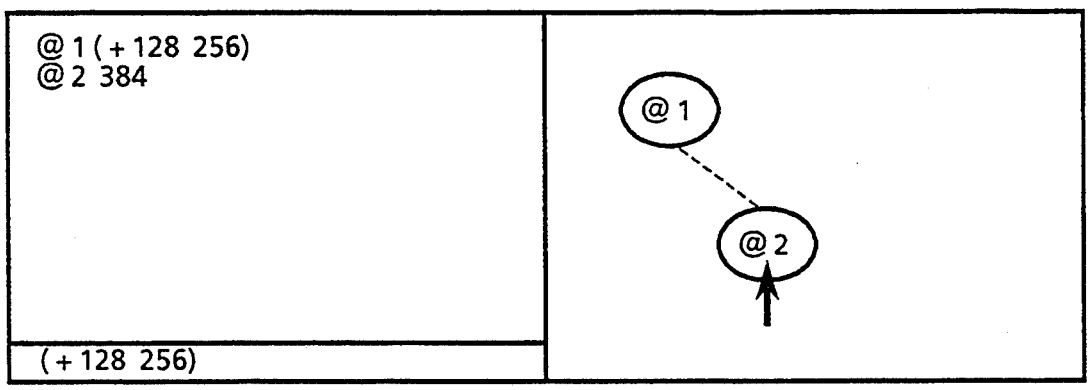

Subsequently, the operator shifts the mouse cursor 306 onto the icon @2 as shown in FIG. 19 and then clicks the button 318 two times.

Figure 20:
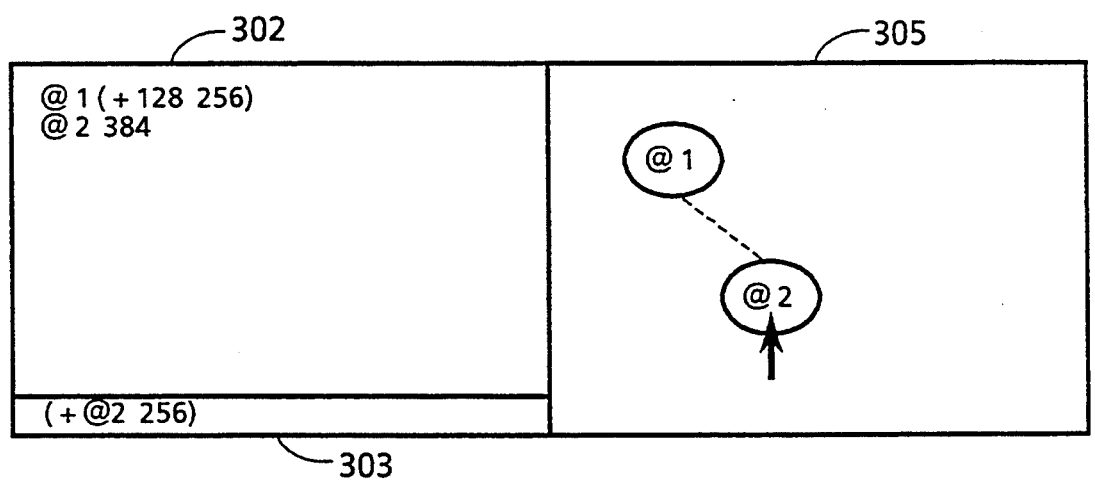

As a result, as shown in FIG. 20, the graphical input routine 102 replaces the character string "128" in the character selection range with the identifier "@2" of the icon @2 undergone the double-click operation.

Figure 21:
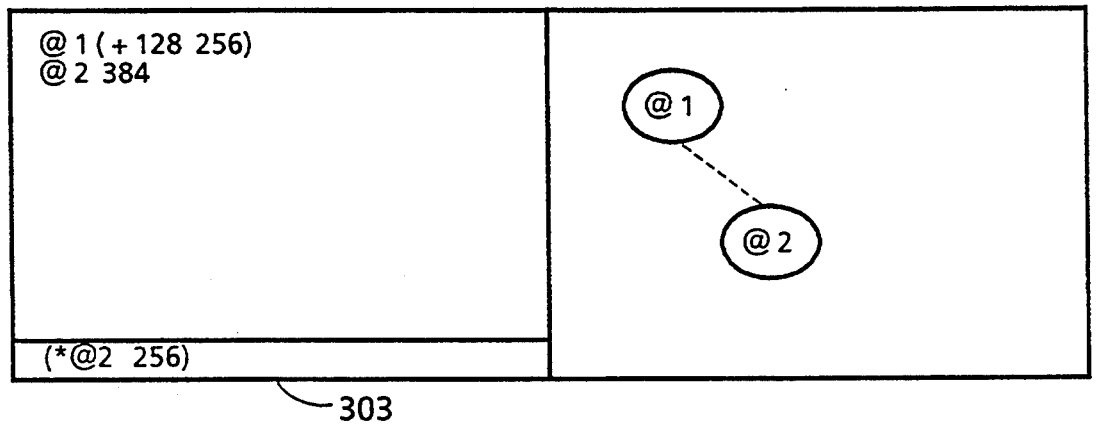

The operator then moves the carret 304 up to the right of the plus sign "+" by the carret shift key 316; thereafter the operator depresses the BS key 314 and then a key associated with the character "*". In response thereto, as shown in FIG. 21, the plus sign "+" is substituted for the asterisk "*" by the graphical input routine 102.

When the CR key is depressed, the character string being presented in the listener 303 is passed as an S-expression to the object generating routine 103, which in turn creates an object 2600C with an identifier @3.

Figure 22:
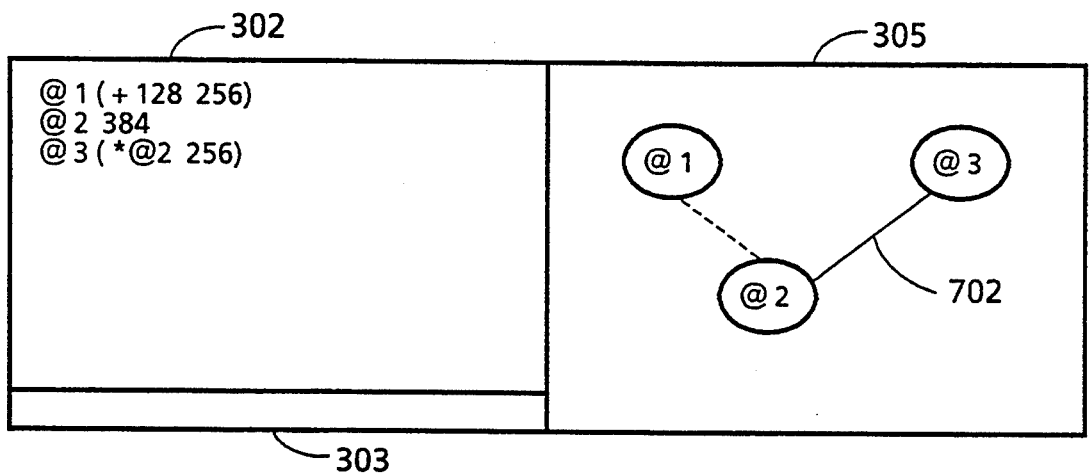

As shown in FIG. 22, the graphical display routine 104 clears the listener 303 and then displays in the talker 302 the contents of the generated object 2600C (i.e. the identifier @3 and the main portion of the S-expression (* @2 256)). Moreover, an icon @3 is produced for the object 2600C so as to be displayed in the finder 305. In addition, a link 702 is presented in the finder 305 to link the icon @2 with the icon @3. The link 702 is denoted with a solid line, which indicates relationship between an S-expression and data to be referenced by the S-expression. A link of this kind is called a reference link.

The inputted S-expression is neither a command QUIT nor a command BUC and hence is executed in the step 107, which generates a value "98304".

The value "98304" is transferred to the object generating routine 103 resultantly producing an object 2600D with an identifier @4.

Next, the I/O object relation storage processing 108 is executed to load the object 2600D of the value "98304" with a relationship of the S-expression (* @2 256) to the object 2600D.

Figure 23:
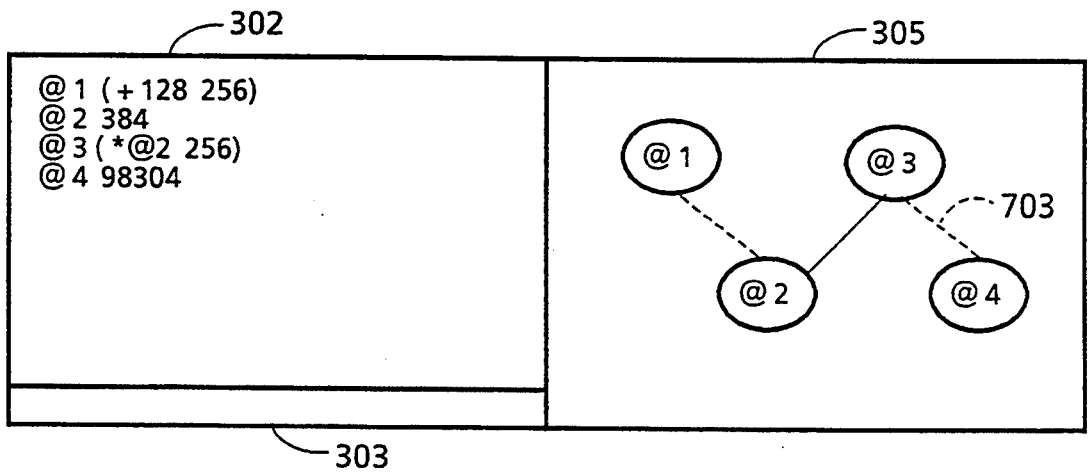

As shown in FIG. 23, the graphical display routine 104 displays in the talker 302 the contents of the produced object 2600D (the identifier @4 and the value "98304"). Moreover, an icon @4 is created for the object 2600D to be presented in the finder 305. Furthermore, a generation link 703 is presented in the finder 305 to connect the icon @3 to the icon @4. The link 703 is drawn with a broken line to indicate a relationship between an S-expression and a value thereof.

In this regard, in place of the double-click operation of the icon @1 by the mouse cursor 306, the F1 key 311 may be depressed twice to obtain the S-expression of the object 2600A associated with the icon @1, which will be described later.

As can be understood from the specific example above, the S-expressions and the values can be specified with the identifiers and the icons, which considerably improves the operability of the system. Moreover, since the interrelationships between the displayed items are visualized by the icons and the links therebetween, the operator can clearly recognize necessary information such as a processing flow.

Next, description will be given in detail of the respective routines of the top-level loop 100 of FIG. 1.
(3) Graphic input routine 102

Figure 2:
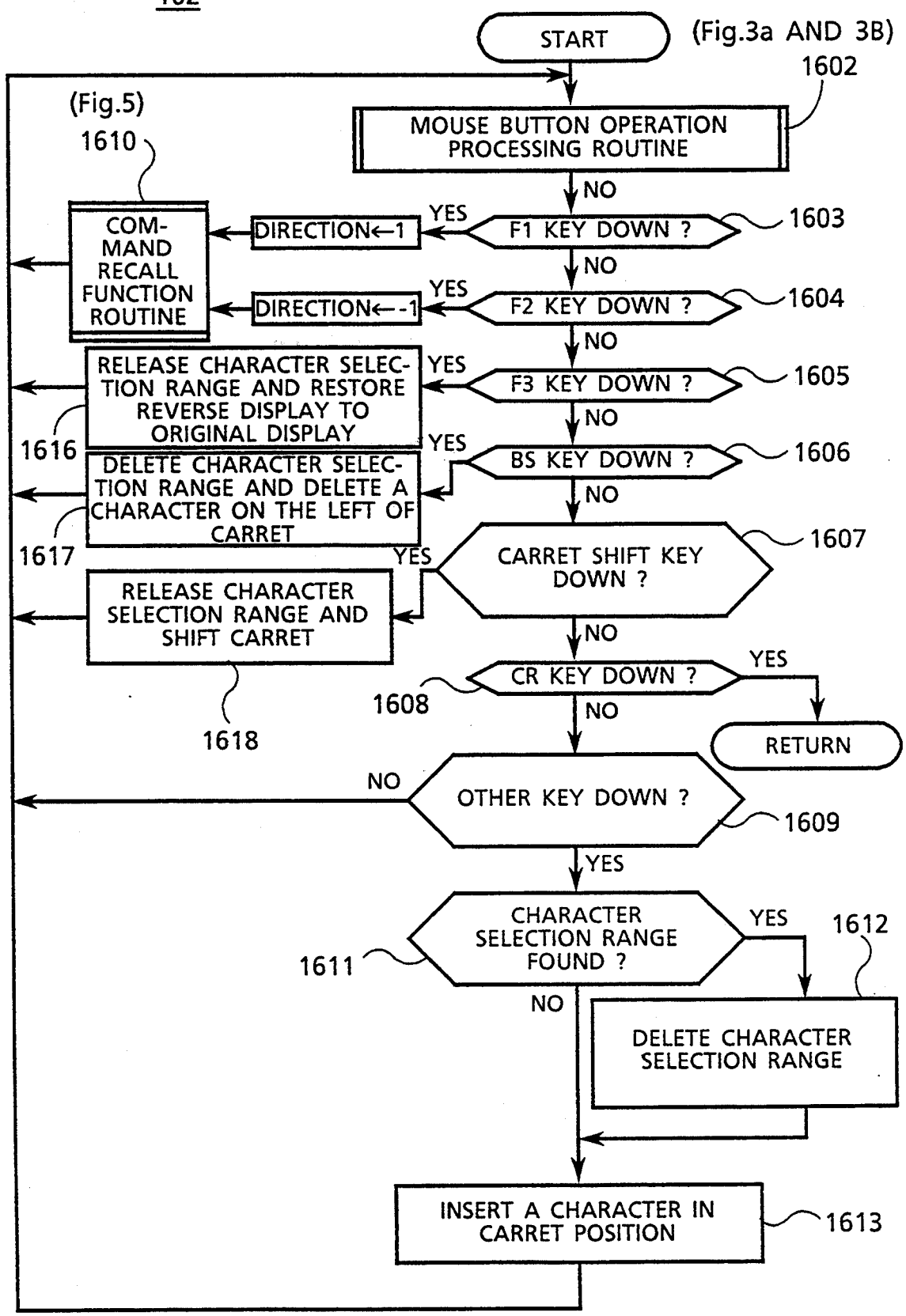
FIG. 2 is a flowchart showing the operation of a graphic input routine according to the present invention.

As shown in FIG. 2, this routine 102 first calls a mouse button operation processing routine 1602.

Figure 3A:
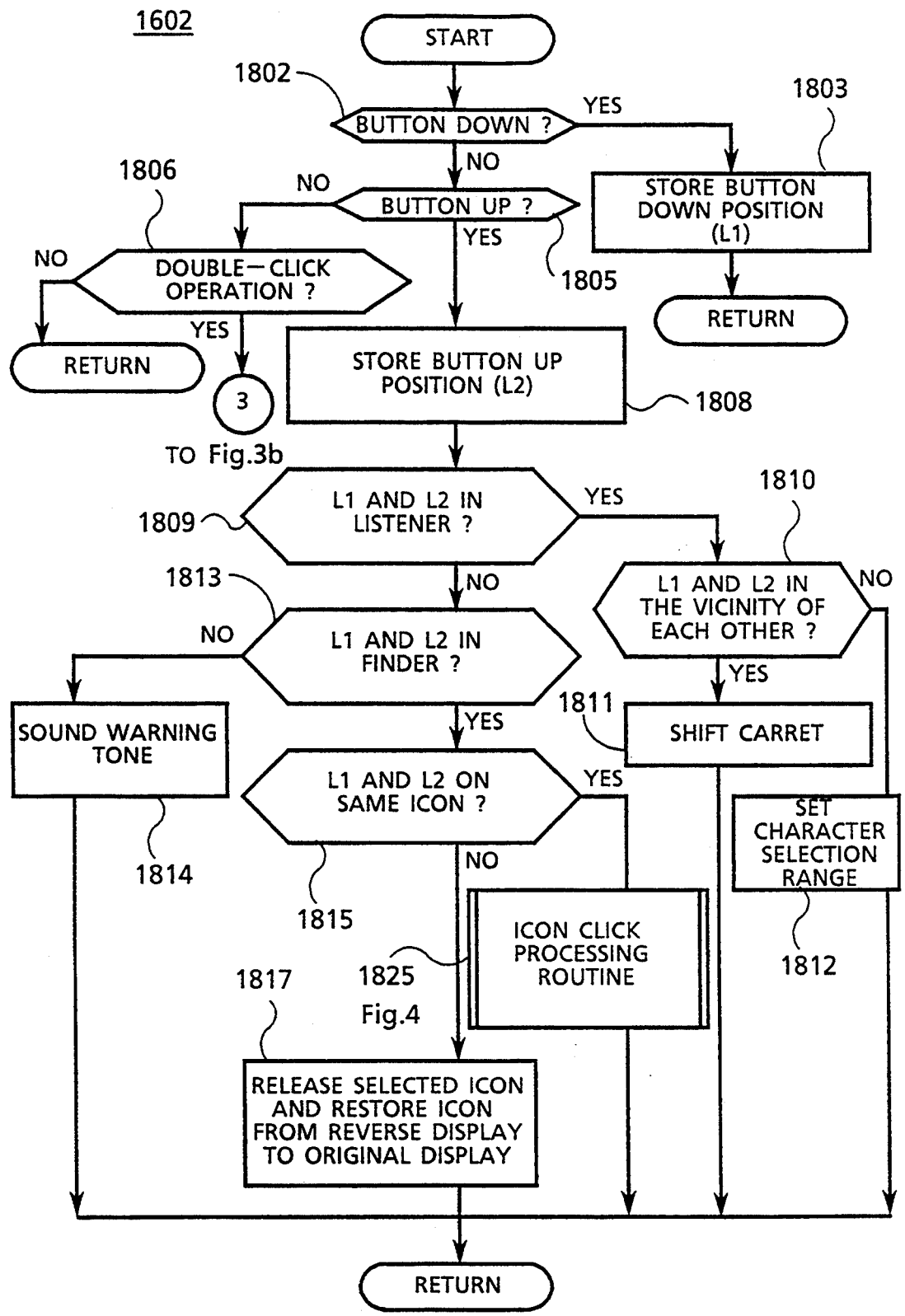
FIGS. 3a and 3b are together flowcharts of a mouse button operation processing routine according to the present invention.
Figure 3B:
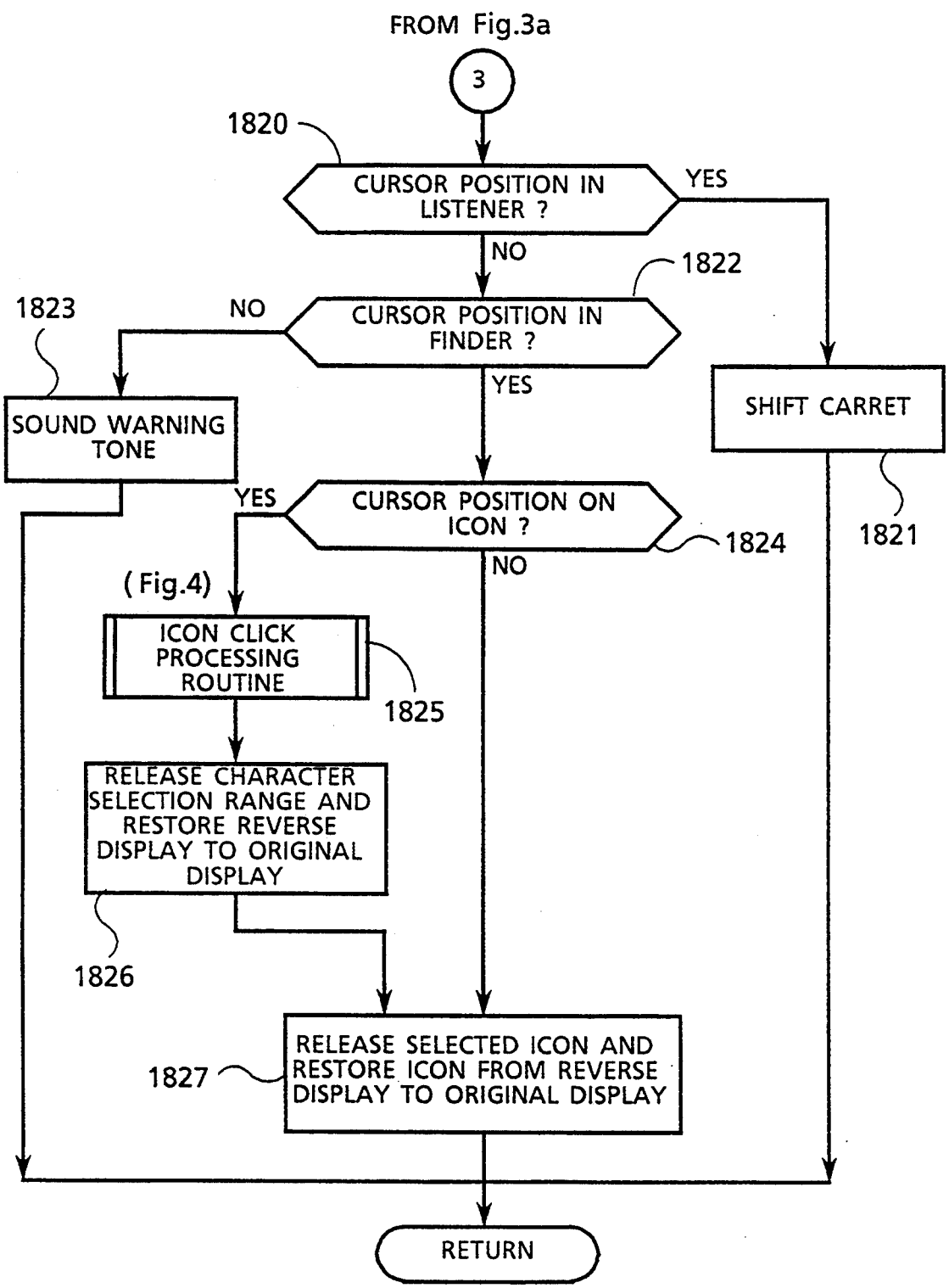

The mouse button operation processing routine passes control to processing shown in FIGS. 3a and 3b.

The processing of FIG. 3a judges to determine whether or not a mouse button is in a button-up state (step 1802).

If this is the case, the down position L1 is memorized (step 1803) and control returns to the routine of FIG. 2.

If the mouse button is other than the button-down state, the routine of FIG. 3a checks to determine whether or not the mouse button is in a button-up state (step 1805).

If this is the case, the button-up position L2 is memorized (step 1808) and then the routine judges to decide whether or not both the button-down position L1 and the button-up position L2 are found in the listener 303 (judgement step 1809).

If this is the case, the processing checks to determine whether or not these positions L1 and L2 are in a region where these positions L1 and L2 are in the neighborhood of each other (step 1810).

If this is the case, the carret 304 of the listener 303 is moved to the button-down position L1 (step 1811) and then control returns to the routine 1602 of FIG. 2.

If these positions are not in the vicinity of each other, the characters between the button-down position L1 and the button-up position L2 are set to be in the character selection range (step 1812) and then processing returns to the routine 1602 of FIG. 2.

When neither the button-down position L1 nor the button-up position L2 is found in the listener 303, the routine checks to determine whether or not both of these positions L1 and L2 are found in the finder 305 (step 1813).

If these positions are missing in the finder 305, a warning tone is sounded (step 1814) and then control returns to the routine 1602 of FIG. 2.

When these positions are found in the finder 305, the routine judges to decide whether or not these positions L1 and L2 are on an identical icon (step 1815).

If this is the case, an icon click processing routine 1825 is called, which will be described later in detail by reference to FIG. 4.

Returning from the icon click processing routine 1825, control transfers to the routine 1602 of FIG. 2. The icon undergone the click operation is called a selected icon.

If these positions L1 and L2 are on different icons, an existing selected icon is released to restore the reverse display of the icon to the original display (step 1816) and then control returns to the routine 1602 of FIG. 2.

When the step 1805 results in other than the button-up state, a check is made to determine whether or not a double-click operation is achieved (step 1806).

For other than the double-click operation, control is passed to the routine 1602 of FIG. 2.

In a case of the double-click operation, control jums to the processing of FIG. 3b to determine whether or not the mouse cursor 306 is at a position within the listener 303 (step 1820).

If this is the case, the carret 304 is moved to the position of the mouse cursor 306 (step 1821) and then control returns to the routine 1602 of FIG. 2.

If the mouse cursor 306 is outside the listener 303, a check is made to determine whether or not the position of the mouse cursor 306 is in the finder 305 (step 1822).

If the mouse cursor 306 is outside the finder 305, a warning tone is sounded (step 1823) and then control returns to the routine 1602 of FIG. 2.

If the mouse cursor 306 is in the finder 305, a check is made to decide whether or not the position of the mouse cursor 306 is on an icon (step 1824).

When the mouse cursor 306 is not on an icon, an exsisting selected icon is released so as to restore the reverse display state thereof to the original display state (step 1827) and then control returns to the routine 1602 of FIG. 2.

When the mouse cursor 306 is on an icon, the icon click processing routine 1825 is called.

After control returns from the icon click processing routine 1825, the routine of FIG. 3b releases the character selection range in the listener 303 to restore the reverse display to the original state (step 1826). Moreover, the state of an existing selected icon is released to restore the reverse display to the original display (processing 1827) and then the processing returns to the routine 1602 of FIG. 2.

In the icon clock processing routine 1825, as shown in FIG. 4, an icon associated with the position of the mouse cursor 306 is set as a selected icon (step 1902) to display the icon in the reverse mode (step 1903).

Thereafter, a check is conducted to decide whether or not the listener 303 contains a character selection range (step 1904).

If this is the case, the range is released (step 1905).

Otherwise, the routine checks the type of the object 2600 corresponding to the selected icon (step 1906).

When the type of the object 2600 is input, the body (S-expression, value) of the object 2600 related to the selected icon is loaded in a position of the carret 304 of the listener 303 (step 1907).

When the type of the object 2600 is output, an identifier of the object 2600 related to the selected icon is loaded in a position of the carret 304 of the listener 303 (step 1908).

Subsequently, the inserted portion is set to the character selection range (step 1909) to display the range in the reverse mode (step 1910) and then the processing returns to the routine of FIG. 3b.

In FIG. 2, when control is returned from the processing of FIG. 3a and/or FIG. 3b to the mouse button operation routine 1602, key check steps (1603 to 1609) are conducted to determine which one of the keys of the keyboard 310 is depressed, namely, among the F1 key 311, F2 key 312, F3 key 313, BS key 314, carret shift key 316, CR key 315, etc.

For a depression of the F1 key 311 (step 1603), a value of one is set to a parameter DIRECTION (step 1614) and then the command recall function routine 1610 is called. At a depression of the F2 key (step 1604), a value of minus one is loaded in the parameter DIRECTION (step 1615) to call the command recall function routine 1610. Thereafter, control is returned from the routine to the graphical input routine 102. Details about the routine 1610 will be later described in detail by reference to FIG. 5.

When it is found that the F3 key is depressed (step 1605), an existing character selection range is released to restore the reverse display state to the original display state (step 1616) and then control is returned therefrom to the graphical input routine 102.

For a depression of the BS key 314 (step 1606), an existing character selection range is released and a character on the left of the carret 304 is deleted (step thereafter, control is passed to the first part of the graphical input routine 102.

At a depression of the carret shift key 316 (step 1607), an existing character selection range is released and the carret 304 is moved toward a specified direction (step 1618); thereafter, control returns to the graphical input routine 102.

For a depression of the CR key 316 (step 1608), control returns to the top-level loop 100 of FIG. 1.

When a character key other than those above is depressed (step 1609), the routine judges to determine whether or not a character selection range is found (step If this is the case, the character selection range is deleted (step 1612).

Otherwise, a character is inserted in the position of the carret 304 to update the carret position (step 1613) and then control returns to the graphical input routine 102.

Consequently, the graphical input routine 102 is repetedly executed until the CR key depression is detected.

Figure 5:
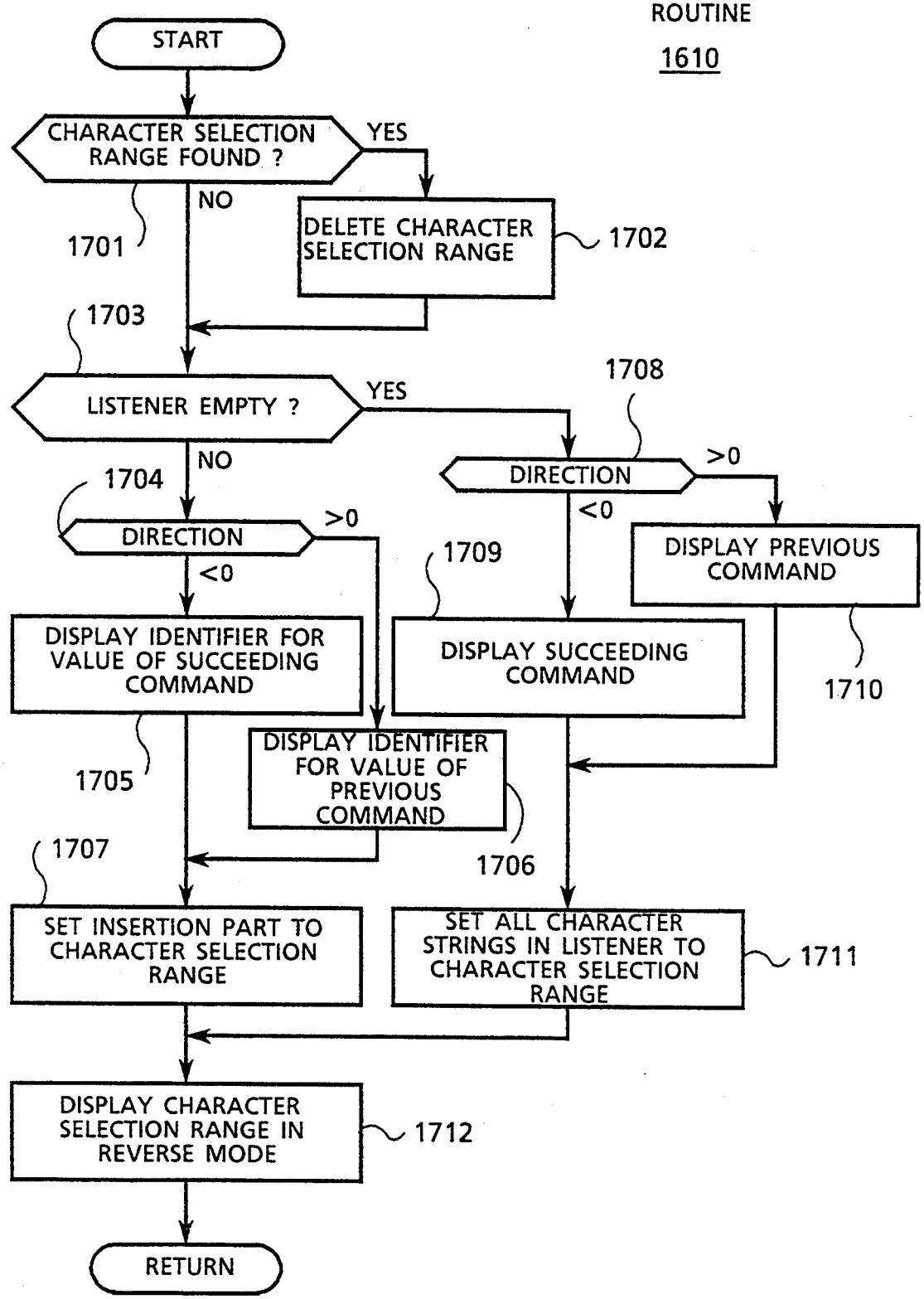
FIG. 5 is a flowchart of a command recall function routine according to the present invention.

As shown in FIG. 5, the command recall function routine 1610 checks to decide whether or not a character selection range exists (step 1701).

If this is the case, the range is deleted (step 1702).

Otherwise, the routine checks to determine whether or not the listener 303 is empty (step 1703).

If the listener 303 is empty, a check is made to decide whether or not the value of DIRECTION is positive (step 1708).

If the value is positive, a command just before the current command is displayed in the listener 303. That is, if the F1 key 31 is depressed for the first time after the preceding object 2600 is created, the routine traces the objects in the backward direction beginning from the last object 2600 to obtain the last command (i.e. the command first found in the backward trace), thereby displaying the command in the listener 303. Otherwise, the number of previous depressions of the key is counted to achieve the backward trace operation so as to obtain a command first inputted. The obtained command is then displayed in the listener 303 (step 1710).

If the value of DIRECTION is negative, a command just succeeding the current command is presented in the listener 303. Namely, when the F2 key 312 is depressed m times after n depressions of the F1 key 311, the result is identical to that obtained from an operation of (n-m) depressions of the F1 key 311 (step 1709).

The step 1711 sets all character strings of the listener 303 to the character selection range.

In the step 1703, if the listener 303 is not empty, a check is carried out to decide whether or not the value of DIRECTION is positive (step 1704).

If this is the case, an identifier of the value of a command just before the current command is presented in the position of the carret 304. That is, if the F1 key 31 is depressed for the first time after the preceding object 2600 is generated, the routine traces the objects in the backward direction beginning from the last object 2600 to obtain an identifier of an execution result of the last command so as to display the identifier in the position of the carret 304. Otherwise, the number of preceding depressions of the key is counted to achieve the trace operation so as to obtain a command first inputted. An identifier of an execution result of the attained command is then displayed in the position of the carret 304 (step 1706).

If the value of DIRECTION is negative, an identifier of the value of a command just following the current command is presented in the position of the carret 304. Namely, when the F2 key 312 is depressed m times after n depressions of F1 key 311, an identifier of an execution result of a command attained when the F1 key 311 is depressed (n-m) times is displayed in the position of the carret 304 (step 1705).

The step 1707 sets the character represented in the position of the carret 304 to the character selection range.

The step 1712 displays the character selection range in the reverse display mode and then transfers control to the routine 102 of FIG. 2.

(4) Object generating routine 103

Figure 6:
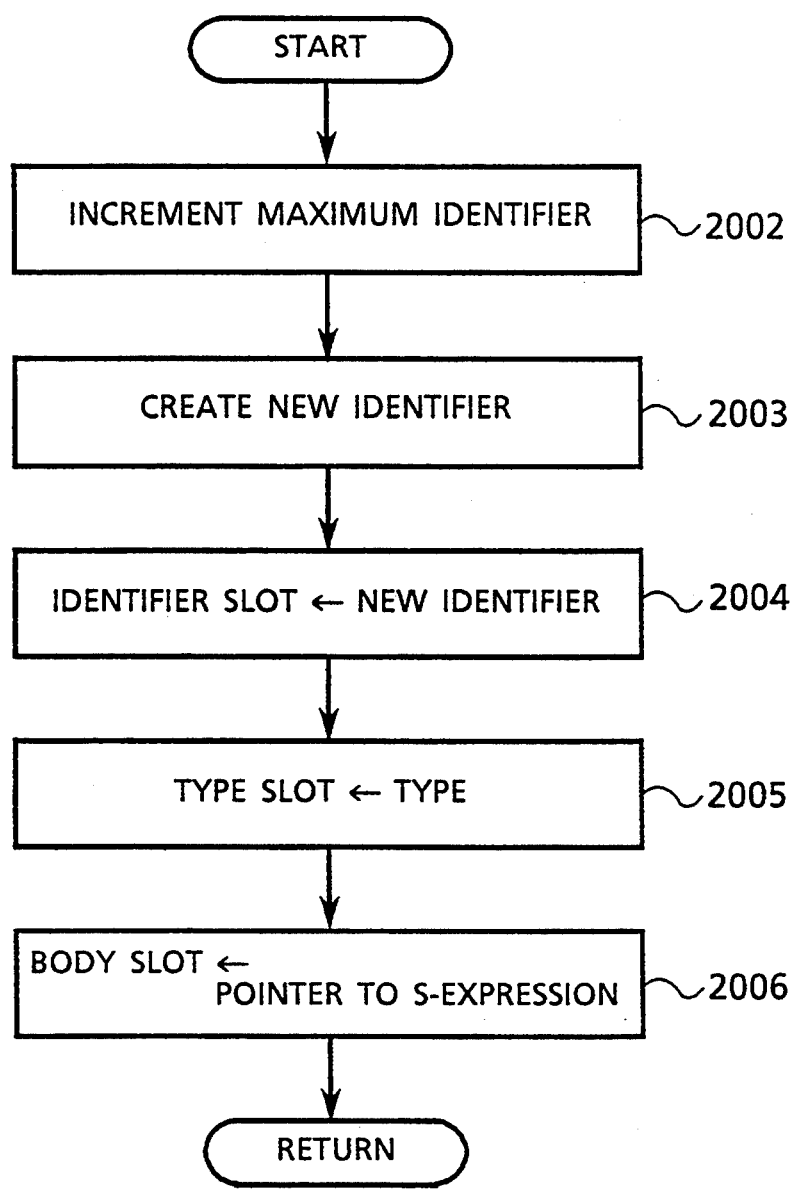
FIG. 6 is a flowchart of an object generating routine according to the present invention.

In this step 103, as shown in FIG. 6, the maximum identifier number of the existing identifiers is incremented by one to assign the resultant value as a new identifier number. An at mark @ is added to the new identifier number to generate a new identifier (steps 2002 and 2003). The new identifier is set to the identifier slot 2601 of the object 2600 (step 2004). Moreover, a check is conducted to determine whether the type of the S-expression is input or output. The attained type is loaded in the type slot 2602 of the object 2600 (step 2005). In addition, a pointer indicating the S-expression proper is stored in the body slot 2603 of the object 2600 (step 2006).

In this connection, when the object 2600 is stored in the storage 320, the identifier may be represented by an address in the storage 320. For example, when magnetic disk units and/or optical disk units are employed, for an object stored therein, the identifier thereof may be designated with disk information, namely, a combination of a track number, a sector number, and a byte position assigned to the first position of a disk area where the object 2600 is recorded.

(5) Graphical display routine 104

Figure 7:
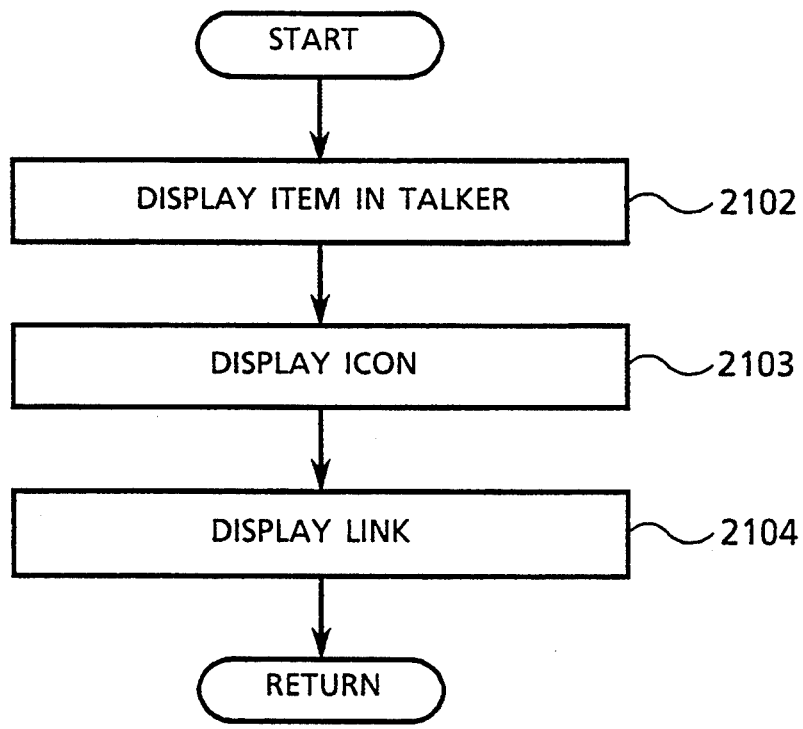
FIG. 7 is a flowchart of an graphical display routine according to the present invention.

As shown in FIG. 7, this routine 104 clears the display items of the listener 303 and presents the contents of the object 2600 in the talker 302 (step 2102). Furthermore, an icon is created in association with the object 2600 to be displayed in the finder 305 (step 2103). Thereafter, a link is generated to be displayed in the finder 305 (step 2104) and then control returns to the routine 102 of FIG. 2.

(6) Automatic program generating routine 109

Figure 8:
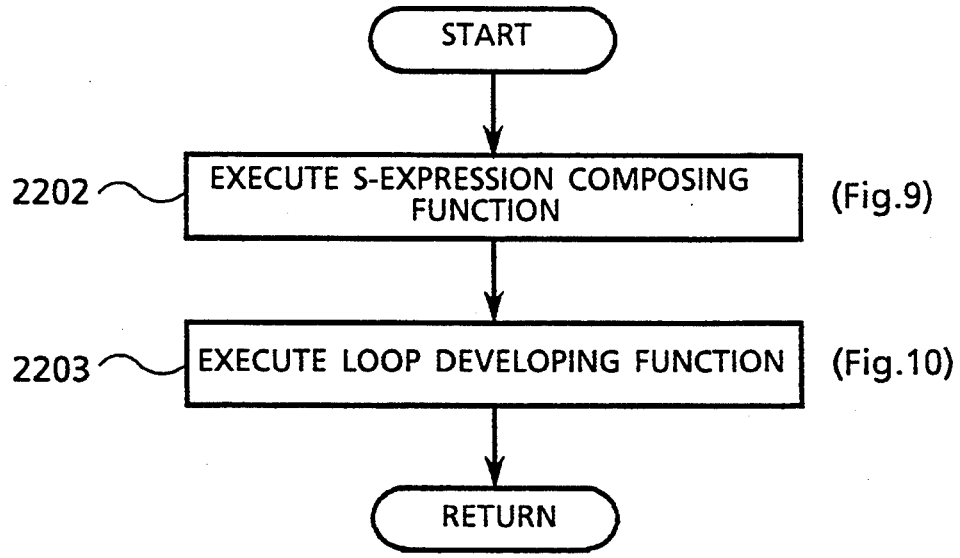
FIG. 8 is a flowchart of an automatic program generating routine according to the present invention.

This routine 109 executes, as shown in FIG. 8, an S-expression composing function 2202 by using as an argument the value specified by the command BUC. The resultant value is then used as an argument in an execution of a loop developing function 2203. Control is then passed together with the execution result to the routine 102 of FIG. 2.

Figure 9:
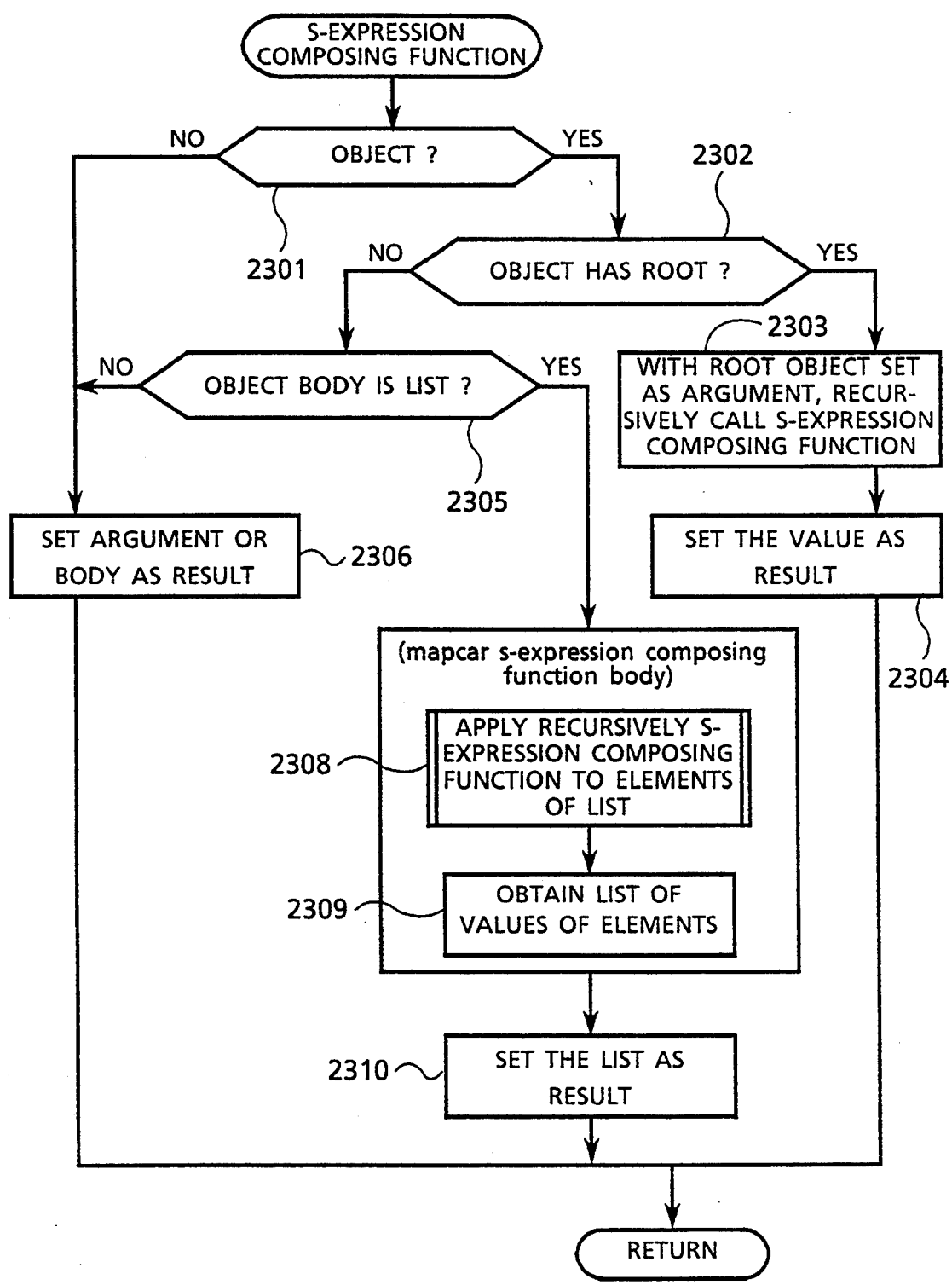
FIG. 9 is a flowchart of an S-expression composing function according to the present invention.

The S-expression composing function 2202 first checks to decide whether or not the argument is an object 2600 as shown in FIG. 9 (step 2301).

If this is not the case, the argument is assumed to be a result (step 2306) and then control is passed to the routine 109 of FIG. 8.

If the argument is an object 2600, a check is made to decide whether or not the object 2600 has a root object (step 2302).

If this is the case, using the root object as an argument, the routine recursively calls the S-expression composing function 2202 (step 2303). On receiving a value returned from the function 2202, the routine passes control together with the value as the result to the routine 109 of FIG. 8.

If the root object is missing, a check is conducted to determine whether or not the body of the object 2600 is a list (step 2305).

If this is the case, the S-expression composing function 2202 is recursively applied to each element of the list (step 2308) to create a list including values returned from the function 2202 (step 2309). The routine passes control together with the list as the result (step 2310) to the routine 109 of FIG. 8.

If the object 2600 is not a list, control is passed together with the object 2600 proper as the result (step 2306) to the routine 109 of FIG. 8.

Figure 10:
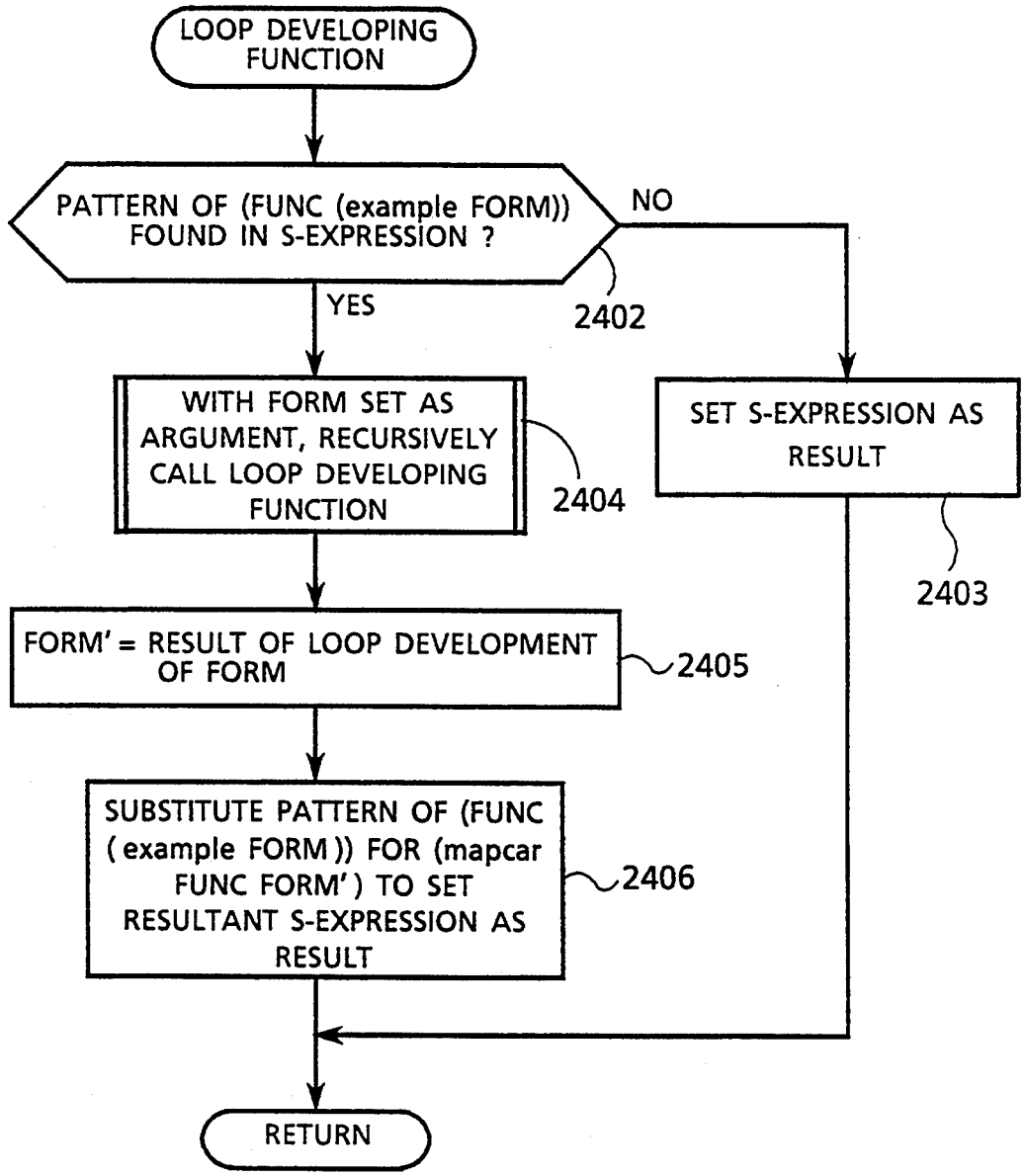
FIG. 10 is a flowchart of a loop development function according to the present invention.

On receiving as an argument the S-expression resulting from the S-expression composing function 2202, the loop developing function 2203 checks to determine whether or not the received S-expression contains a pattern of
(FUNC(example FORM))
as shown in FIG. 10 (step 2402). In this expression, example denotes a function which has a list as an argument to attain one of the elements of the list in a random fashion.

When the pattern is missing, control is passed together with the S-expression as the result (step 2403) to the routine 109 of FIG. 8.

When the pattern is found, the loop developing function 2203 is recursively called by using FORM as an argument (step 2404) to set a result obtained from the function 2203 to FORM (step 2405). Next, in the S-expression, a pattern of
(FUNC(example FORM))
is substituted for
(mapcar FUNC FORM')
to generate a new S-expression. Control is passed together with the S-expression as the result (step 2406) to the routine 109 of FIG. 8.

(7) Detailed description of processing based on a concrete example

Next, referring to a specific example of a retrieval operation of a database, the operations of the respective routines will be described.

In this example, the retrieval is conductive through a database "list of employees" 2500 to produce a table containing names of about 50 male employees having an age more than 20 and less than 30.

The database "employee-list" 2500 includes, as shown in FIG. 24, many employee records 2505 each comprising a name column 2501, a sex column 2502, an age column 2503, and a division column 2504. In the description below, an employee record is represented in a form of a list including contents of the respective columns in the order as follows.
(Iwasaki male 30 sales division)

FIG. 25 shows functions employed in this retrieval.

Functions name, age, and division are each evaluated by use of the employee record 2505 as an argument to attain items for contents of the columns 2501, 2503, and 2504 respectively associated with the function names.

A function male-p is processed with the employee record 2505 as an argument to return T if the content of the sex column 2505 indicates male. Otherwise, NIL is returned.

A function connect is evaluated with a database name as an argument to set a database associated therewith to an accessible state.

A function filter is processed with a function as a first argument and with a list as a second argument such that the function of the first argument is applied to each elements of the list of the second argument, thereby returning a list of elements of which the value is other than NIL.

The retrieval operation procedures are as follows.

Procedure (a): The database "employee-list" is set to the accessible state.

Procedure (b): A retrieval is conducted through the database to acquire employee records to employees having an age exceeding 20.

Procedure (c): A retrieval is achieved through the records resultant from the procedure (b) to attain employee records of employees having an age less than 30.

Procedure (d): A retrieval is accomplished through the records resultant from the procedure (c) to obtain employee records of male employees.

Procedure (e): An employee record is selected from the records resultant from the procedure (d) in a random fashion.

Procedure (f): The name column is extracted from the employee record selected in the procedure (e).

Procedure (g): A program associated with the procedures (a) to (f) is executed to acquire about 50 names.

Figure 26:
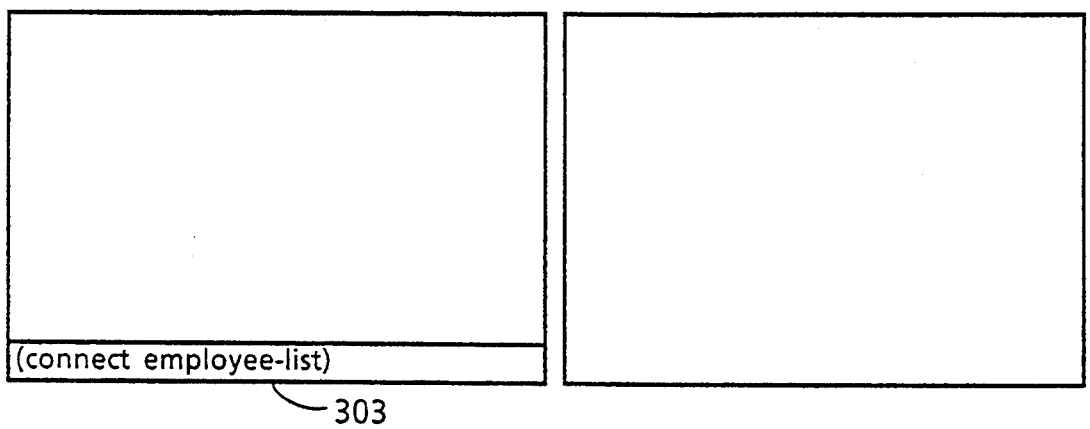
FIGS. 26, 27, 28, 29, 30, 31, 32, 33, 34, 35, 36, 37, 38, 39, 40, 41, 42, 43, 44, 45, and 46 are schematic diagrams each showing screens in other specific examples of an interaction job.

First, as shown in FIG. 26, the operator inputs from the keyboard 310 as S-expression
(connect employee-list)
in the listener 303. The input data items of the S-expression are processed through the step 1609 and the steps 1611 to 1613 of the graphical input routine 102 shown in FIG. 2.

When the CR key 315 is depressed, control returns from the graphical input routine 102 to the top-level loop 100 of FIG. 1 to be passed to the object generating routine 103.

Figure 47:
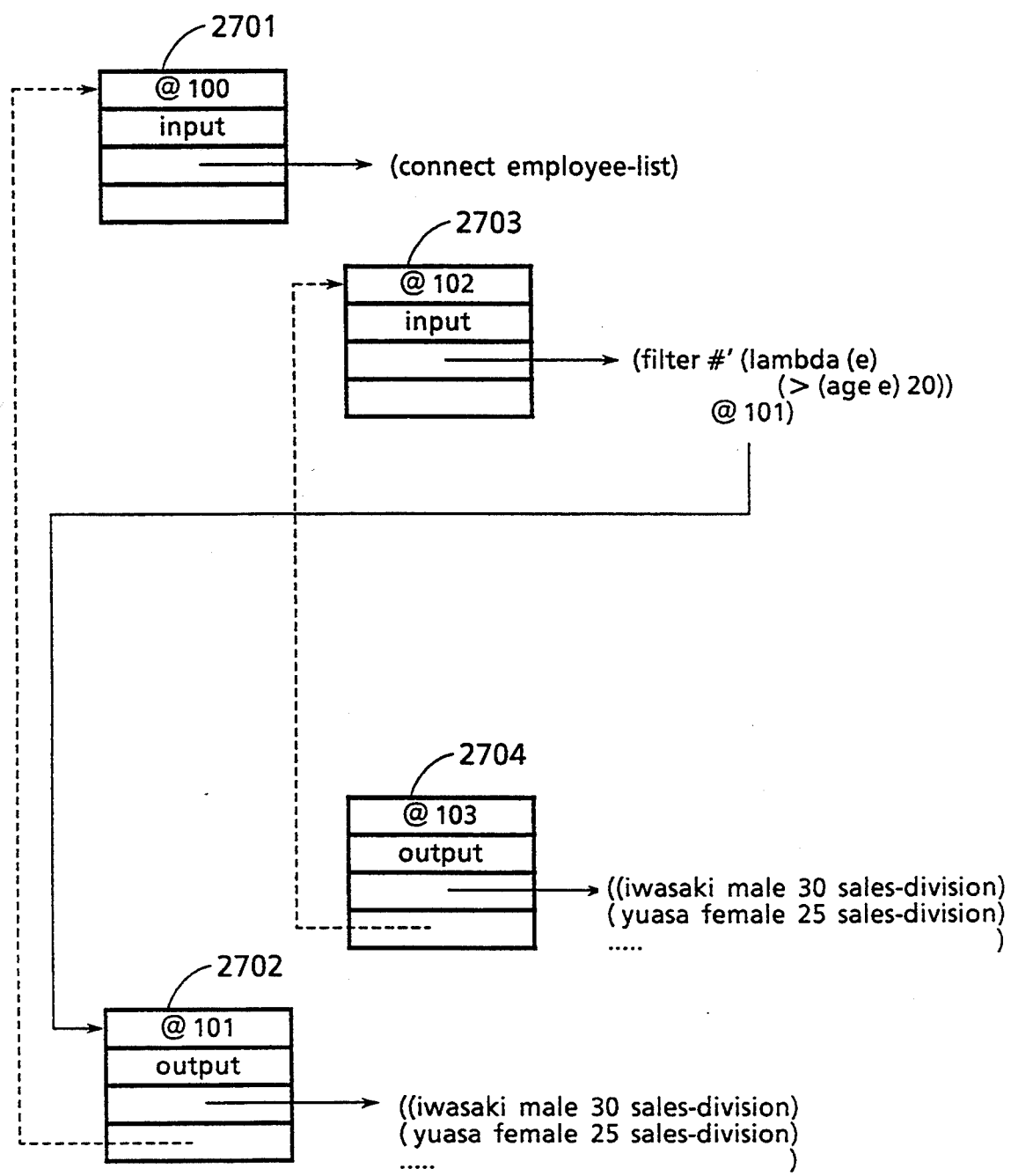
FIG. 47 is a schematic diagram showing a generated object.

The object generating routine 103 creates an object 2701 of FIG. 47 through the processing steps 2002 to 2006 of FIG. 6.

The object 2701 includes an identifier slot loaded with an identifier @100, a type slot containing input, and a body slot loaded with a pointer indicating a storage area of the S-expression in the memory.

Figure 27:
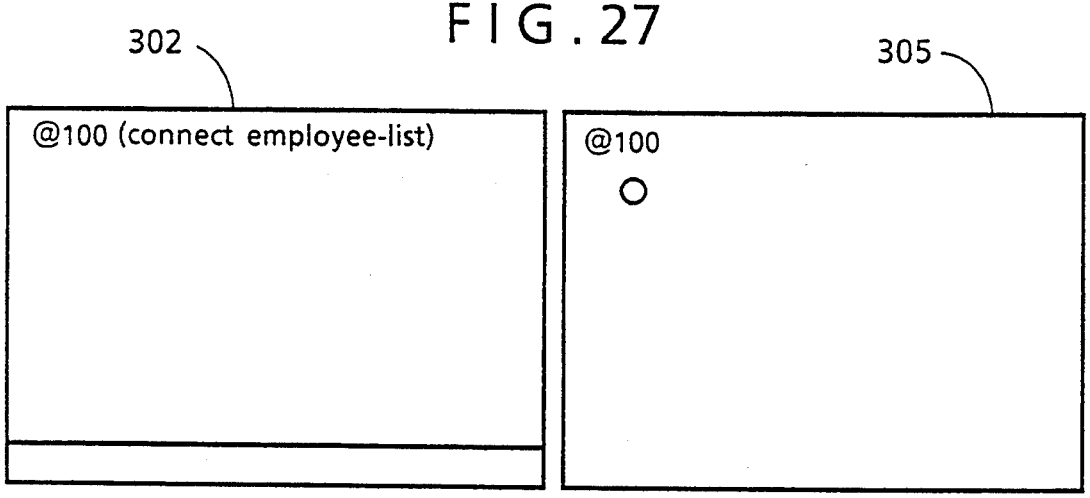

Next, the graphical display routine 104 executes the steps 2102 to 2104 of FIG. 7 to display items as shown in FIG. 27. That is, the S-expression with an identifier @1 is presented in the talker 302 and an icon @100 is displayed in the finder 305. Since the root slot of the object 2701 is empty, the link display is not required.

Subsequently, the S-expression execution processing 107 evaluates
(connect employee-list)
to attain the following values to be returned.

---
((Iwasaki male 30 sales-division)
(Yuasa female 25 general-affaires-division)
(...))
---

The object generating routine 103 creates from the contents of the employee record list an object 2702 of FIG. 47.

In this object 2702, the identifier, type, and body slots respectively contain an identifier @101, output, and a pointer to the employee record list.

Next, the input/output object relationship storage processing 108 loads the root slot of the object with a pointer to a storage area of the object 2701.

Figure 28:
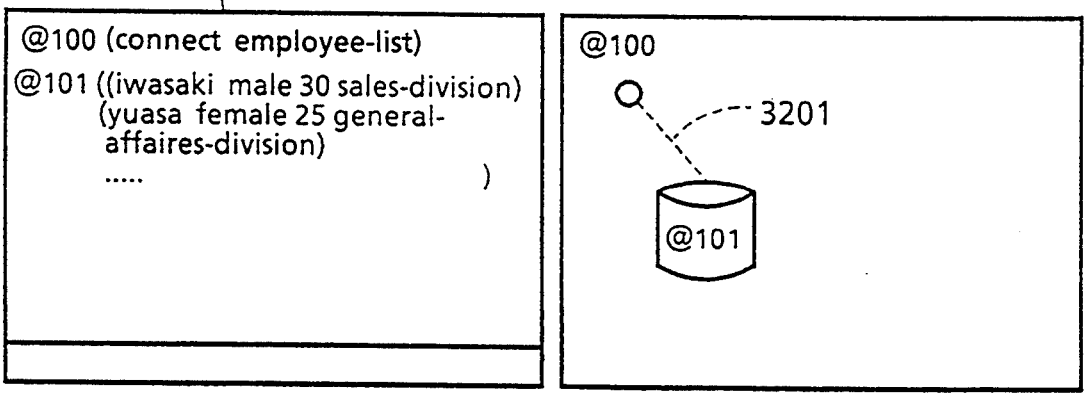

The graphical display routine 104 then displays in the talker 302, as shown in FIG. 28, the employee record list with the identifier @101 according to the object 2702. (However, when the contents of the employee-list exceeds the capacity of data to be presented in a display operation, only the leading portion thereof is presented.) In addition, the icon @101 is displayed in the finder 305; thereafter, a link 3201 is presented therein.

Figure 29:
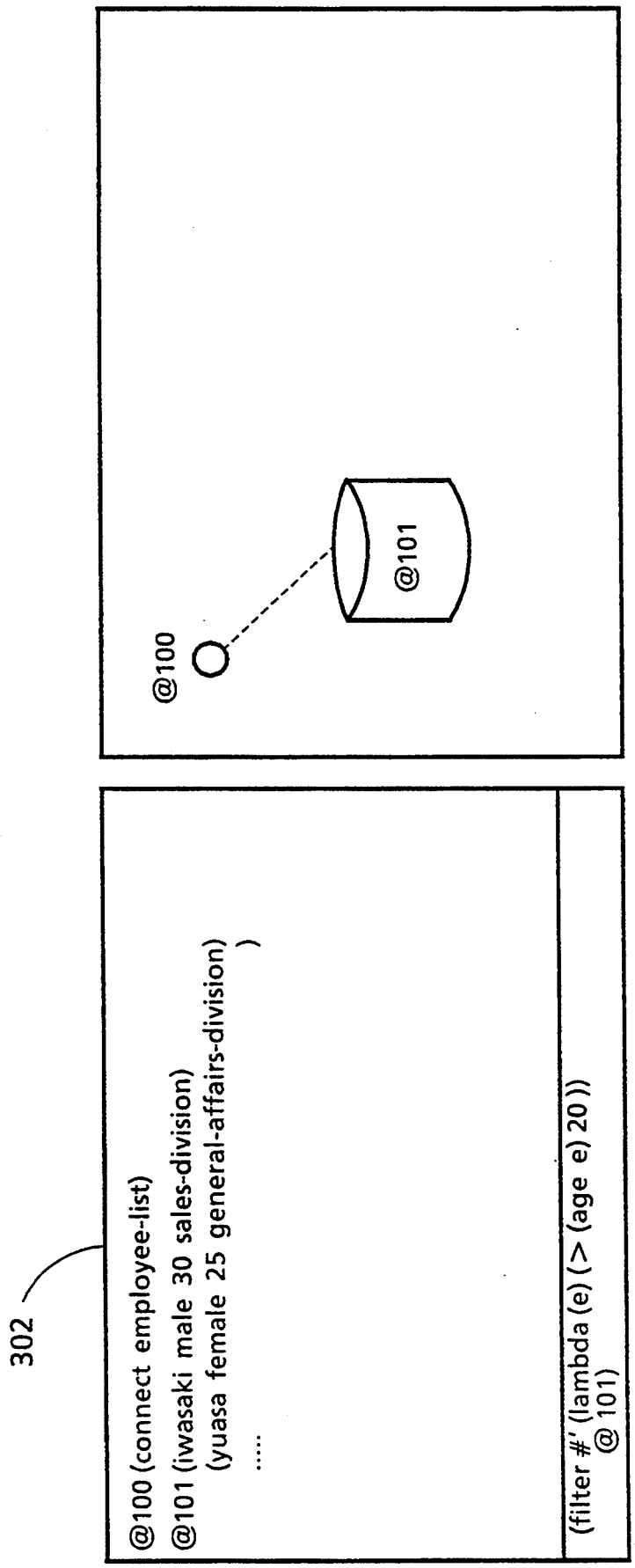

Subsequently, the operator inputs from the keyboard 310, as shown in FIG. 29, an S-expression as ---
(filter #'(lambda (e) (>(age e) 20))
@101)
---

In this situation, in order to specify the object @101 for the argument of the function filter, the F1 key 311 of the keyboard 310 may be depressed once or the double-click operation may be conducted for the icon @101.

Based on the S-expression above the object generating routine 103 produces an object 2703 of FIG. 47.

Figure 30:
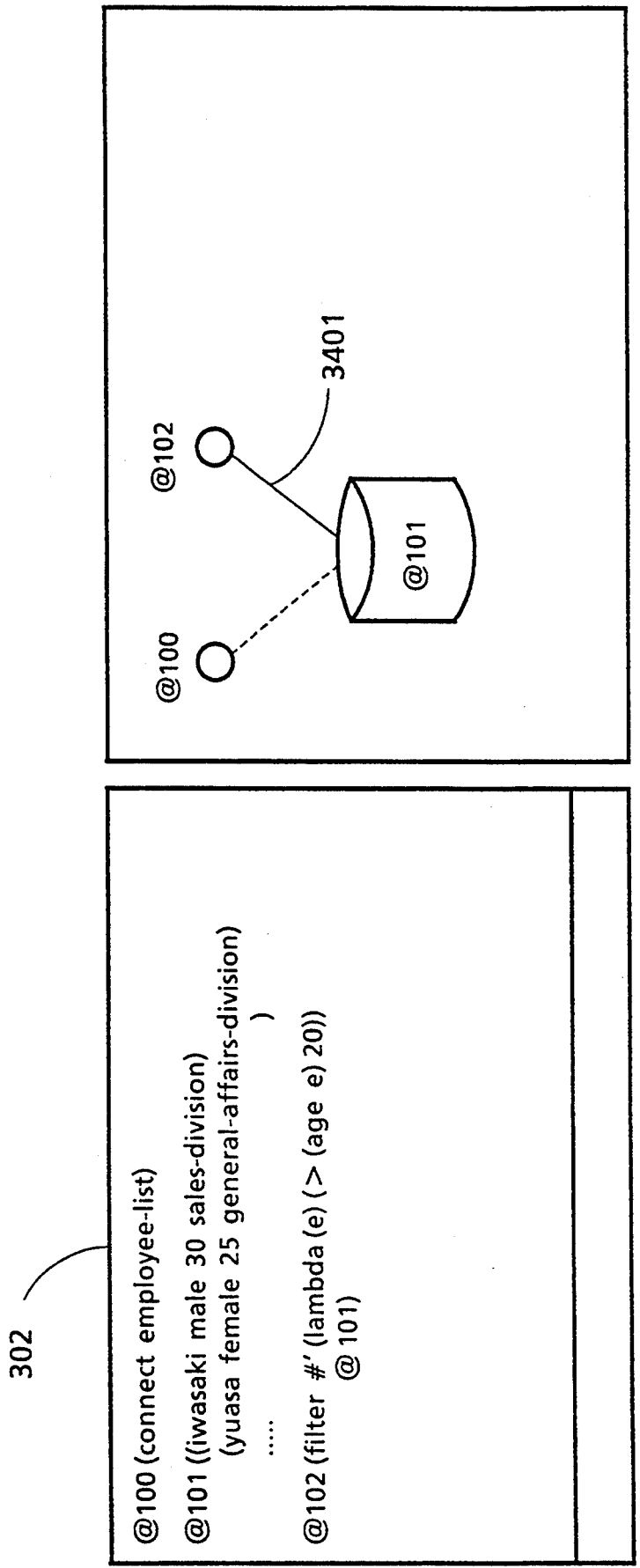

The graphical display routine 104 displays in the talker 302, as shown in FIG. 30, the S-expression with an identifier @102. Moreover, the icon @102 is presented in the finder 305 and then based on the identifier @101 contained in the S-expression, a link 3401 is created to be displayed therein.

Subsequently, the S-expression execution processing 107 evaluates the S-expression to attain the following values to be returned.

---
((Iwasaki male 30 sales-division)
(Yuasa female 25 general-affaires-division)
(...))
---

The object generating routine 103 creates from the values above an object 2704 of FIG. 47.

The I/O object relationship storage processing 108 loads the root slot of the object 2704 with a pointer to the object 2703.

Figure 31:
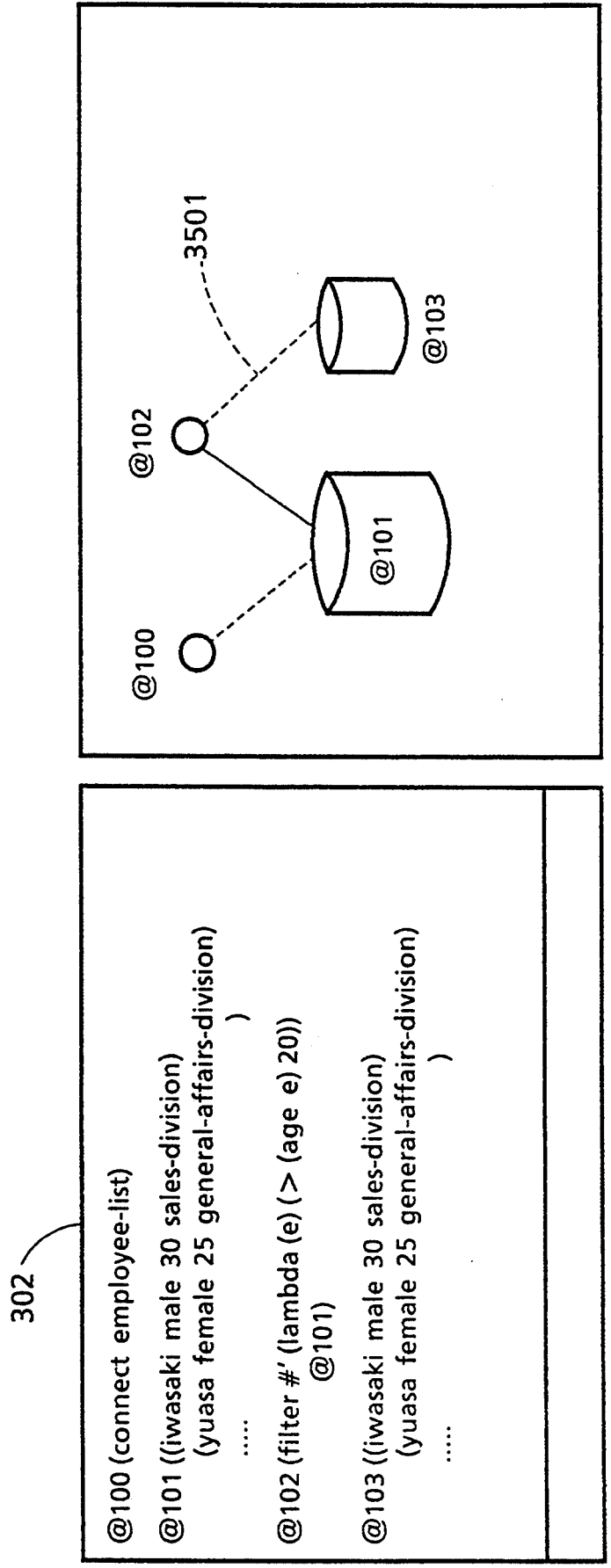
Figure 32:
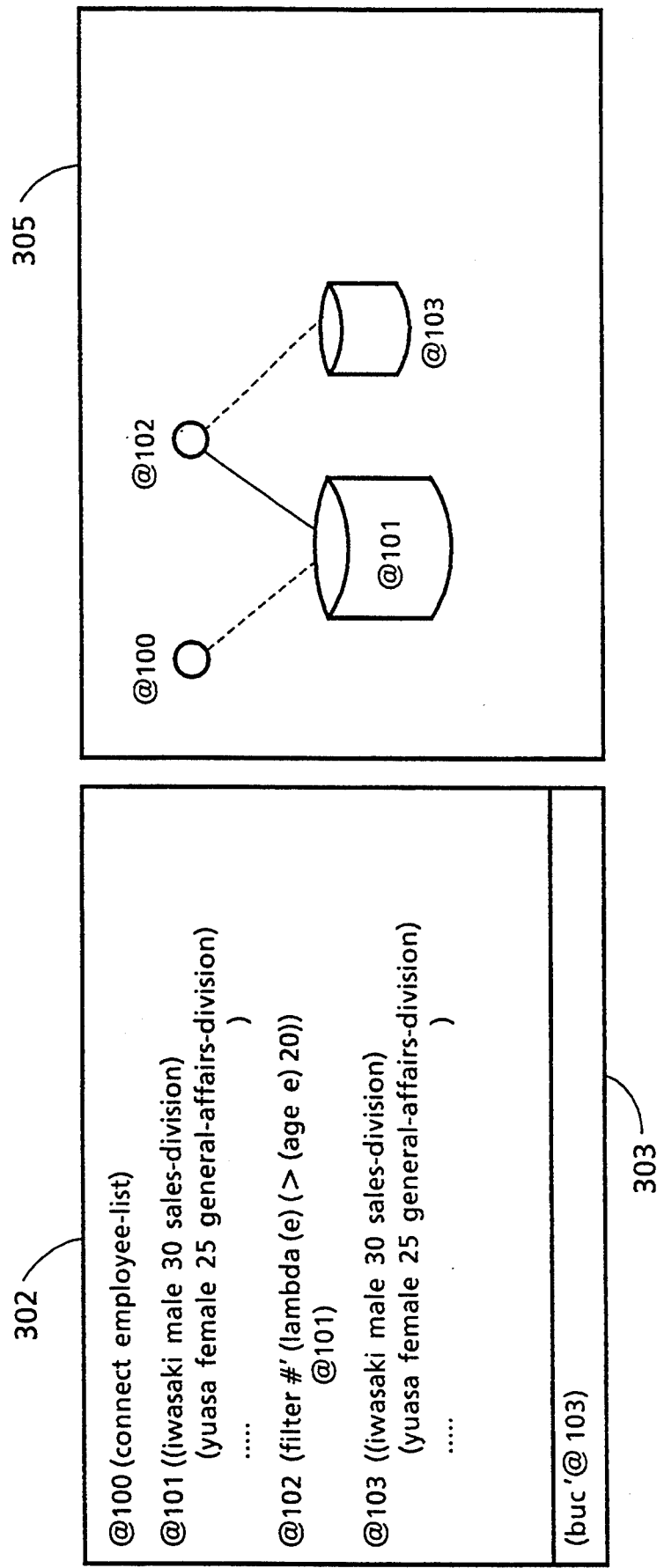

The graphical display routine 104 displays according to the object 2704 a value in the talker 302 and then presents an icon @103 and a link 3501 in the finder 305 as shown in FIG. 31.

Although the operator may ordinarily conduct an input operation as follows for the original purpose of the retrieval.

---
(filter #'(lambda (e) (<(age e) 30))
@101),
--- for convenience of description of the automatic program generating routine 109, the operator inputs an S-expression as follows (step 102).
(buc @103)

In response thereto, an object having an identifier @104 is created (step 103), the S-expression is presented in the talker 302, and the icon @104 and a link (3701 of FIG. 33) are displayed in the finder 305 (step 104).

Since the S-expression contains a function buc, control branches from the step 106 of FIG. 1 to the program generating routine 109.

In this routine, as shown in FIG. 8, the S-expression composing function 2202 is executed by using as an argument the object 2704 specified by the identifier @103.

In the S-expression composing function 2202, as shown in FIG. 9, since the argument is the object 2704 and the object 2704 has the root object 2703, control proceeds through the steps 2301 and 2302 to arrive the step 2303, thereby recursively calling the S-expression composing function 2202 with the root object 2703 set as an argument.

Thereafter, since the argument is the object 2703 not having a root object and the body is a list, control passes through the steps 2301, 2302, and 2305 to enter the step 2308 so as to recursively call the S-expression composing function with each element of the list set as an argument.

In this situation, in the list (filter #'(lambda (e) (>(age e) 20))
@101), the elements preceding @101 are not objects; in consequence, the processing branches from the step 2301 to the step 2306, thereby returning the elements as a result.

The element @101 is the object 2702 having the root object 2701; consequently, control passes through the steps 2301 and 2302 to arrive the step 2303 so as to recursively call the S-expression composing function 2202 by using the root object 2701 as an argument.

In this operation, since the argument is the object 2701 not having a root object and the body is a list, control proceeds through the steps 2301, 2302, and to enter the step 2308 in which with each element of the list set as an argument, the S-expression composing function 2202 is recursively called.

In this situation, since neither one of the elements of the list
(connect employee-list)
is an object, control branches from the step 2301 to the step 2306, which returns the elements as a result.

In the step 2309, the returned result is used to form a list.

Finally, the is obtained a result as follows.

(filter #'(lambda (e) (>(age e) 20))
(connect employee-list))

The loop-developing function 2203 achieves the processing of FIG. 10 with the S-expression set as an argument; however, the S-expression does not contain
(FUNC (example FORM))
and hence control transfers from the step 2402 to the step 2403 to return the S-expression as a result. Thereafter, control returns to the routine of FIG. 8 to branch therefrom to the routine of FIG. 1.

The object generating routine 103 processes the S-expression to create an object having an identifier @105.

The I/O object relationship storage processing 108 loads the root slot of the object having the identifier @105 with a pointer to the object having the identifier @104.

Figure 33:
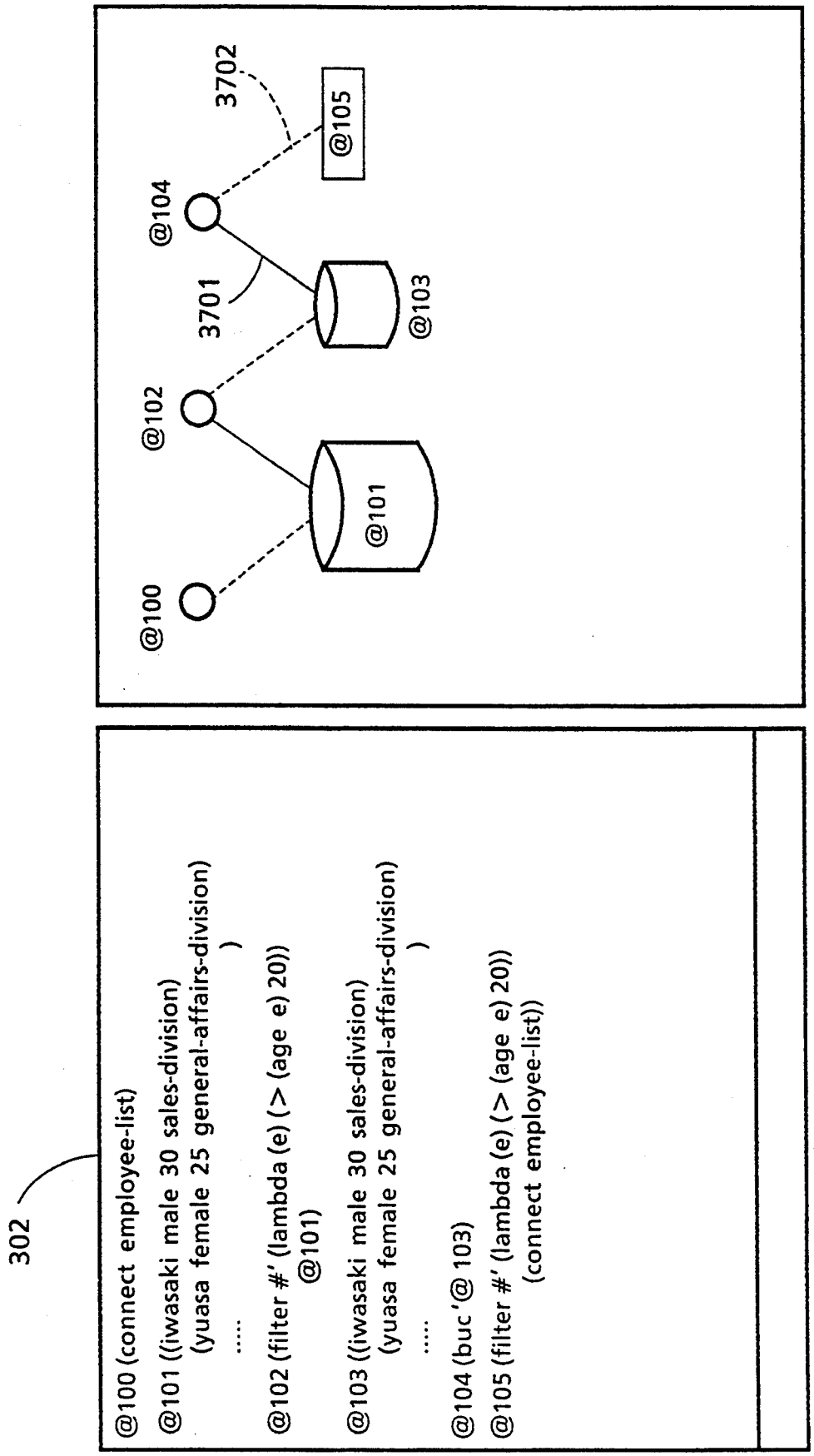

The graphical display routine 104 displays, as shown in FIG. 33, the S-expression with the identifier @105 in the talker 302 and presents the icon @105 and a link 3702 in the finder 305.

The icon here has a contour selected to designate a property of the object.

Figure 34:
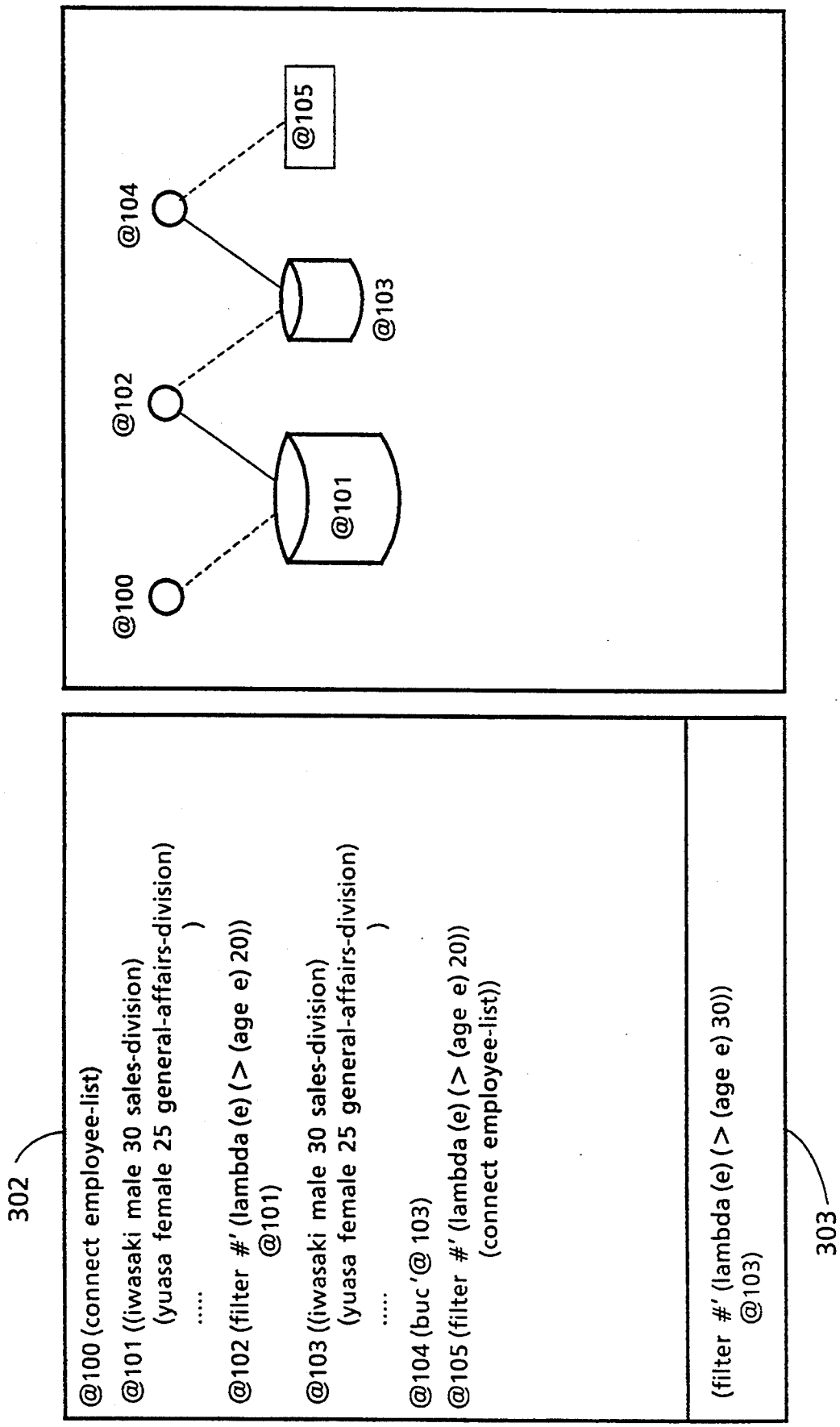

Next, in order to achieve the original object of the retrieval, the operator inputs the following S-expression as shown in FIG. 34.

(filter #'(lambda (e) (<(age e) 30))
@103)

In response thereto, the object generating routine 103 produces an object with an identifier @106.

The graphical display routine 104 displays the S-expression with the identifier @106 in the talker 302 and presents the icon @106 and a link (3901 of FIG. 35) in the finder 305.

Next, the S-expression execution processing 107 is executed to evaluate the S-expression so as to attain the following result to be returned.

((Yuasa female 25 general-affairs-division)
(Mori male 24 development-division)
...)

From the values above, the object generating routine 103 creates an object with an identifier @107.

The I/O object relationship storage processing 108 stores a pointer to the object having the identifier @106 in the root slot of the object having the identifier @107.

Figure 35:
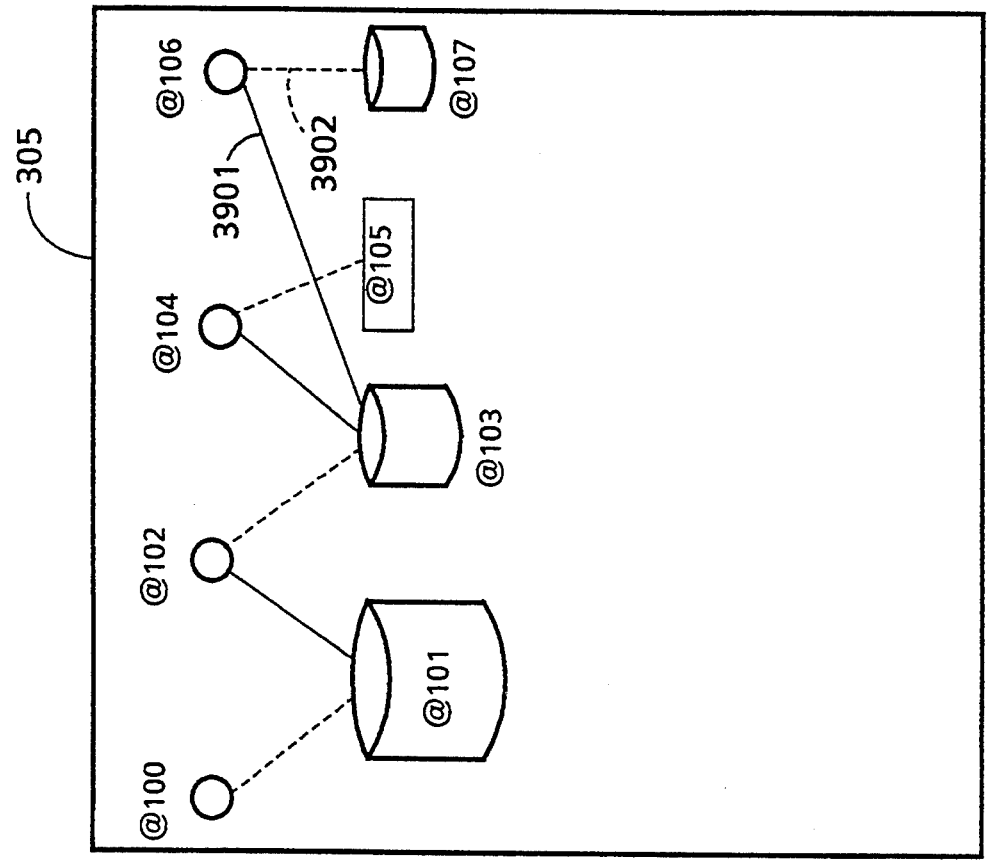

Based on the object assigned with the identifier @107, the graphical display routine 104 displays, as shown in FIG. 35, the values in the talker 302 and presents the icon @107 and a link 3902 in the finder 305.

Figure 36:
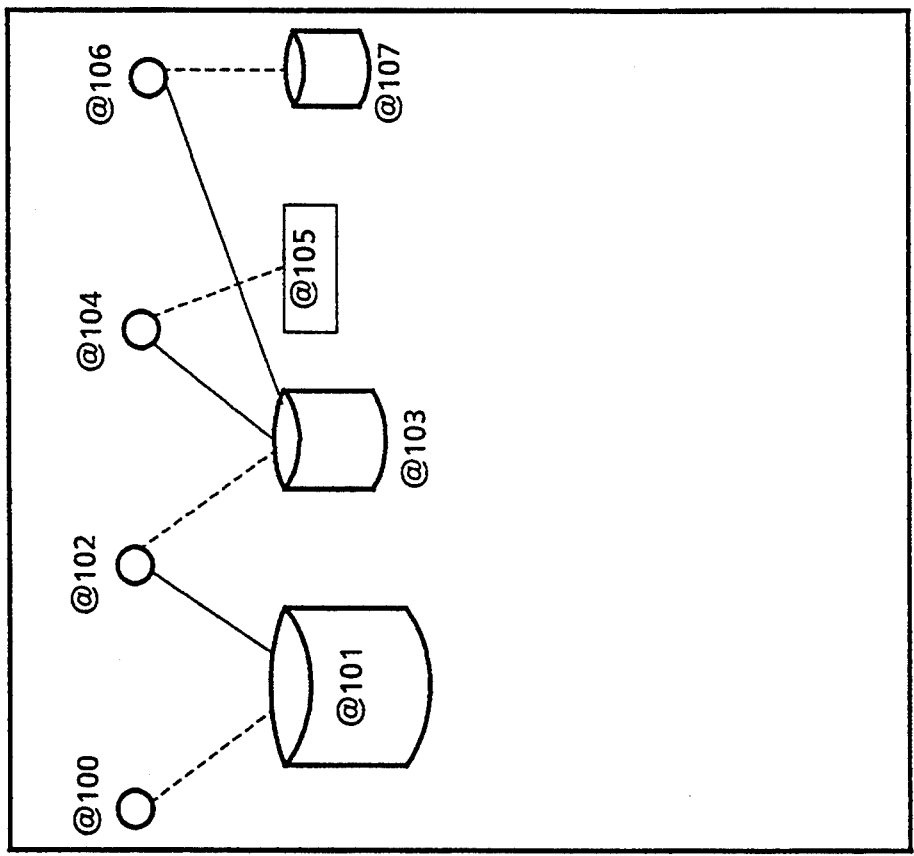

Subsequently, the operator inputs an S-expression as shown in FIG. 36
(filter #'male-p @107).

For this input, the object generating routine produces an object with an identifier @108.

The graphical display routine 104 displays the S-expression with an identifier for the object having the identifier @108 in the talker 302 and presents the icon @106 and a link (4101 of FIG. 37) in the finder 305.

Thereafter, the S-expression execution processing 107 is conducted to evaluate the S-expression so as to obtain resultant values to be returned as follows.
((Mori male 24 development-division)
(Takamoto male 25 sales-division)
...)

The object generating routine 103 processes these values to generate an object assigned with an identifier @109.

The I/O object relationship storage processing 108 stores a pointer to the object having the identifier @108 in the root slot of the object having the identifier @109.

Figure 37:
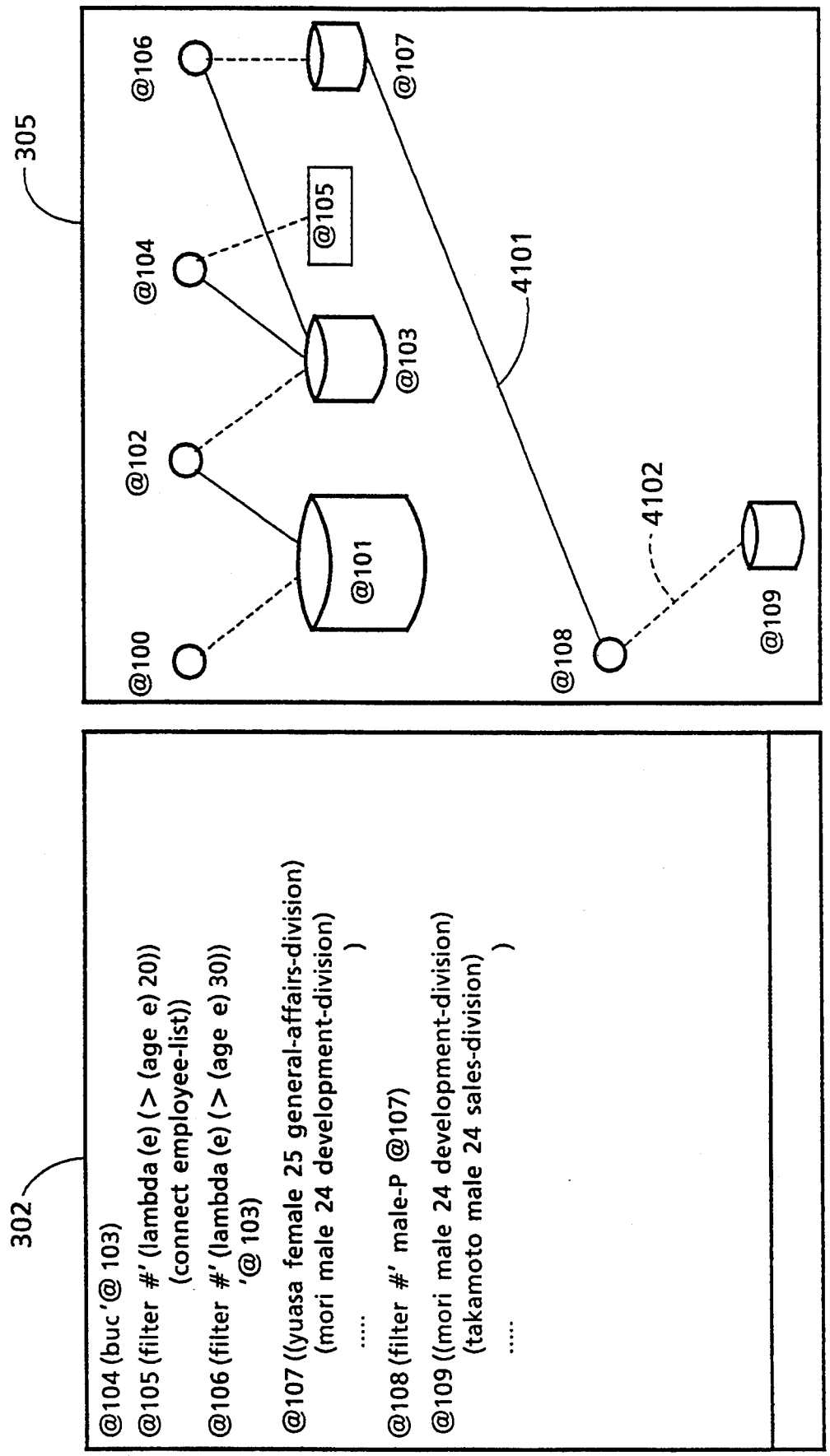

Based on the object assigned with the identifier @109, the graphical display routine 104 displays, as shown in FIG. 37, the values in the talker 302 and presents the icon @109 and a link 4102 in the finder 305.

Figure 38:
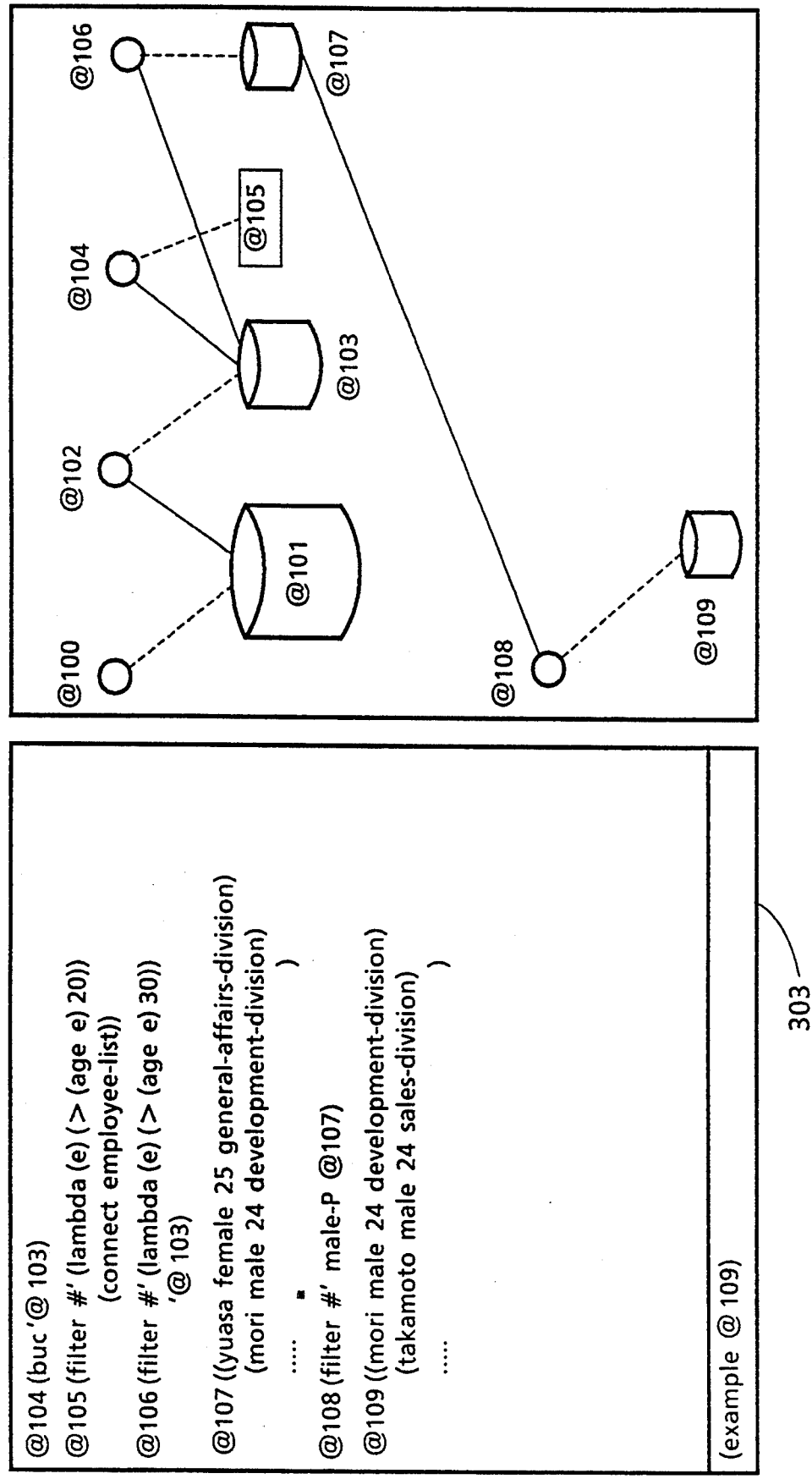

Subsequently, for the original purpose of the retrieval, the operator should input for the object having the identifier @109 an S-expression (in this connection, to attain a list of about 50 employees, the number of resultant employees to be displayed need be further controlled depending on cases)
(name @102)

however, for convenience of explanation of the loop developing function 2203, an S-expression
(example @109)
is inputted (step 102) as shown in FIG. 38.

In response thereto, the object generating routine 103 creates an object with an identifier @110.

For the object assigned with the identifier @110, the graphical display routine 104 displays an S-expression with an identifier associated therewith in the talker 302 and presents the icon @110 and a link (link 4301 of FIG. 39) in the finder 305.

Subsequently, the S-expression execution processing 107 is executed to evaluate the S-expression so as to attain resultant values to be returned as follows. (Mori male 24 development-division)

The object generating routine 103 generates based on these values an object with an identifier @111.

The I/O object relationship storage processing 108 stores a pointer to the object having the identifier @110 in the root slot of the object having the identifier @111.

Figure 39:
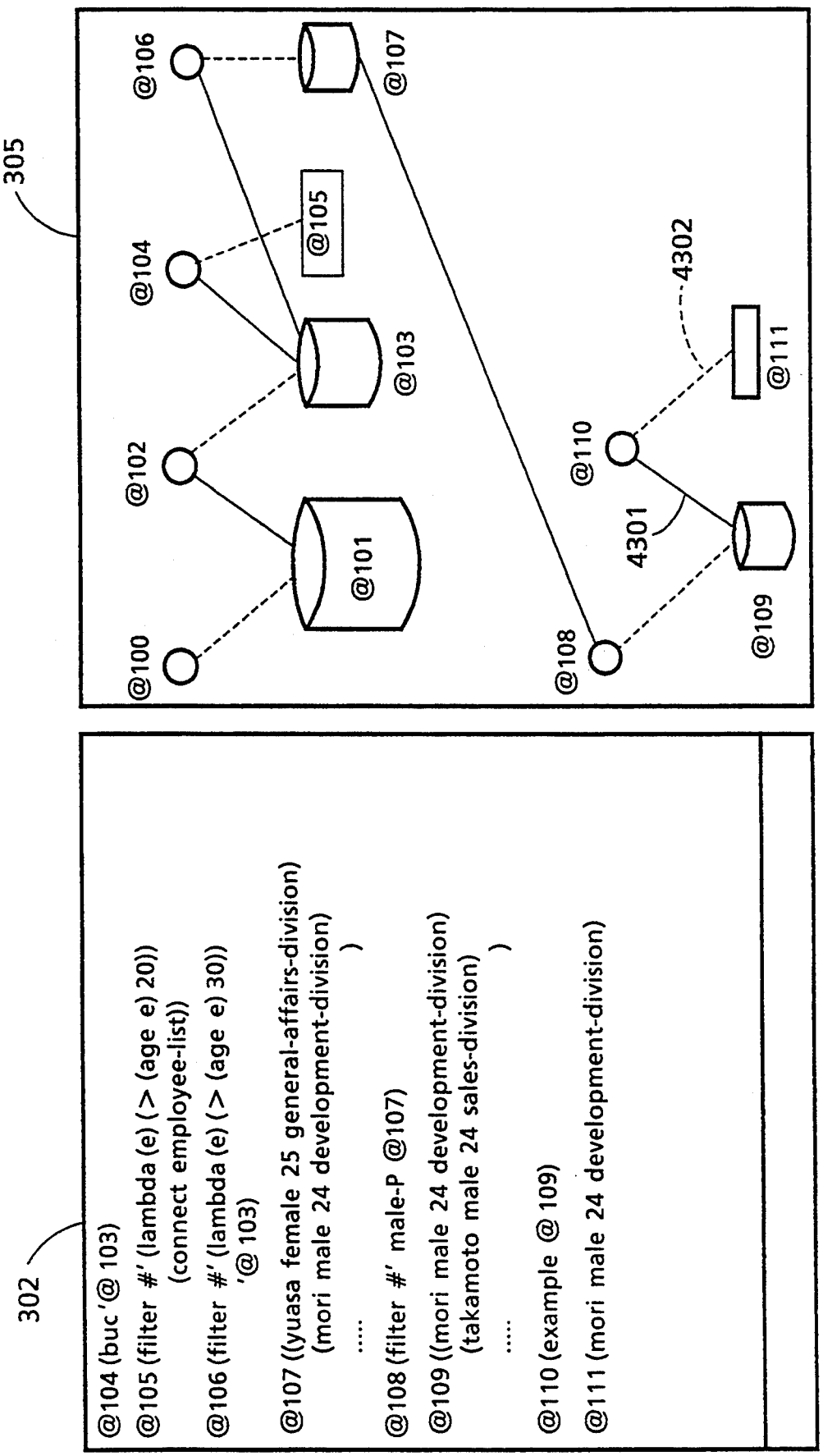

Based on the object assigned with the identifier @110, the graphical display routine 104 displays, as shown in FIG. 39, the values in the talker 302 and presents the icon @110 and a link 4302 in the finder 305.

Figure 40:
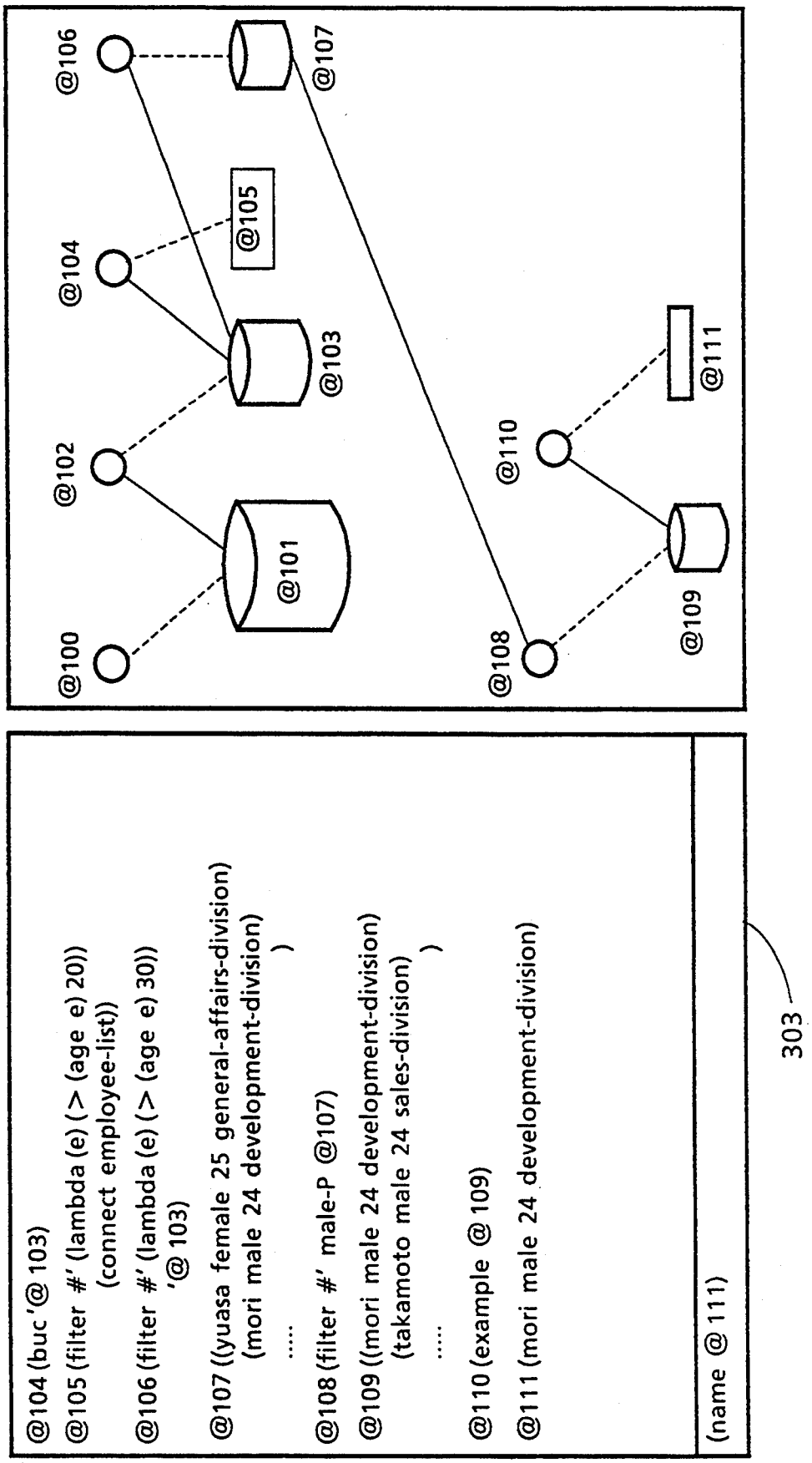

Next, as shown in FIG. 40, the operator inputs an S-expression (name @111).

In response to the input, the object generating routine 102 creates an object assigned with an identifier @112.

Figure 41:
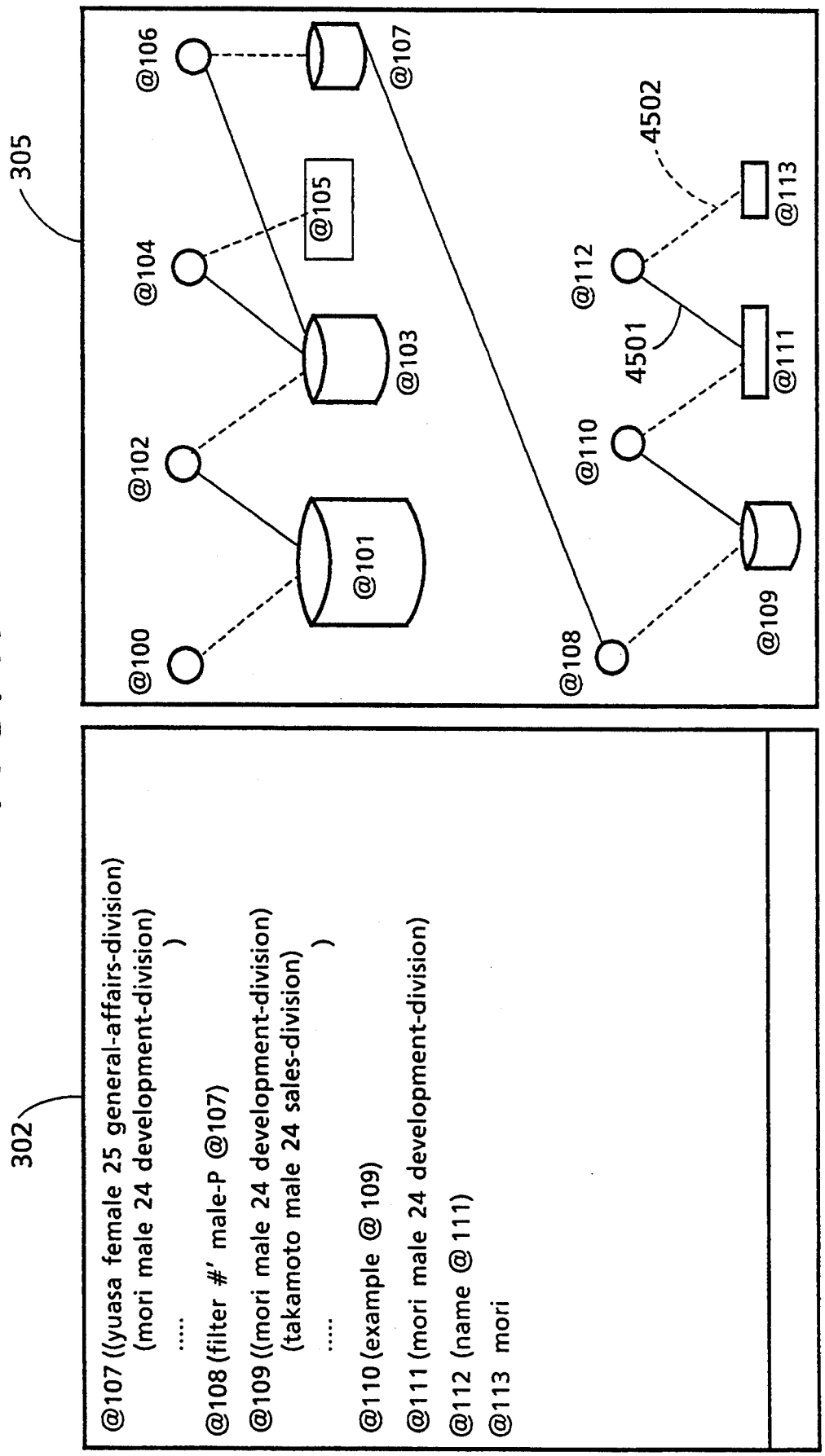

For the object with the identifier 8112, the graphical display routine 104 displays an S-expression with an identifier associated therewith in the talker 302 and then presents the icon @112 and a link (link 4501 of FIG. 41) in the finder 305.

Subsequently, the S-expression execution processing 107 evaluates the S-expression to attain a resultant value to be returned as follows. Mori The object generating routine 103 generates based on the value an object with an identifier @113.

The I/O object relationship storage processing 108 stores a pointer to the object having the identifier @112 in the root slot of the object assigned with the identifier @113.

Based on the object with the identifier @113, the graphical display routine 104 displays, as shown in FIG. 40, the result in the talker 302 and presents the icon @113 and a link 4502 in the finder 305.

Figure 42:
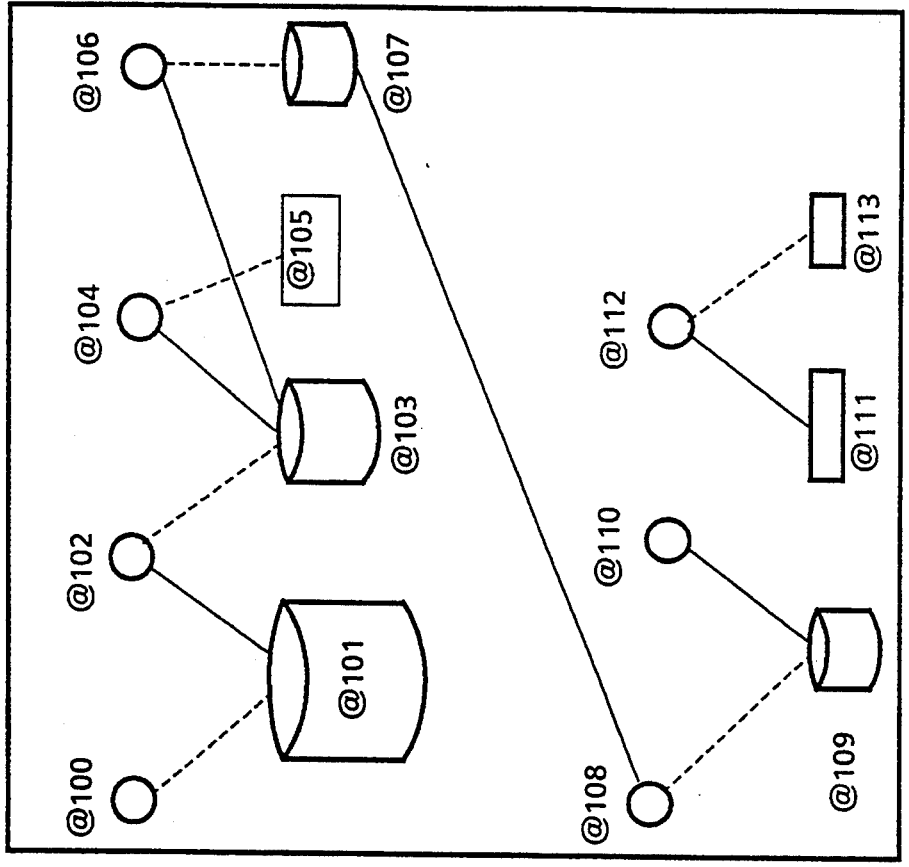

Subsequently, in order to generate a program, the operator inputs an S-expression
(buc '@113)
as shown in FIG. 42.

In response to the input, the object generating routine 102 produces an object with an identifier @114.

The graphical display routine 104 displays, for the object assigned with the identifier @114, an S-expression with an identifier associated therewith in the talker 302 and then presents an icon @114 and a link (4701 of FIG. 43) in the finder 305.

Next, the automatic program generating routine 109 is called.

In the automatic program generating routine 109, the S-expression composing function 2202 supplies an S-expression of FIG. 48 as follows (name (example (filter #'male-p
 (filter #'(lambda(e) (<(age e) 30))
 (filter #'(lambda(e) (>(age e) 20))

-continued (connect employee-list))))).

In the loop developing function 2203, because of presence of a pattern
(FUNC (example FORM)),
control proceeds from the step 2402 to the step 2404 to recursively call the loop developing function with FORM set as an argument.

In other words, with the following S-expression of FIG. 49 set as an argument, (name (example (filter #'male-p
 (filter #'(lambda(e) (<(age e) 30))
 (filter #'(lambda(e) (>(age e) 20))
  (connect employee-list))))

the loop developing function 2203 is recursively called. However, the pattern above is missing in the S-expression and hence control passes from the step 2402 to the step 2403, thereby returning the S-expression as a result.

In the step 2405, the S-expression attained as the result is substituted for FORM'.

Thereafter, the step 2406 creates an S-expression of FIG. 50

(mapcar #'name (filter #'male-p
 (filter #'(lambda(e) (<(age e) 30))
 (filter #'(lambda(e) (>(age e) 20))
  (connect employee-list)))))

so as to return the S-expression as a result.

Based on the result, the object generating routine 103 produces an object with an identifier @115.

The I/O object relationship storage processing 108 loads the root slot of the object having the identifier @115 with a pointer to the object with the identifier @114.

Figure 43:
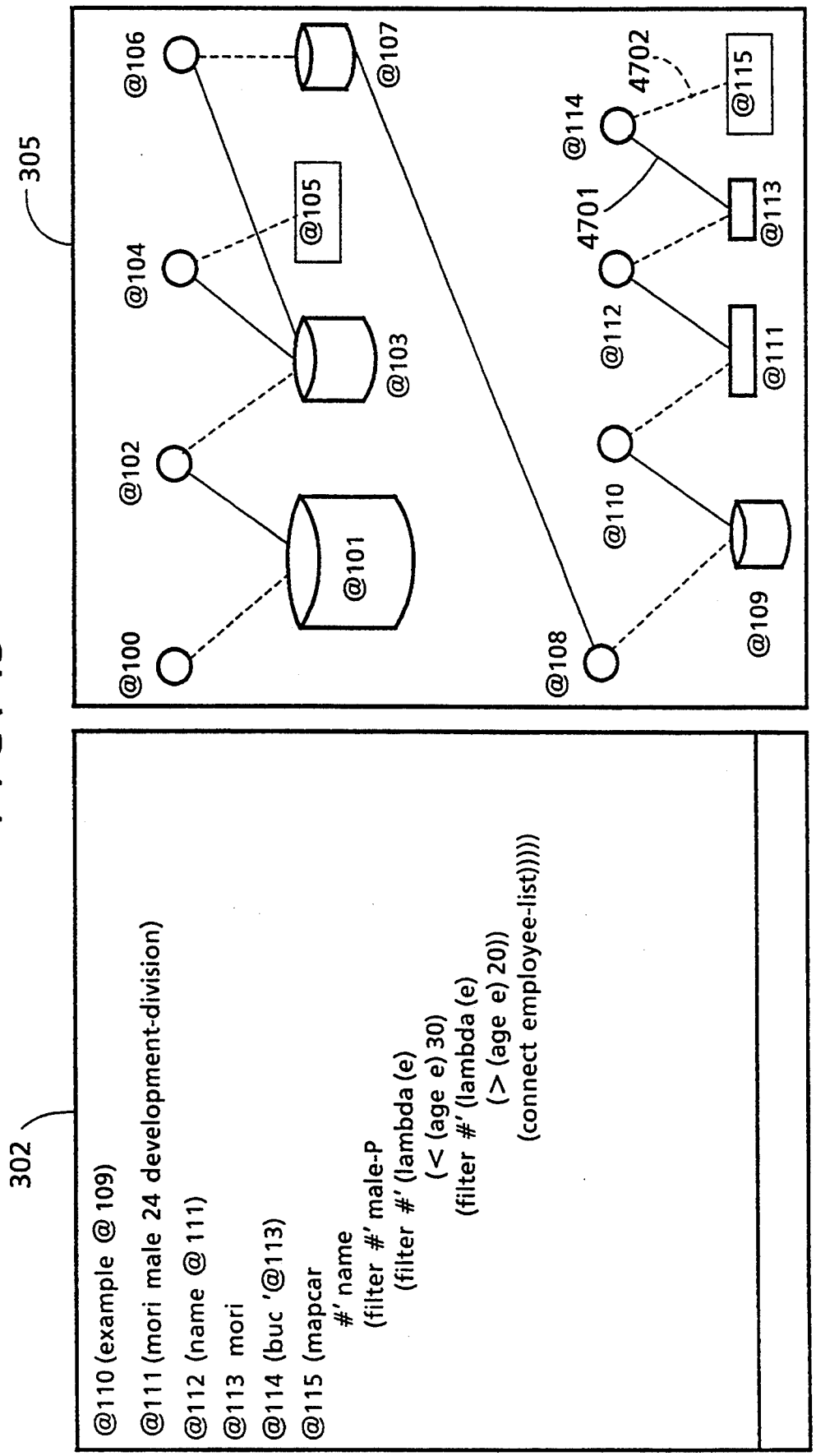

As shown in FIG. 43, the graphical display routine 104 displays, for the object with the identifier @115, the values in the talker 302 and then presents an icon @115 and a link 4702 in the finder 305.

The S-expression with the identifier @115 thus attained is a program developing a function equivalent to the function of the sequence of procedures adopted to produce the object with the identifier @113.

Subsequently, in order to achieve the inherent purpose of the retrieval operation, a check is first made to determine the number of elements contained in the object with the identifier @109. Namely, the operator inputs an S-expression
(length @109).

As a result, an object with an identifier @116 is created, a graphical display is conducted in association with the operation, and then a resultant S-expression is evaluated to attain a value 1872.

Based on the result, an object with an identifier @117 is produced, an I/O object relationship is stored in relation to the operation, and a graphical display is carried out to present the result.

In a situation where an employee list of about 50 employees is to be obtained, the value above is to be reduced.

To cope with this situation, the processing range of employees is limited to the sales division. The operator consequently inputs an S-expression

```
(filter #'(lambda (e) (eq (division e) 'sales-division))
        @109).
```

As a result, an object with an identifier @118 is created, a graphical display is achieved for the operation, and then the S-expression is evaluated to obtain values as follows.

```
((Takagi male 25 sales-division)
 (Niki male 26 sales-division)
    ...)
```

Namely, the system generates an object with an identifier @119, stores I/O object relationships related to the operation, and accomplishes a graphical display for the result.

In order to determine the number of elements included in the object with the identifier @119, the operator inputs an S-expression
(length @119).

For this input, an object with an identifier @120 is created, a graphical display is achieved for the operation, and then the S-expression is evaluated to obtain a value
48.

This results in a generation of an object with an identifier @119, a storage of I/O object relationships related to the operation, and a graphical display for the result.

The value 48 is suitable for an operation to produce an employee list of about 50 employees and hence the operator inputs an S-expression
(example @119).

In response to the input, an object with an identifier @122 is created, a graphical display is achieved for the operation, and then the S-expression is evaluated to obtain values
(Niki male 26 sales-division)

As a result, the system generates an object with an identifier @123, stores I/O object relationships related to the operation, and accomplishes a graphical display for the result.

Subsequently, the operator inputs an S-expression
(name @123).

In response thereto, an object assigned with an identifier @124 is produced, a graphical display is achieved in association with the operation, and the S-expression is evaluated to attain a value
Niki.

Figure 44:
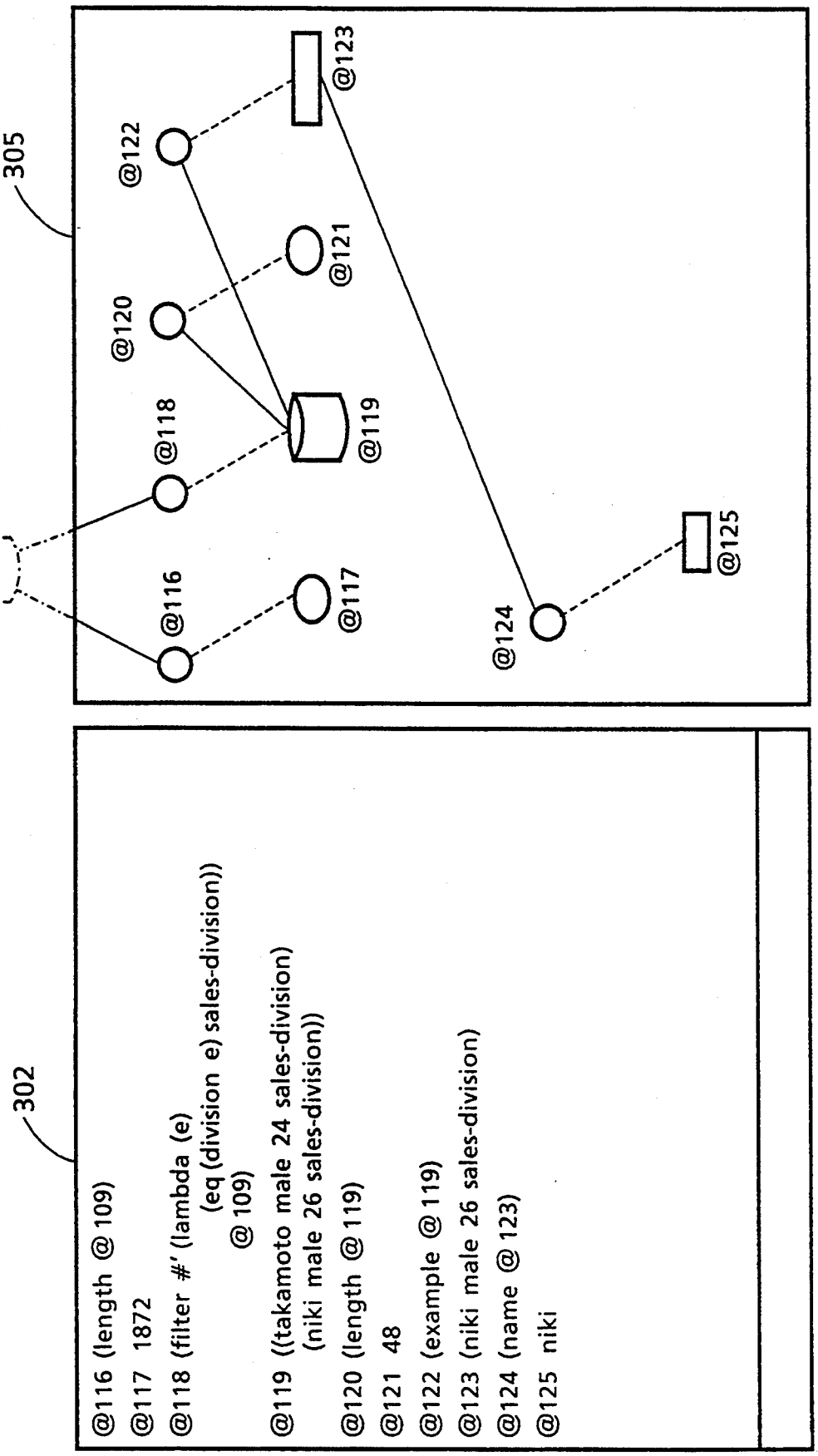
Figure 45:
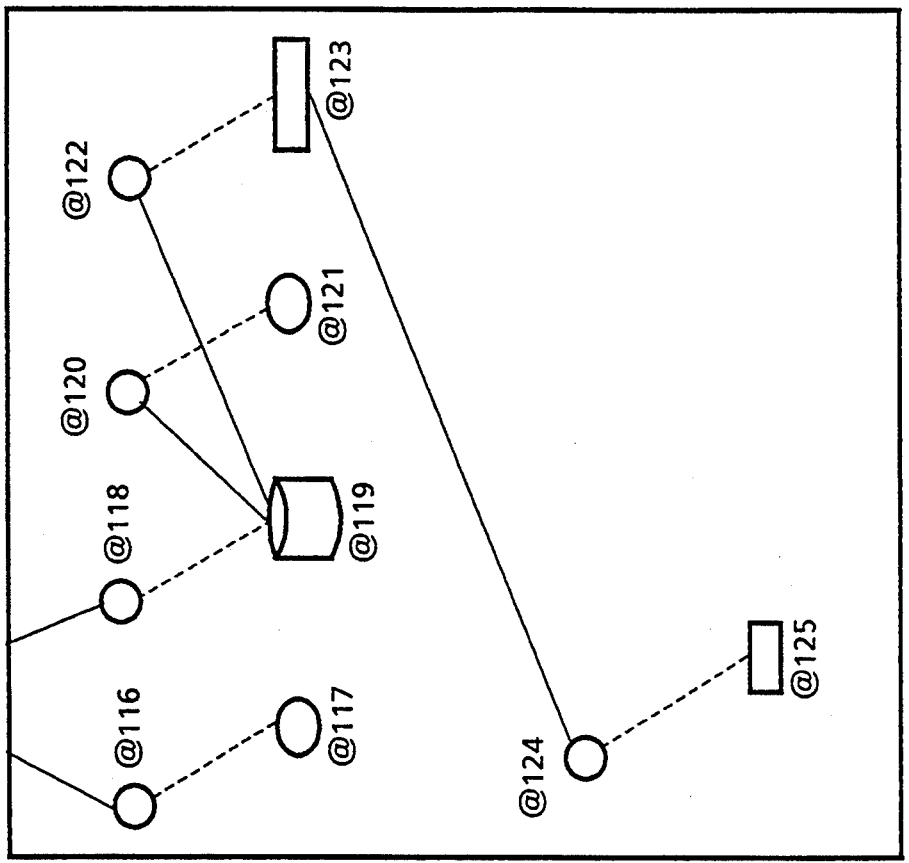

Thereafter, the system creates an object with an identifier @125, memorizes input/output object relationships thereof, and conducts a graphical display of the result. FIG. 44 shows a display screen presenting the state above.

Next, in order to generate a program having a function equivalent to the procedures above, the operator inputs an S-expression
(buc '@125)

Resultantly, an object with an identifier @126 is produced to be displayed on the screen.

Using as an argument the object having the identifier @125, the system calls the automatic program generating routine 109.

This routine 109 then returns an S-expression of FIG. 51 as a result.

```
(mapcar # ∝ name
  (filter #'(lambda (e) (eq (division e) 'sales-division))
  (filter #'male-p
    (filter #'(lambda (e) (<(age e) 30))
    (filter #'(lambda (e) (>(age e) 20))
      (connect employee-list))))))
```

Figure 46:
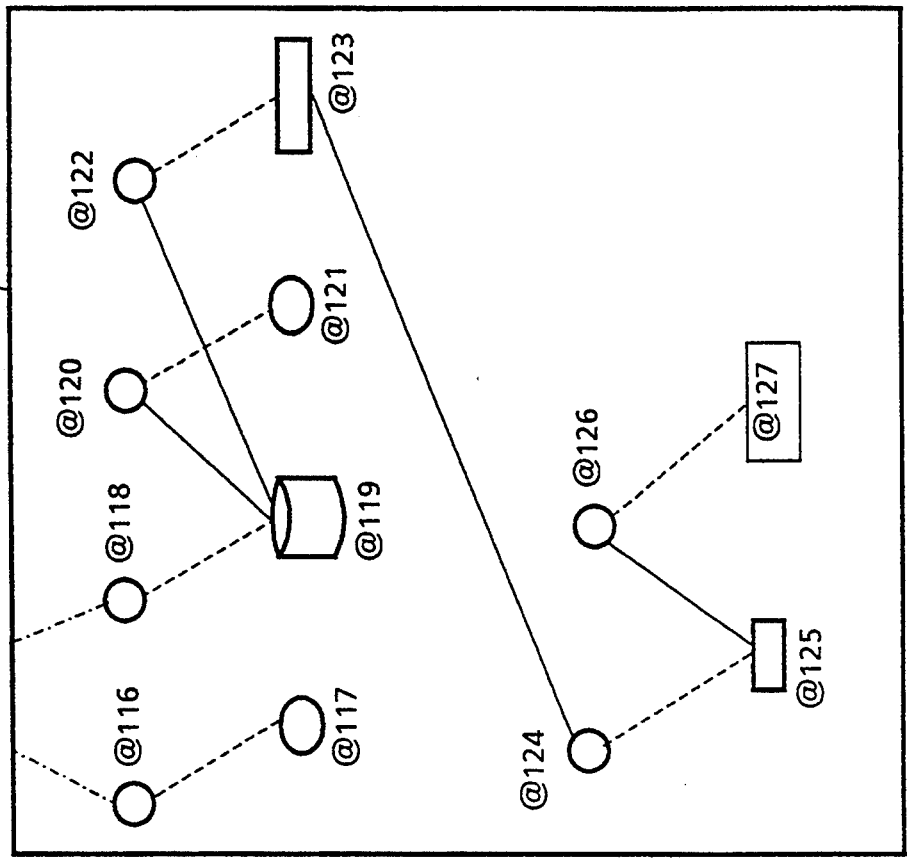

As a result, an object with an identifier @127 is generated, input/output object relationships thereof are memorized, and a graphical display is accomplished in association therewith. FIG. 46 shows a screen display state in this situation.

Namely, the S-expression with the identifier @127 is a program having a function equivalent to the sequence of procedures employed to produce the object @125.

In this regard, in the automatic program generating routine 109, the S-expression composing function 2202 is processed along chaining relationships between objects as follows.

@125⇒@124→@123⇒@122→@119⇒@118→@1-
09⇒@108→@107⇒@106→@103⇒@102→@101-⇒
@100, where ⇒ and → stand for a generation relationship and a reference relationship, respectively.

The objects @110, @111, @112, and @113 are missing in the chaining relationships between these objects. Namely, it will be understood that even if operations unnecessary for a program have been achieved, such operations are not reflected onto the program generated as a result.

In addition, the embodiment 1 has been described in conjunction with a case where each time an input or output is accomplished, an input command, data referenced by the input command, and relationships associated with a result of an execution of the command are memorized. However, also in an interaction processing method in which only an input command and a result of an execution thereof are memorized, namely, the relationships are not stored in a memory, the automatic program generating method according to the present invention may possibly be implemented by analyzing at an automatic program generation the input command, the data referenced by the input command, and the result of an execution of the command based on the memorized input command and execution result.

Embodiment 2

In the program generating method of the embodiment 1, when an arbitrary one of the memorized execution results is specified, an entire sequence of command strings employed to produce the specified result are processed to automatically create a program. Description will now be given of an embodiment 2 in which based on a portion of the sequence of command strings, a program can be generated.

Figure 52:
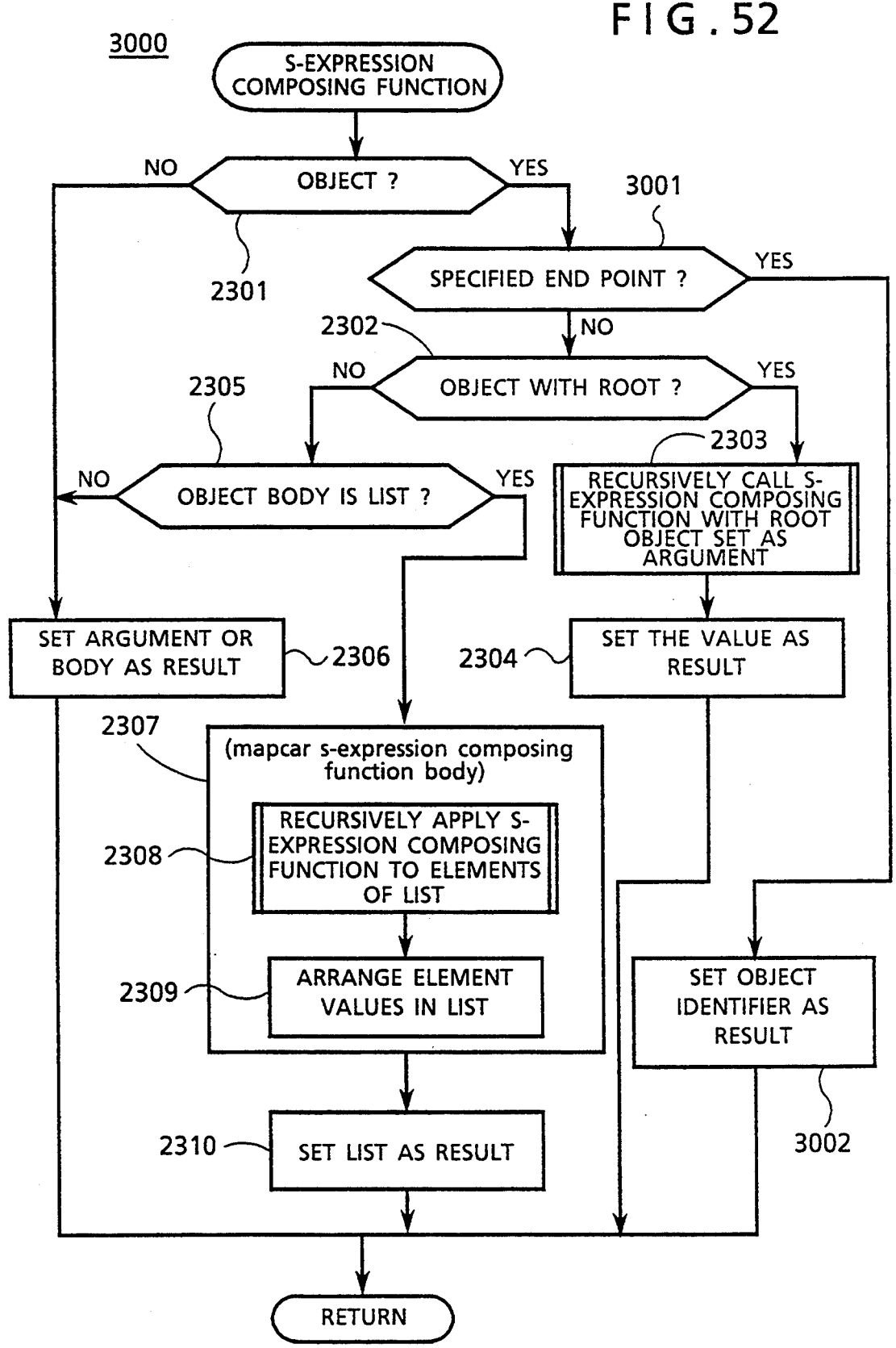
FIG. 52 is a flowchart of another example of the S-expression composing function according to the present invention.

According to the automatic program generating method of the embodiment 2, in the automatic program generating routine 109 shown FIG. 8 of the embodiment 1, the S-expression composing function 2202 of FIG. 9 is substituted for an S-expression composing function 3000 of FIG. 52.

In the operation to trace the chaining relationships between objects in the S-expression composing function 2202 of the embodiment 1, an object which does not have a root object and which does not reference other object is regarded as an end point of the chaining relationships. Namely, the chained objects are traced in a recursive manner until such an end point object is detected. In contrast therewith, according to the S-expression composing function 3000 of the embodiment 2, when an operator specifies an end point of the chaining relationships, the trace operation through the chained objects is stopped at the specified object. If such an end point is not specified, this function 3000 achieves the same processing as the S-expression composing function 2202.

Referring now to FIG. 52, a description will be given of the processing of the S-expression composing function 3000.

The operator specifies an end point in advance. A plurality of objects may be arbitrarily specified as end points. In the embodiment 2, a list of end points are set as a global variable "end-point-list".

In the operation of the S-expression composing function 3000, like in the S-expression composing function 2202, a check is first made to determine whether or not the argument is an object 2600 (step 2301). If this is not the case, the argument is directly set as a result (step 2306) and then control is returned to the routine 109 of FIG. 8.

If the argument is an object 2600, the end point list is referenced to decide whether or not the object is an end point designated by the operator (step 3001). If this is the case, an identifier of the object is set as a result (step 3002) and then control is transferred to the routine 109 of FIG. 8; otherwise, the processing is continued in the similar manner as for the S-expression composing function 2202.

Description will next be given in detail of the operations of the respective routines when a program is created by using the S-expression composing function based on a specific example of a retrieval operation through the data base of the embodiment 1. For example, let us assume here that from the sequence of command series which produce the result @125 of the sequence of database retrieval operations of the embodiment 1, the commands associated with retrievals achieved under the conditions of the age range through the procedures (a) to (c) are removed to attain a sequence of remaining command series so as to generate a program from the resultant command sequence. FIG. 53 shows a result of the operations above successively conducted after the retrieval of the embodiment 1, which is presented in the screen including the talker 302, the listener 303, and the finder 305.

As shown in FIG. 53, in order to specify the result of the procedure (c) as an end point, the operator first inputs an S-expression
(setq end-point-list '(@107)).
In response thereto, an object @128 is produced to be displayed on the screen. Moreover, the S-expression is executed to create an object @129 from a result of the execution.

For a program generation, the operator next inputs an S-expression
(buc '@125).
This results in an object @130 generated and displayed on the screen.

In the execution of the S-expression, the automatic program generating routine 109 is called such that with the object specified by the identifier @125 set as an argument, the S-expression composing function 3000 is called. In the processing steps of the S-expression composing function 3000, the argument is an object which is other than the specified end point @107 and which has a root object. Consequently, control passes through the steps 2301, 3001, and, 2302 to enter the step 2303 to call the S-expression composing function in a recursive manner. Thereafter, according to the flowchart of FIG. 52, the processing is achieved in a similar fashion.

Meanwhile, with the object specified by the identifier @107 set as an argument, the S-expression composing function is called. In this situation, since the argument is an object which is an end point registered to the end point list, the processing proceeds through the steps 2301 and 3001 to enter the step 3002, thereby returning the identifier @107 as a result.

After the sequence of recusive call operations of the S-expression composing function above, there is finally attained as a result an S-expression of FIG. 54 as follows.

(name (example
  (filter #'(lambda (e)
    (eq (division e) 'sales-division))
  (filter #'male-p @107)))

Thereafter, like in the case of the embodiment 1, with the S-expression set as an argument, the loop developing function 2203 is recursively called. The loop developing function 2203 is recursively called. The loop developing function 2203 returns an S-expression of FIG. as a result (mapcar #'name
  (filter #'(lambda (e)
    (eq (division e) 'sales-division))
  (filter #'male-p @107))).

This S-expression represents a value attained by executing the S-expression associated with the object @130. Based on the value, an object #131 is generated to be displayed on the screen.

The obtained S-expression does not use the processing constituting a portion of the S-expression shown in FIG. 53 which retrieves the database "Employee-list" to acquire employee records of the employees having an age not less than 20 and not more than 30. Namely, the result @107 attained from the execution of the processing above is employed in the S-expression.

As described above, according to the automatic program generating method using the S-expression composing function 3000, in a case where an automatic program generation is accomplished by specifying an arbitrary execution result, when the sequence of command series producing the result includes a command achieving quite a heavy or long processing, the execution result of the command need only be specified as an end point of the chaining relationships. As a result, there can be automatically created a program in which the command is not executed again, namely, in which the command execution result is referenced.

In this connection, the embodiment 2 has been described in conjunction with an example in which an end point is set as a global variable to be referenced so as to make a check for determining whether or not the end point is identical to that specified by the operator. However, the end point may be specified as an argument of a BUC command.

Embodiment 3

In the program created in accordance with the automatic program generating method of the embodiment 1, the sequence of command series previously executed are reproduced in the original form. In contrast therewith, according to the embodiment 3, an intermediate portion of a sequence of command series may possibly be replaced with other command series to create a program of command series previously executed.

The automatic program generating method of the embodiment 3 is configured as follows. Namely, in the automatic program generating routine 109 of FIG. 8 associated with the embodiment 1, the S-expression composing function 2202 of FIG. 9 is substituted for an S-expression composing function 3100 of FIG. 56.

The S-expression composing function 3100 of the embodiment 3 is processed as follows. In a case where the operator specifies a change point and a change destination for a trace route of the chaining relationships, when control reaches an object designated as the change point of the trace route, an actual chaining relationship related to the point is ignored. Namely, a chaining relationship is regarded to be established to an object denoted as the change destination of the trace route, thereby continuing the trace operation of the chaining relationships. When the operator does not specify such items above, the processing is accomplished in the similar manner as for the S-expression composing function 2202.

The automatic program generating method to be realized by adopting the S-expression composing function will now be described according to a specific example of a retrieval executed on the database of the embodiment 1.

In the retrieval of the embodiment 1, there is produces a program in which the database "Employee-list" is accessed to generate a list containing names of male employees belonging to the sales division and having an age not less than 20 and not more than 30. After this point, when producing a program to gather names of female employees of the sales division under the same age condition, the processing is different from the operation procedure of the embodiment 1 only with respect to the procedure (d) retrieving the male employees. In this case, according to the automatic program generating method of the embodiment 1, the operations after the procedure (d) are required to be entirely conducted again. In accordance with the automatic program generating method of the embodiment 3 utilizing the S-expression composing function, the objective program can be created as follows without re-inputting and without re-executing the commands previously executed.

First, records of female employees are retrieved from the records resultant from the procedure (c) (i.e. employees records of employees having an age not less than 20 and not more than 30). Namely, the following processing is executed.

Procedure (d'): Retrieve records of female employees from the results attained by the procedure (c) of the embodiment 1.

Subsequently, the execution results respectively of the procedures (d) and (d') are respectively specified as a change point of the trace route and a change destination of the trace route, thereby finally generating the program.

Figure 56:
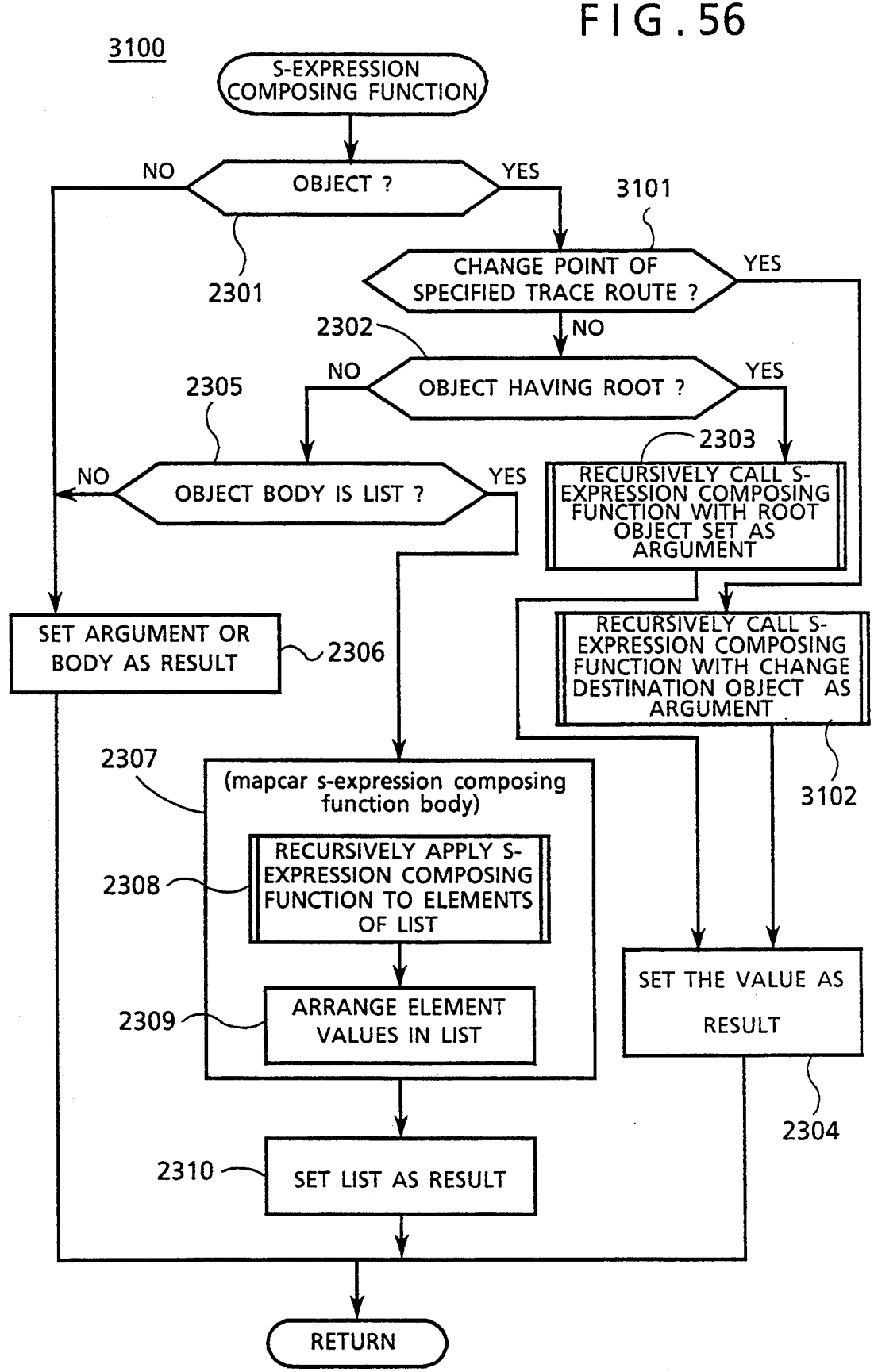
FIG. 56 is a flowchart of further another example of the S-expression composing function according to the present invention.

Utilizing the flowchart of FIG. 56, the processing of the S-expression composing function 3100 will be described.

The operator beforehand designates a set of a change point and a change destination of the trace route in the chaining relationships. An arbitrary number of such sets may be specified. The designated items are registered to a gloval variable "change-point-list".

The S-expression composing function 3100 first makes a check, like the S-expression composing function 2202, to determine whether or not the argument is an object 2600 (step 2301). If this is not the case, the argument is set as a result (step 2306) and then control returns to the routine 109 of FIG. 8.

If the argument is an object 2600, the change-point-list is referenced to decide whether or not the object is a change point of the trace route specified by the operator (step 3101). If this is the case, an object of the change destination set in the change-point-list is used as an argument to recursively call the S-expression composing function 3100. Otherwise, the processing is continued in the same fashion as for the S-expression composing function 2202.

Description will now be given of the operations of the respective routines used to create a program employing the S-expression composing function 3100. More concretely, the operations will be described by referring to a specific example creating a program which accesses the database "employee-list" to attain a list of names of female employees of the sales division having an age not less than 20 and more than 30.

In this operation, as described in conjunction with the embodiment 1, there is first generated a program which accesses the database "employee-list" to attain a list of names of male employees of the sales division having an age not less than 20 and more than 30 so as to thereafter generate a program which collects names of female employees of the sales division satisfying the same age condition. When the operation above is accomplished after the retrieval of the embodiment 1, the system displays screen images of the talker 302, the listener 303, and the finder 305 as shown in FIGS. 57 and 58.

Figure 57:
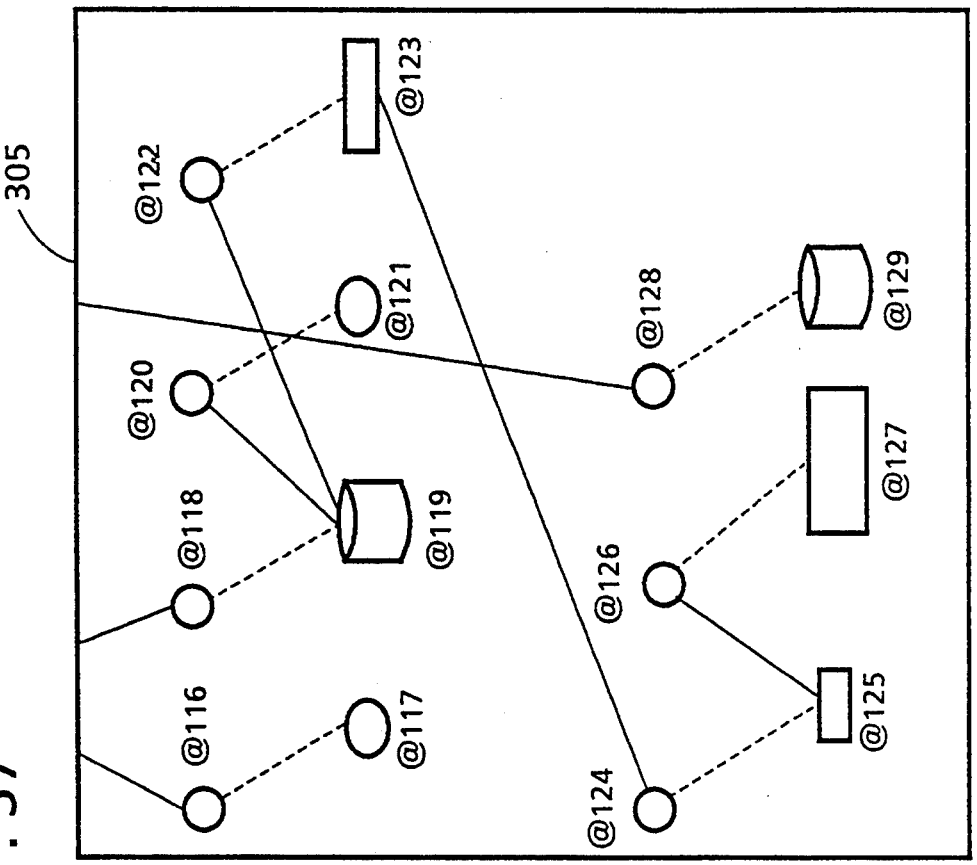
FIGS. 57 and 58 are diagrams each showing screens in specific examples of an interaction job when the S-expression composing function of FIG. 56 is used.
Figure 58:
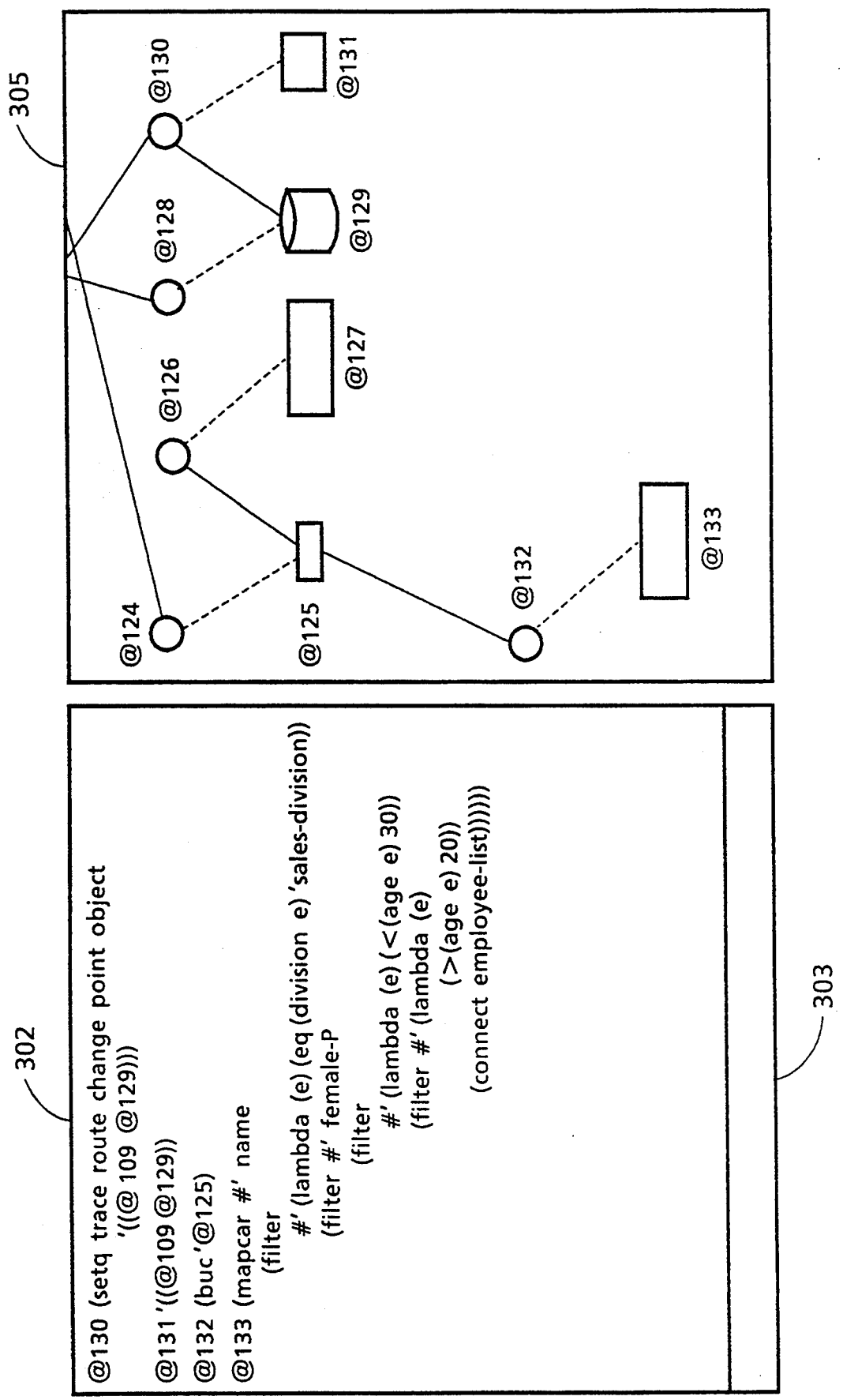

As can be seen from FIG. 57, in order to execute the procedure (d'), the operator first inputs an S-expression (filter @'female-p @107).

In response thereto, an object @128 is created to be presented on the display screen. Moreover, the S-expression is executed to attain a value, which is processed to produce and display an object @129 on the screen.

Next, in order to generate a program with the result of the procedure (d') in place of the result of the procedure (d), the operator inputs an S-expression
(setq change-point-list '((@109 @129))),
thereby establishing the change-point-list. Based on the input items of the S-expression and values resultant from an execution of the S-expression, objects @130 and @131 are created to be presented on the screen.

Thereafter, for a program generation, the operator inputs an S-expression
(buc '@125). Resultantly, an object @132 is produced to be presented on the display.

In the execution of the S-expression, the automatic program generating routine 109 is called such that the routine 109 in turn calls the S-expression composing function 3100 with the object specified by the identifier @125 set as an argument. In the S-expression composing function 3100, since the argument is an object which is not the specified change point @107 and which has a root object, control passes through the steps 2301, 3101, and 2302 to reach the step 2303 so as to recursively call the S-expression composing function 3100. After this step, the processing is accomplished in a similar manner described in conjunction with the flowchart of FIG. 56.

Meanwhile, the object designated by the identifier @109 is set as an argument to call the S-expression composing function.

In this operation, since the argument is an object which is a specified change point, control proceeds through the steps 2301 and 3101 to enter the step 3102 so as to reference the change-point-list, thereby examining an object of the change destination. In this case, the change destination is an object designated by the identifier @129 and hence the object is set as an argument to recursively call the S-expression function 3100.

Figures 59, 60, 61:
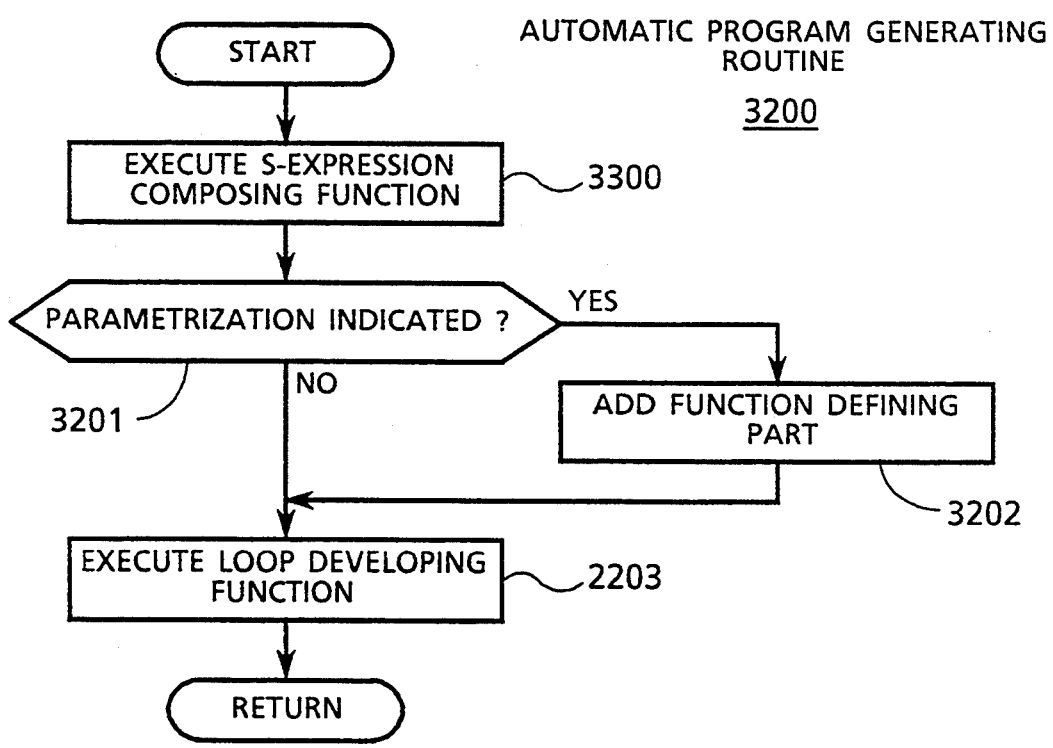
FIGS. 59 and 60 are diagrams each showing examples of the S-expression in a case where the S-expression composing function of FIG. 56 is adopted.
FIG. 61 is a flowchart of an alternative example of the automatic program generating routine according to the present invention.

As above, through a sequence of recursive calls of the S-expression composing function, a final result is attained and returned as follows (FIG. 59).

```
(name
  (example
    (filter
      #'(lambda (e) (eq (division e) 'sales-division))
      (filter #'female-p
        (filter
          #'(lambda (e) (<(age e) 30))
          (filter
            #'(lambda (e) (>(age e) 20))
            (connect employee-list)))))))
```

Thereafter, like in the embodiment 1, the S-expression is set as an argument to call the loop developing function 2203 in a recursive fashion. In response to this operation, the loop developing function 2203 returns as a result an S-expression (FIG. 60)

```
(mapcar #'name
  (filter
    #'(lambda (e) (eq (division e) 'sales-division))
    (filter #'female-p
      (filter
        #'(lambda (e) (<(age e) 30))
        (filter
          #'(lambda (e) (>(age e) 20))
          (connect employee-list)))))).
```

The attained S-expression represents a value resultant from an execution of the S-expression of the object @132. Based on the value, an object @133 is created to be presented on the screen.

As above, according to the automatic program generating method employing the S-expression composing function 3100, in a case where an automatic program generation is to be achieved by specifying an arbitrary one of the execution results, an intermediate portion of a sequence of command series generating the result may be replaced with another sequence of command series separately prepared, thereby obtaining the objective program.

In this regard, in the example of the embodiment 3, the sets of objects associated with change points and change destinations of the trace route are set to a global variable such that the global variable is referenced to create a program. However, the sets of objects may be denoted as arguments of a BUC command for the program generation.

Embodiment 4

As described in conjunction with the embodiment 3, a program produced according to the automatic program generating method of the embodiment 1 reproduces with a high fidelity the sequence of command series previously executed. A description will now be given of an embodiment 4 according to the present invention in which results of preceding executions are represented in the form of parameters to produce a program in a generalized fashion.

The automatic program generating method of the embodiment 4 is configured as follows. Namely, the automatic program generating routine 109 of the embodiment 1 is substituted for an automatic program generating routine 3200 of FIG. 61 and the S-expression composing function 2202 is replaced with an S-expression composing function 3300 of FIG. 62.

In an execution of the S-expression composing function 3200 of the embodiment 4, when an object specified for parameterization by the operator is detected, the trace of the chaining relationships is terminated. When the operator does not specify such an object to be parameterized, the processing is achieved in a similar manner as for the S-expression composing function 2202.

Referring now to FIGS. 61 an 62, a description will be given of the operations of the automatic program generating routine 3200 and the S-expression composing function 3300.

The operator first inputs a set of a function name of a function to be created, an object to be parameterized, and a parameter adopted for the parameterization. An arbitrary number of such sets may be specified. In the embodiment 4, a list of the sets is registered to a global variable "parameterization-list".

As can be seen from FIG. 61, the automatic program generating routine 3200 first calls the S-expression composing function 3300, which will be described later. Subsequently, a check is made to determine whether or not the operator has specified a parameterization request (step 3201). If this is the case, a portion defining a specified function name and a function associated with the parameter name is added to an S-expression produced by the S-expression composing function (step 3202), thereby applying the loop developing function 2203 to the resultant S-expression. If the parameterization is not specified, the loop developing function 2203 is directly applied to the S-expression created by the S-expression composing function 3300. With an execution result of the loop developing function 2203, control returns to the top-level routine 100.

Figure 62:
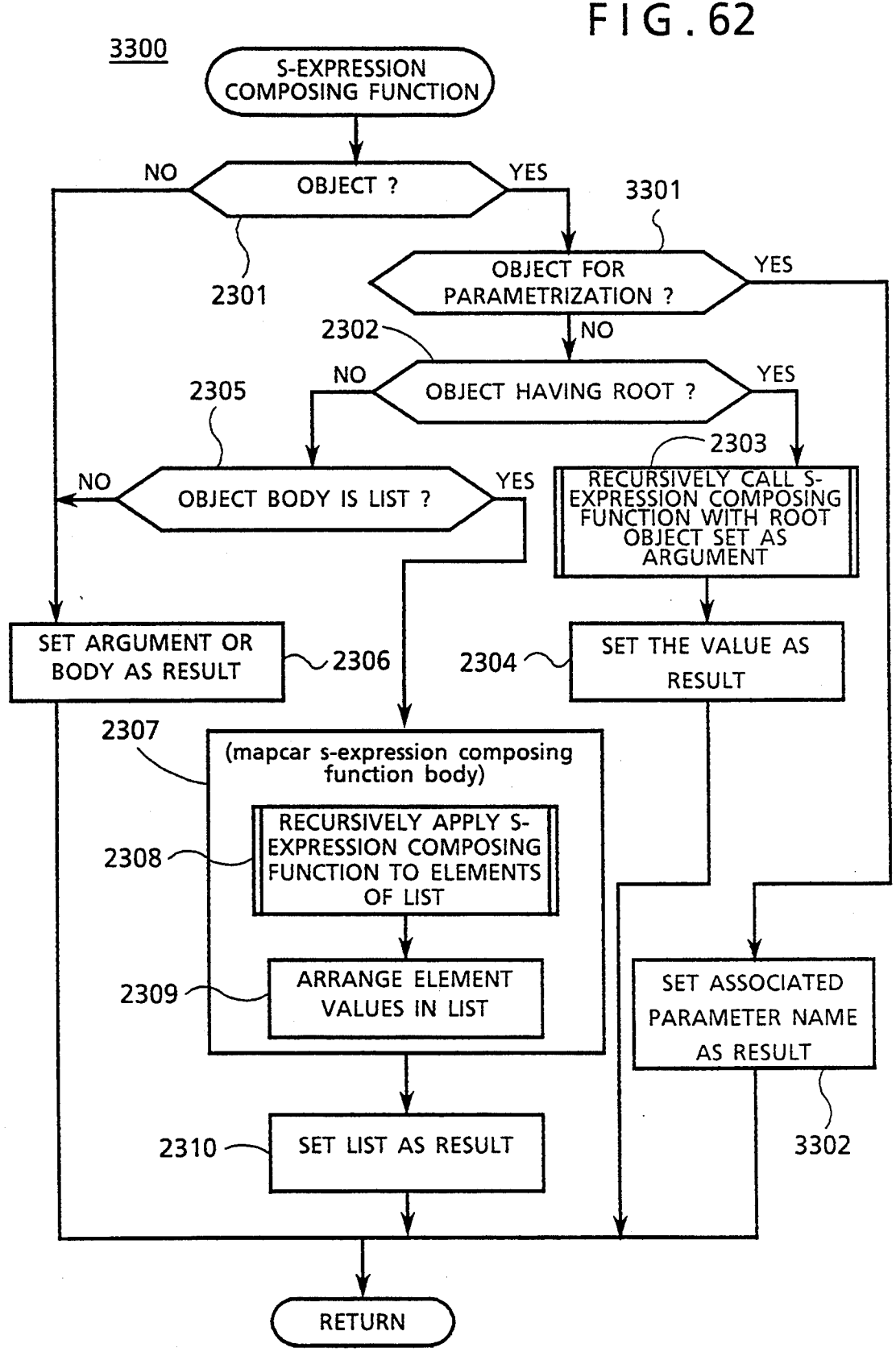
FIG. 62 is a flowchart of another S-expression composing function according to the present invention.

The S expression composing function 3300 first checks, like the S-expression composing function 2202 as shown in FIG. 62, to determine whether or not the argument is an object 2600 (step 2301). If this is not the case, the argument is directly adopted as a result (step 2306) and then control is transferred to the routine 3200 of FIG. 61.

If the argument is an object 2600, the parameterization list is referenced to decide whether or not the object is specified to be parameterized (step 3301). If the object is an end point, an identifier assigned thereto is set as a result (step 3302) and control is passed to the routine 3200 of FIG. 61. If the object is not to be parameterized, the processing is continued in a similar fashion as for the S-expression composing function 2202.

Figure 63:
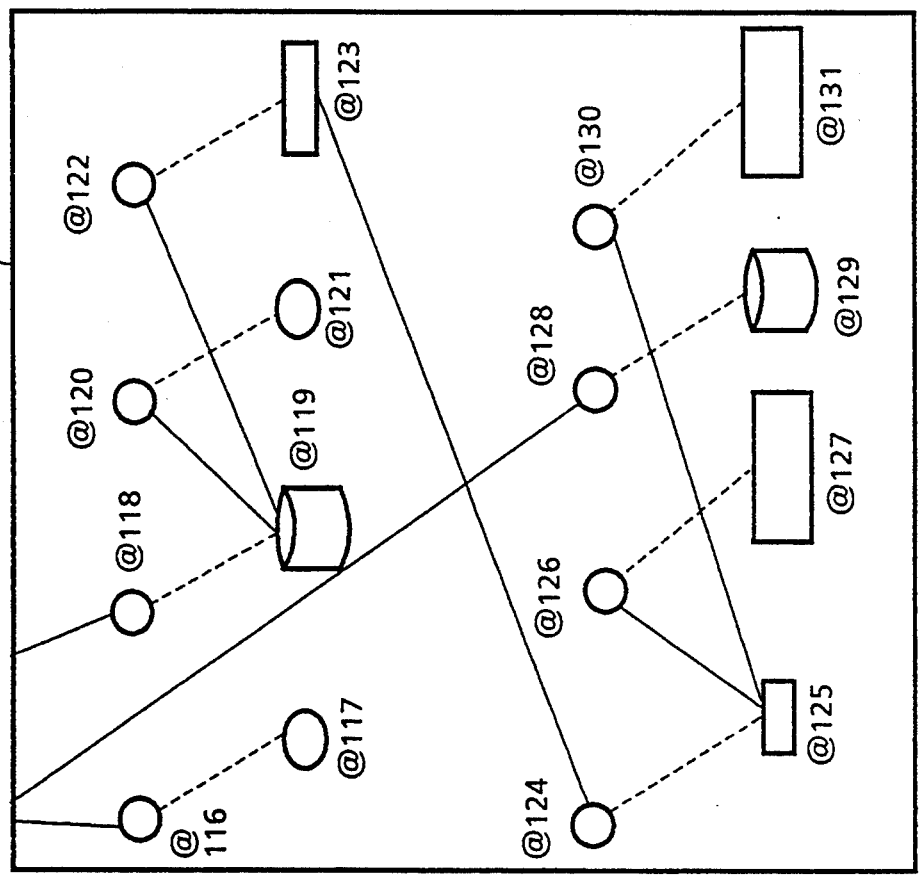
FIG. 63 is a diagram showing screen examples in a concrete example of an interaction processing in which the automatic program generating routine of FIG. 61 and the S-expression composing function of FIG. 62 are employed.

Referring next to a concrete example of the retrieval on the database of the embodiment 1, description will be given of the operations of the respective routines used in a program generation employing the automatic program generating routine 3200 and the S-expression composing function 3300. For example, let us assume that a result of an execution of the procedure (d) of the embodiment 1, namely, a set of employee records thus retrieved is to be parameterized and that a program is created to extract contents of name columns from a set of arbitrary employee records selected from the retrieved records. When this operation is accomplished after the retrieval of the embodiment 1, the system presents display items in the talker 302, the listener 303, and the finder 305 of the screen as shown in FIG. 63.

First, for a specification to parameterize the result of the procedure (d) based on a parameter name "records" so as to generate a function with a function name "test", the operator inputs an S-expression ---
(setq parameterization-list
'((test @109 record))).
---

In response to the input, an object @128 is created to be displayed on the screen. Moreover, the S-expression is executed to attain a value, which is then processed to generate an object @129 to be presented on the display.

In order to create a program, the operator next inputs an S-expression
(buc '@125).
Resultantly, an object @130 is generated to be displayed on the screen.

In the execution of the S-expression, the automatic program generating routine 3200 is called such that the routine 3200 then sets an object specified by the identifier @125 as an argument to call the S-expression composing function 3300. When this function 3300 is exequted, since the argument is an object which is not the object @109 specified for the parameterization and which has a root object, control passes through the steps 2301, 3301, and 2302 to enter the step 2303, thereby recursively calling the S-expression composing function. Thereafter, the processing is accomplished in a similar fashion according to the flowchart of FIG. 63.

Meanwhile, an object denoted by the identifier @109 is set as an argument to call the S-expression composing function. In this operation, the argument is an object to be specified for the parameterization. Consequently, control proceeds through the steps 2301 and 3301 to reach the step 3302 so as to return as a resultant value the parameter name "records".

When the sequence of recursive calls of the S-expression composing function are thus executed, there is finally attained an S-expression of FIG. 64 as a result (name (example records)).
Control returns to the routine 3200 of FIG. 61 together with the result.

In the automatic program generating routine 3200, since the parameterization is designated, control transfers via the step 3201 to the step 3202 to generate an S-expression to which the function defining portion is added as follows.
(defun test (records)
(name (example records))).

Thereafter, like in the embodiment 1, the attained S-expression is set as an argument to call the loop developing function 2203 in a recursive manner. As a result of an execution of the function 2203, an S-expression ---
(defun test (records)
(mapcar #'name records))
--- is returned.

The S-expression represents a value attained as a result of an execution of the S-expression of the object @130. Based on the resultant value, an object @131 is produced to be presented on the screen.

The S-expression functions as a general-purpose program in which the parameterization is achieved on a result of the processing as a portion of the S-expression created in the embodiment 1 (FIG. 53), namely, a result of the retrieval collecting from the database "employee-list" the employee records of male employees of the sales division having an age between 20 and 30, thereby generating a general purpose-program applicable to a set of arbitrary employee records selected from the collected records.

As above, according to the automatic program generating method adopting the automatic program generating routine 3200 and the S-expression composing function 3300, in a case where an arbitrary one of the execution results is specified for an automatic program generation, the operator need only specify an object parameterizing an execution result of a sequence of command series producing the result to automatically create a general-purpose program for which data can be specified at an execution thereof.

In this regard, in the example of the embodiment 4, a set of three items including a function name to be generated, an object for the parameterization, and a parameter name is registered to a global variable such that the global variable is reference to produce a program. However, the end point may also be specified as an argument of a BUC command.

Moreover, although the operator specifies the parameter name in the example of the embodiment 4, the automatic program generating routine may automatically create the parameter name for the parameterization.

Embodiment 5

In the program generating method of the embodiment 1, the operator designates an arbitrary one of the execution results to extract a command series generating the execution result. In this method, for an execution result produced by a command in the extracted command series, other commands referencing the execution result are not extracted as constituents of the command series. However, the operator desires depending on cases to output, for example, as an intermediate result another execution result not employed when the specified execution result is created. Description will be here given of the embodiment based on an embodiment 5 in which the operator arbitrarily specifies a plurality of execution results to automatically generate a program equivalent to sequences of command series respectively producing the respective execution results.

Figure 67:
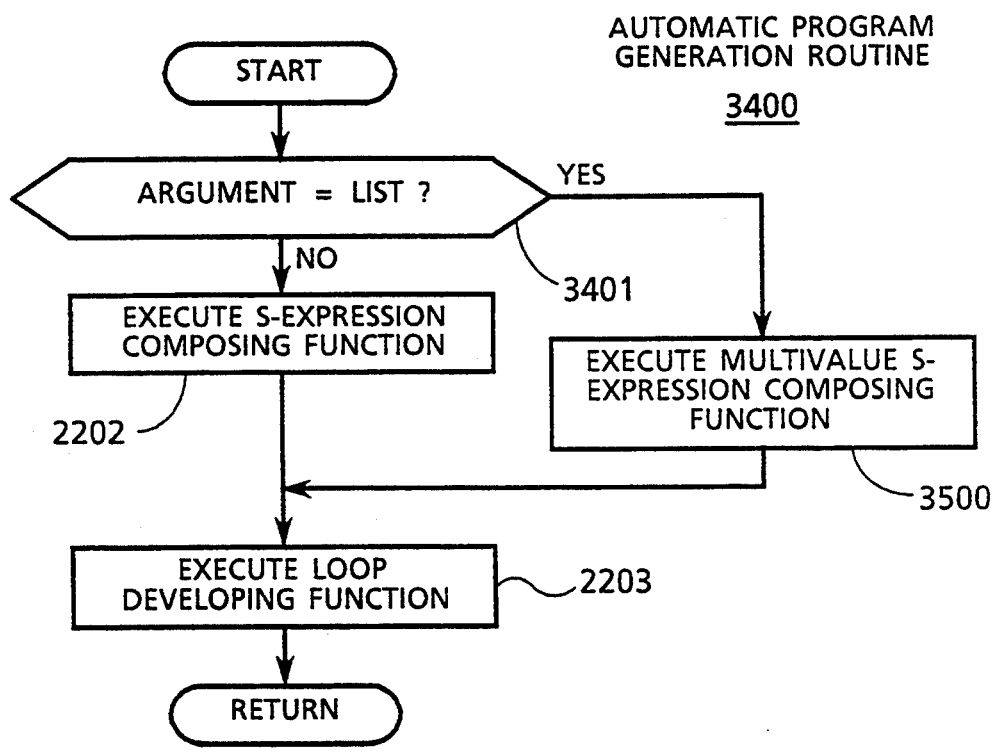
FIG. 67 is a flowchart of another example of the automatic program generating routine according to the present invention.

In the embodiment 5, the automatic program generating routine 109 of the embodiment 1 is replaced with an automatic program generating routine 3400 of FIG. 67.

Referring now to FIG. 67, description will be given of the processing of the automatic program generating routine 3400.

First, a check is made to determine whether or not the operator specifies a plurality of execution results when inputting a BUC command, namely, whether or not the BUC command contains an argument represented as a list (step 3401). If only one execution result is specified, the execution result is set as an argument, like in the embodiment 1, to execute the S-expression composing function 2202. For a specification of two or more execution results, these results are set as arguments to achieve a multi-value S expression composing function 3500 of FIG. 68, which will be described later. A result of an execution of the S-expression composing function or the multi-value S-expression composing function is then set as an argument to execute the loop developing function 2203. Control returns to the top-level routine 100 together with a result of an execution of the function 2203.

Figure 68:
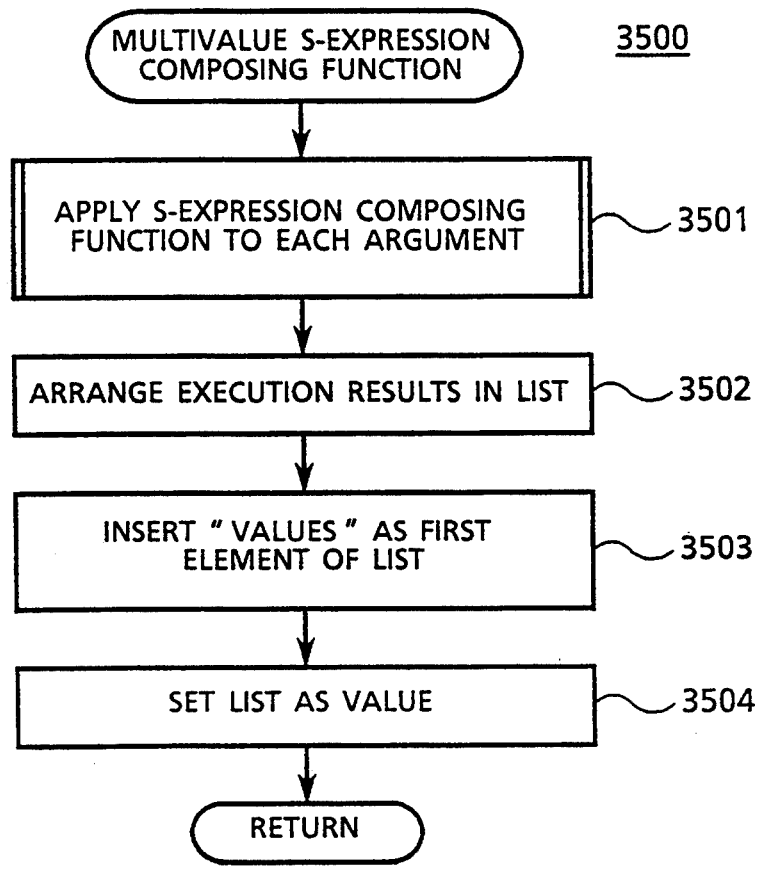
FIG. 68 is a flowchart of a multi value S-expression composing function according to the present invention.

In the multi-value S-expression composing function 3500 of FIG. 68, the S-expression composing function 2202 is executed for the respective arguments (step 3501). The execution results are arranged in a list (step 3502) and then "values" is inserted as a first element of the list, thereby creating an S-expression returning as a result the multiple value (step 3503). Control returns to the routine 3400 of FIG. 67 together with an S-expression representing the value thus attained.

Referring now to a specific example of the retrieval through the database of the embodiment 1, a description will be given of the operations of the respective routines employed for an automatic program generation in which a plurality of execution results are specified for the program generation using the automatic program generating routine 3400.

Figure 69:
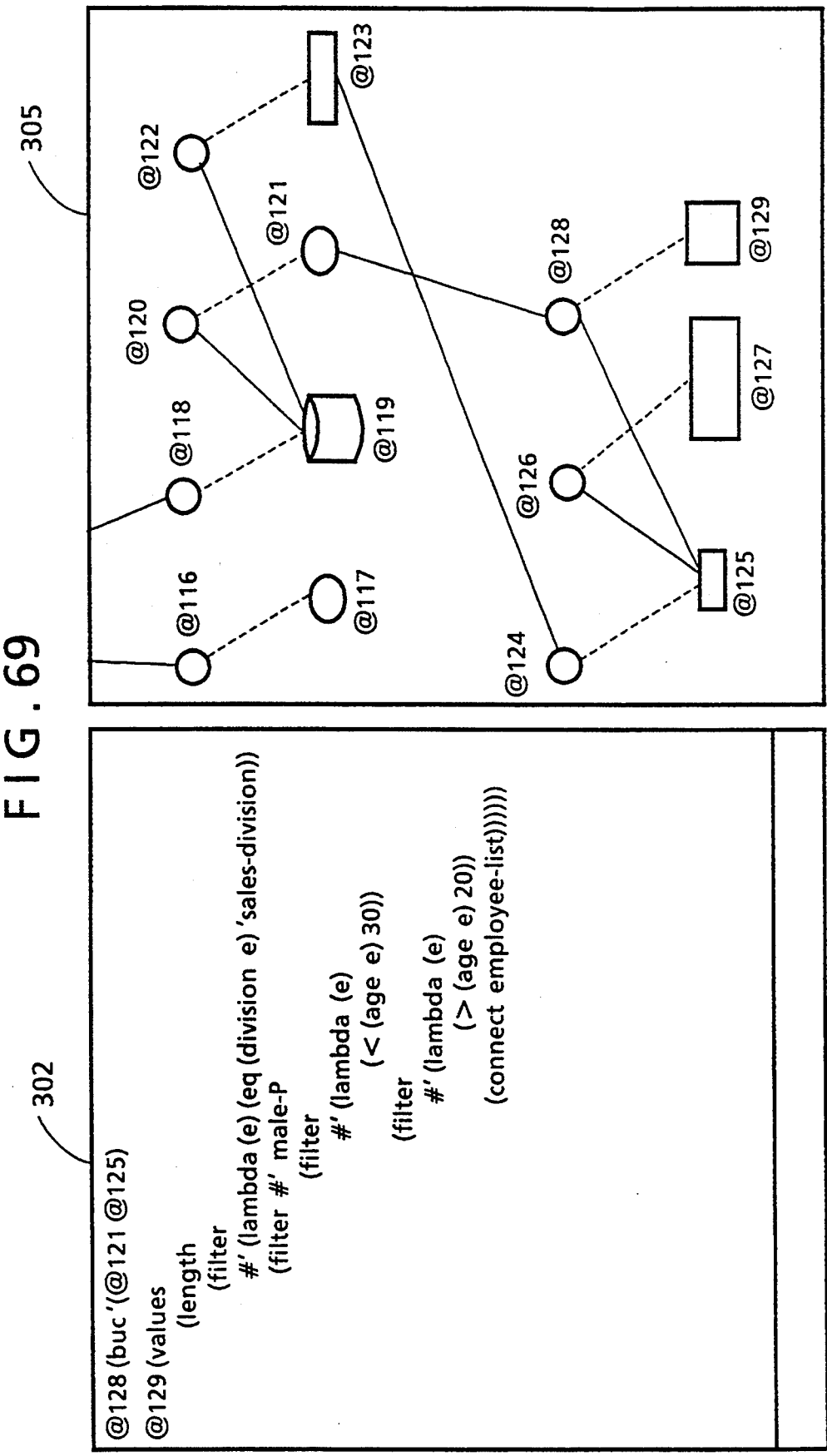
FIG. 69 is a diagram showing screens in concrete examples of an interaction processing in which the automatic program generating routine of FIG. 67, the S-expression composing function of FIG. 9, and the multi-value S-expression composing function of FIG. 68 are employed.

In the embodiment 1, a program is created by specifying the result @125 attained by extracting contents of name columns of the employee records retrieved in a sequence of operations conducted on the database "employee-list". Let us assume here that the number of employee records retrieved and a list including names of the employees are to be obtained. For this purpose, a program is created by specifying two execution results including the number @121 of the retrieved employee records and the result @125 attained by extracting the contents of the name columns. When this operation is accomplished after the retrieval of the embodiment 1, the system presents items in the talker 302, the listener 303, and the finder 305 of the screen as shown in FIG. 69.

The operator inputs an S-expression containing a list of the two execution results
(buc '(@121 @125)).
in response thereto, an object @128 is created to be displayed on the screen.

In an execution of the S-expression, the automatic program generating routine 3400 is called. Since the argument is a list, control passes through the step 3401 and then the list is set as an argument to call the multi-value S-expression composing function 3500. This function 3500 sets as arguments the objects respectively related to the identifiers @121 and @125 so as to in turn call the S-expression composing function 2202. When the function 2202 is applied to the object @121, there is attained an S-expression as follows (FIG. 70).

```
(length
  (filter
    #'(lambda (e) (eq (division e) 'sales-division))
    (filter @'male-P
      (filter #'(lambda (e) (<(age e) 30))
        (filter
          #'(lambda (e) (>(age e) 20))
          (connect employee-list))))))
```

Applying the S-expression composing function to the object @125, an S-expression of FIG. 71 is obtained.

```
(name
  (example
    (filter
      #'(lambda (e) (eq (division e) 'sales-division))
      (filter #'male-p
        (filter #'(lambda (e) (<(age e) 30))
          (filter
            #'(lambda (e) (>(age e) 20))
            (connect employee-list)))))))
```

These S-expressions are arranged in a list and then a function "values" is set as a first element thereof, thereby generating an S-expression returning as a result the multiple values (FIG. 72).

```
(values
  (length
    (filter
      #'(lambda (e) (eq (division e) 'sales-division))
      (filter #'male-p
        (filter #'(lambda (e) (<(age e) 30))
          (filter
            #'(lambda (e) (>(age e) 20))
            (connect employee-list))))))
  (name
    (example
      (filter
        #'(lambda (e) (eq (division e) 'sales-division))
        (filter #'male-p
          (filter
            #'(lambda (e) (<(age e) 30))
            (filter
              #'(lambda (e) (>(age e) 20))
              (connect employee-list)))))))
```

The loop developing function 2201 is then applied to the obtain S-expression returning as a result multiple values, thereby generating an S-expression as shown in FIG. 73.

```
(values
  (length
    (filter
      #'(lambda (e) (eq (division e) 'sales-division))
      (filter #'male-p
        (filter
          #'(lambda (e) (<(age e) 30))
          (filter
            #'(lambda (e) (>(age e) 20))
            (connect employee-list))))))
  (mapcar #'name
    (filter
      #'(lambda (e) (eq (division e) 'sales-division))
      (filter #'male-p
        (filter
          #'(lambda (e) (<(age e) 30))
          (filter
            #'(lambda (e) (>(age e) 20))
            (connect employee-list))))))
```

This S-expression represents a value attained by executing the S-expression of the object @128. Based on the value, an object @129 is generated to be presented on the display screen.

The embodiment 5 has been described in conjunction with a specific example in which an execution result and an intermediate result of a command series producing the execution result are specified to generate a program returning as a result multiple values. However, a plurality of execution results of command series independently executed may be specified to create a program returning as a result the respective values.

Moreover, in the automatic program generating method of the embodiment 1, in a process generating an execution result produced by a command series and specified by the operator, even when there exists a command which is derived from or is initiated in association with the command series and which references an execution result of a command included in the command series, the derived command is not incorporated in the created program. Consequently, the attained program does not produce the execution result of the derived command. This is also the case of the embodiment 5. However, if the operator does not specify that the execution result of the derivative command is not to be outputted, the derivative command series may also be additionally extracted to be included in the resultant program. For this purpose, the automatic program generating routine of the embodiment 5 need only be modified such that if the operator does not specify that the execution result of the derivative command is not to be outputted, the derivative command series is automatically added to the execution results specified by the operator so as to thereafter call the multi-value S-expression composing function. Furthermore, it may also be possible that when the operator specifies that the derivative execution result is to be outputted, the derivative execution result is automatically added to the execution results specified by the operator, thereby calling the multi-value S-expression composing function.

Incidentally, the embodiments 1 to 5 have been described in conjunction with a case where the interaction processing method and the program generation method according to the present invention are incorporated in the top-level routine of the Lisp. However, these methods may be naturally incorporated in an interaction processing routine of a computer system employed in a general interactive configuration.

Figure 74:
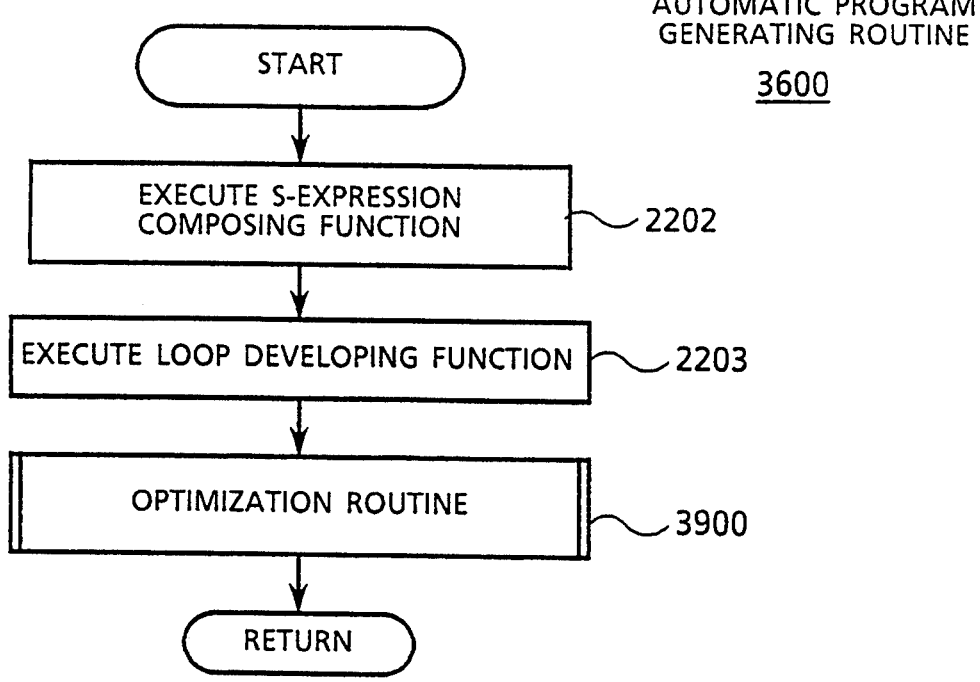
FIGS. 74, 75, and 76 are flowcharts of another example of the automatic program generating routine according to the present invention.
Figure 75:
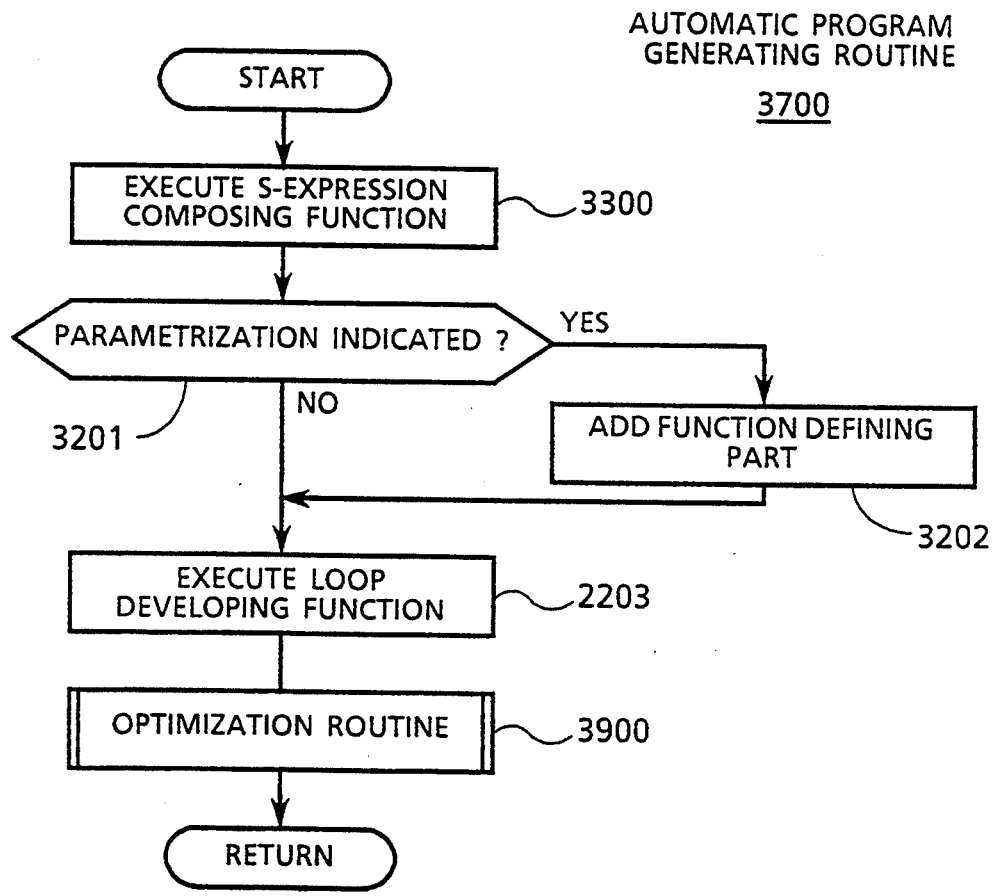
Figures 76, 77:
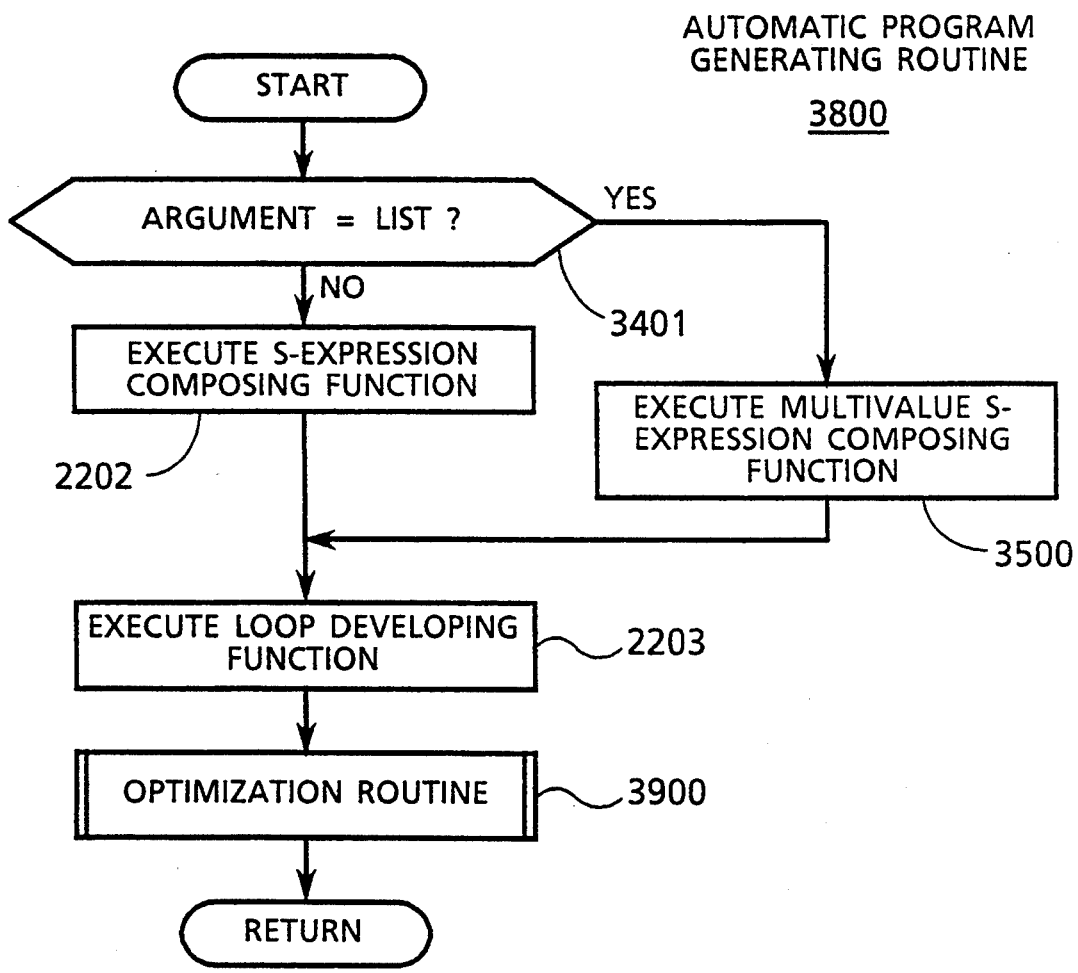
FIG. 77 is a diagram showing the S-expression in a case where the automatic program generating routine of FIG. 76, the S-expression composing function of FIG. 9, and the multivalue S-expression composing function of FIG. 68 are employed.

In the automatic program generating routines of the embodiments 1 to 5, when an execution result of a command series previously executed is used two times or more, there is produced a program containing the same S-expression in positions thereof where the execution result is referenced. As shown in FIGS. 74 to 76, after the loop developing function of each of the automatic program generating routines is called, check may be achieved to determine a portion of the S-expression achieving a shared processing so as to incorporate a shared optimization routine 3900 in the program. The optimization routine will be implemented according to technology adopted in a compiler or the like.

For example, in the embodiment 5, based on the automatic program generating routine 3800 of FIG. 76 in which the optimization routine is incorporated, the S-expression of FIG. 73 can be optimized to attain an S-expression of FIG. 77.

```
(let ((data
   (filter
    #'(lambda (e) (eq (division e) 'sales-division))
    (filter #'male-p
     (filter
      #'(lambda 9e) (<(age e) 30))
      (filter
       #'(lambda (e) (>(age e) 20))
       (connect employee-list))))))
  (values (length data)
   (mapcar #'name data)))
```

In addition, each of the embodiments 2 to 5 has been implemented by including a function to the embodiment 1; however, two or more different functions may be simultaneosuly combined therewith. Moreover, in the embodiments 2 to 4, the global variable is established by inputting an S-expression; however, there may be used a menu, a dialogue box, or the like for an interface in which the global variable is to be established.

As can be seen from the description above, in accordance with the present invention, the following various modes of carrying out the invention may be employed in a single mode or in a combined mode thereof.

(1) Items such as commands previously inputted by the operator can be specified thereafter as commands or operands in a subsequent operation by use of identifiers, icons, function keys, or the like.

(2) The commands and other items are presented in the form of graphic images on the screen; moreover, mutual relationships between the displayed items are indicated as line segments connecting the graphic images on the screen. This helps the operator easily recognize relationships between the commands.

(3) When the operator inputs an execution result, a program is automatically generated in association with a sequence of command series generating the execution result.

(4) The system automatically generates a program which does not include unnecessary items of operation errors and of the trial-and-error procedure. In consequence, the editing operation is unnecessitated.

(6) By obtaining a concrete execution result through an interactive processing in a trial-and-error fashion, there can be created a general-purpose program expanded for general uses.

We claim:

1. A method of generating a program comprising steps executed by a computer, the steps including:
   (a) sequentially inputting a plurality of commands selected by an operator, said commands specifying respective processing to be executed and respective data to be used in the processing;
   (b) executing each said inputted command before an input of a command subsequent thereto to output data resultant from an execution of said each command,
   said step (a) including a step of inputting several commands specifying resultant data attained by said step (b) through execution of commands inputted prior to said several commands as data to be respectively used by said plural commands;
   (c) storing information representing each of the inputted commands in such a manner that information representing a succeeding command which uses result data obtained as a result of execution of a preceding command is chained to information representing said preceding command;
   (d) activating a program generation routine to select, based upon said information stored for each of the inputted commands, from said plural input commands a series of several commands employed to generate at least one of a plurality of resultant data associated with said plural commands, said at least one resultant data being selected by the operator, wherein said routine selects the series of several commands by information each representing a command chained to information representing a command which has produced said result data selected by the operator, thereby selecting part of said plural input commands which have plural information chained to each other; and (e) generating, based on said information stored for each command of the selected command series, a program executing processing to be achieved by said command series or processing equivalent thereto.

2. A program generating method according to claim 1, wherein said step (d) includes a step of selecting a portion from said plural commands inputted,
said portion beginning from a first command using a data item selected by the operator from a group of data used by said plural input commands or beginning from a second command selected by the operator from said plural commands and ending with a command generating the selected resultant data.

3. A program generating method according to claim 1, wherein said information representing each command inputted includes first information representing processing of said each command and second information representing data resultant from execution of said each command.

4. A program generating method according to claim 3, wherein said storing step includes steps of:
storing said first information representing processing of said each command, in response to inputting of said each command;
changing, in response to said each command information representing said each command to information representing a command preceding to said each command, in case said each command uses resultant data of said preceding command, and
storing the second information after execution of said each command.

5. A program generating method according to claim 3, wherein said first information representing processing of said each command is chained to said second information denoting data resultant from execution of said each command.

6. A program generating method according to claim 5, wherein said information representing each of said commands inputted further includes third information representing identity thereof as a command, said first information of said command being chained to said third information,
said first information being chained via said third information of said command to said second information of said preceding command,
said second information of said each command being chained via said fourth information thereof to said first information thereof.

7. A program generating method according to claim 6, wherein said storing step (c) includes a step of:
being responsive to inputting of one of said plural commands, said one command using data resultant from execution of a command preceding thereto, to store said first and third information of said one command, said first information being chained to said third information, said third information being chained to said second information of said preceding command,
said step being responsive to execution of each of said plural commands to store said second information of said each command, said second information being chained to said third information thereof.

8. A method according to claim 1, wherein said selecting step includes steps of:
selecting said series of several commands from said plural input commands so that said series of several commands start from a command using another resultant data selected by an operator as data to be changed to a variable and said series of several commands includes commands which succeed to said command using said another data and has been employed to generate the one resultant data selected by the operator; and
generating, based upon the selected series of several commands, a program which executes processing achieved by said selected series of several commands or processing equivalent to the processing, on said variable.

9. A program generating method according to claim 1, wherein said step (b) includes a step of adding to data resultant from an execution of each said command an identifier discriminating said data from other data resultant from executions of other commands, thereby outputting the resultant data,
said step included in said step (a) of specifying the resultant data for said preceding command including a step of specifying an identifier assigned to the resultant data for said preceding command.

10. A program generating method according to claim 1, wherein said step (b) includes a step of displaying each of said plural input commands and resultant data attained for each said command following a command preceding thereto,
said step included in said step (a) of inputting commands specifying resultant data resultant from preceding commands including a step of specifying display positions of resultant data for said preceding commands.

11. A program generating method according to claim 1, wherein said step (d) further includes a step of selecting another series of commands included in said plural input commands, said another series of commands being branched from said selected series of several commands, said another series of commands including commands not included in said selected series of the several commands but using an execution result of one command included in said selected series of several commands,
wherein said step (e) further includes generating, based upon said information stored for each command of the selected series of several commands and the selected another series of several commands, a program executing processing to be achieved by said selected series of commands and said selected another series of commands or processing equivalent thereto.

12. A program generating method according to claim 1, wherein said step (d) includes selecting from said plural input commands a series of several commands employed to generate a plurality of resultant data selected by the operator from the plurality of resultant data respectively associated with said plural input commands.

13. A program generating method according to claim 1, further including the following steps of:
(c′) inputting, after the step (c) and before the step (d), information to specify a series of commands selected by the operator, for changes thereof, among the plurality of commands inputted; and (c″) inputting another series of commands selected by the operator, said another series of commands being ones to replace said series of commands selected for changes thereof, said step (d) including a step operative to select said another series of commands, in place of said series of commands selected for changes thereof, as a portion of said series of several commands when the series of commands selected for changes thereof have been used to generate the selected resultant data.

14. A program generating method according to claim 13, wherein:

information representing a command using data different from data resultant from execution of a command preceding thereto includes information representing processing of said command, the different data and execution result data of said command;

information representing a command using data resultant from execution of a command preceding thereto includes information representing processing of said command and execution result data of said command and being chained to information representing the preceding command, said step (d) including a step of tracing the series of several commands based on the stored information representing each of said plural commands inputted, said commands being ones which have information representing said commands belonging to a chain to which information representing a command that has produced the selected resultant data belongs, said step continuing the tracing in such a manner that when a first command used as an end of the series of commands selected for changes thereof is detected during the tracing, the tracing is continued from a second command adopted as an end of said another series of commands, in place of the first command used as the end of the series of commands to be changed.

15. A program generating method according to claim 1, wherein said step (e) includes a step of producing a program portion as part of said program to be generated, when the selected series of commands include a first command producing a group of data a second succeeding command selecting one constituent data from the group of data generated by the first command and a group of further succeeding commands achieving processing on said selected one constituent data, said program portion executing the processing achieved by the group of commands or processing equivalent thereto, on each of said group of data generated by said first command.

16. A program generating method according to claim 1, further comprising the following steps of:

(e) displaying an icon of a first kind in response to inputting of each command by the step (a) plural commands, said command using data different from data resultant from an execution the icon of the first kind representing said each command;

(f) displaying an icon of a second kind in response to the executing of said each command, the icon of the second kind representing resultant data of execution of said each command;

(g) selecting by an operator an icon of the third kind representing resultant data for which the program should be produced.

17. A program generating method according to claim 16, further comprising the following steps of:

(h) displaying a graphic image of a first type interrelating the icon of the first kind representing said each command to an icon of the second kind representing resultant data of a command preceding to said each command in response to the inputting of said each command, said resultant data being used by said each command;

(i) displaying a graphic image of a second type interrelating the icon of the second kind representing resultant data of said each command to the icon of the first kind representing said each command in response to the executing of said each command.

18. A program generating method according to claim 17, wherein the graphic image of the first type is different from the graphic image of the second type.

19. A program generating method according to claim 18, wherein the graphic images of the first and second types are respectively represented with straight lines having line types different from each other.

20. The program generating method according to claim 1, wherein said extracting step includes the step of extracting from a series of several commands from said plural input commands beginning from a command using another resultant data selected from respective resultant data of said plural input commands, said another selected data being changed to a variable and being employed to generated the one resultant data, thereby generating based on the extracted command series a program executing on the variable processing achieved by said extracted command series or processing equivalent thereto.

21. A method for generating a program, comprising steps executed by a computer system which includes a processing unit, a display device and an input apparatus, the steps including:

sequentially inputting plural commands, each of the commands including a first character string indicative of processing to be executed and a second character string indicative of data which should receive the processing or an identifier of the data;

displaying an icon of a first kind representing each of the commands, in response to inputting of said each command and before inputting of a succeeding command of said each command;

executing said each command before inputting of the succeeding command;

automatically generating a data identifier to be given to data resultant from execution of said each command, in response to said executing of said each command;

displaying, in response to said executing of said each command, an icon of a second kind representing a result data of execution of said each command and a character string representing the generated identifier;

displaying, in response to said executing of said each command, a graphic image of a first type interrelating said icon of the first kind and said icon of the second kind displayed for said each command;

displaying, in response to said inputting of said each command, a graphic image of a second type interrelating said icon of the first kind representing said each command to an icon of the second kind which is already displayed for one of the commands preceding to said each command and represents data resultant from execution of said preceding command, in case said each command specifies, as a data identifier of data to be processed by said each command, a data identifier already displayed for the resultant data of said preceding command;

storing information representing each of the commands inputted in such a manner that information representing a succeeding command which uses result data obtained as a result of execution of a preceding command is chained to information representing said preceding command;

activating a program generation routine to select, from said plural commands inputted and based upon said information stored for said plural commands inputted, a series of several commands employed to generate one of a plurality of resultant data produced by said plural commands inputted, in response to an operator's selection of an icon representing said one resultant data, wherein said routine selects the series of several commands by information each representing a command chained to information representing a command which has produced said result data selected by the operator, thereby selecting part of said plural input commands which have plural information chained to each other; and generating, based upon said selected series of commands, a program which executes processing executed by said selected series of commands or equivalent thereto.

22. A method according to claim 21, wherein said storing step includes storing information of said plural commands inputted in such a manner that information of a succeeding command which uses a resultant data of a preceding command is chained to information representing said preceding information, wherein said selecting step includes steps of selecting said series of commands by tracing the information stored for each of said plural commands inputted from information representing one of said plural commands inputted which has produced said selected resultant data.

23. A method according to claim 1, wherein said storing step includes storing information of said plural commands inputted in such a manner that information of a succeeding command which uses a resultant data of a preceding command is chained to information representing said preceding information, wherein said selecting step includes steps of selecting said series of commands by tracing the information stored for each of said plural commands inputted from information representing one of said plural commands inputted which has produced said selected resultant data.

24. A program generating method comprising steps executed by a computer, the steps including:

(a) sequentially inputting a plurality of commands selected by an operator, said commands specifying respective processing to be executed and respective data to be used in the processing;

(b) executing each said inputted command before an input of a command subsequent thereto to output data resultant from an execution of said each command, said step (a) including a step of inputting several commands specifying resultant data attained by said step (b) through execution of commands inputted prior to said several commands as data to be respectively used by said plural commands;

(c) storing information representing each of the inputted commands;

(d) activating a program generation routine to select, based upon said information stored for each of the inputted commands, from said plural input commands a series of several commands employed to generate at least one of a plurality of resultant data associated with said plural commands, said at least one resultant data being selected by the operator thereby selecting part of said plural input commands which have plural information chained to each other, said program generation routine (i) judging to determine whether or not data utilized by each said command is data resultant from a command preceding thereto based upon information stored for each inputted command, and (ii) selecting said part of said plural input commands, based on a result of said judge step conducted on each of said plural commands; and (e) generating, based on said information stored for each command of the selected command series, a program executing processing to be achieved by said command series or processing equivalent thereto.

* * * * *

UNITED STATES PATENT AND TRADEMARK OFFICE
CERTIFICATE OF CORRECTION

PATENT NO. : 5,448,736
DATED : September 5, 1995
INVENTOR(S) : Hiroko Yuasa, et al.

It is certified that error appears in the above-indentified patent and that said Letters Patent is hereby corrected as shown below:

Claim 16, column 37, lines 58 and 59, after "the step (a)" delete "plural commands, said command using data different from data resultant from an execution."

Signed and Sealed this

Fifth Day of December, 1995

Attest:

BRUCE LEHMAN

Attesting Officer

Commissioner of Patents and Trademarks